Jan. 5, 1943.  A. H. DICKINSON  2,307,116
DIVIDING MACHINE OF THE RECORD CONTROLLED TYPE
Filed May 14, 1941  25 Sheets-Sheet 2
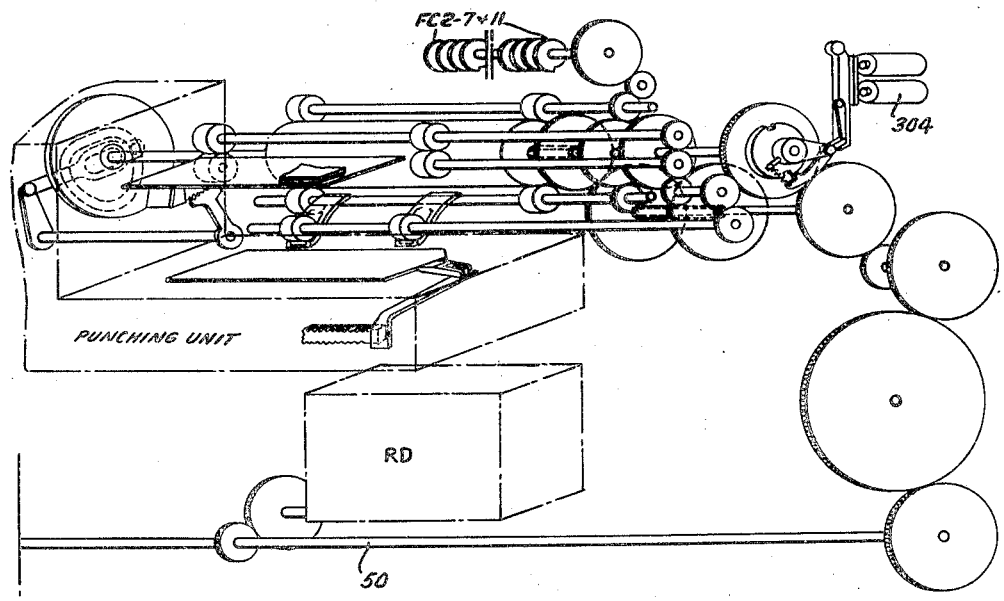
FIG. 1a.
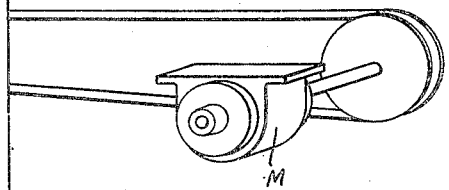
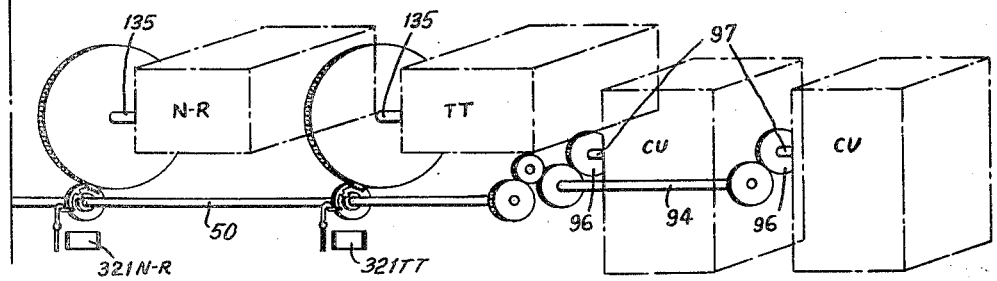
INVENTOR.
A. H. Dickinson
BY
ATTORNEYS.

Jan. 5, 1943.                A. H. DICKINSON                2,307,116
            DIVIDING MACHINE OF THE RECORD CONTROLLED TYPE
                Filed May 14, 1941           25 Sheets-Sheet 4

INVENTOR.
A. H. Dickinson
BY
W. M. Wilson
ATTORNEYS.

Jan. 5, 1943.  A. H. DICKINSON  2,307,116
DIVIDING MACHINE OF THE RECORD CONTROLLED TYPE
Filed May 14, 1941  25 Sheets-Sheet 5
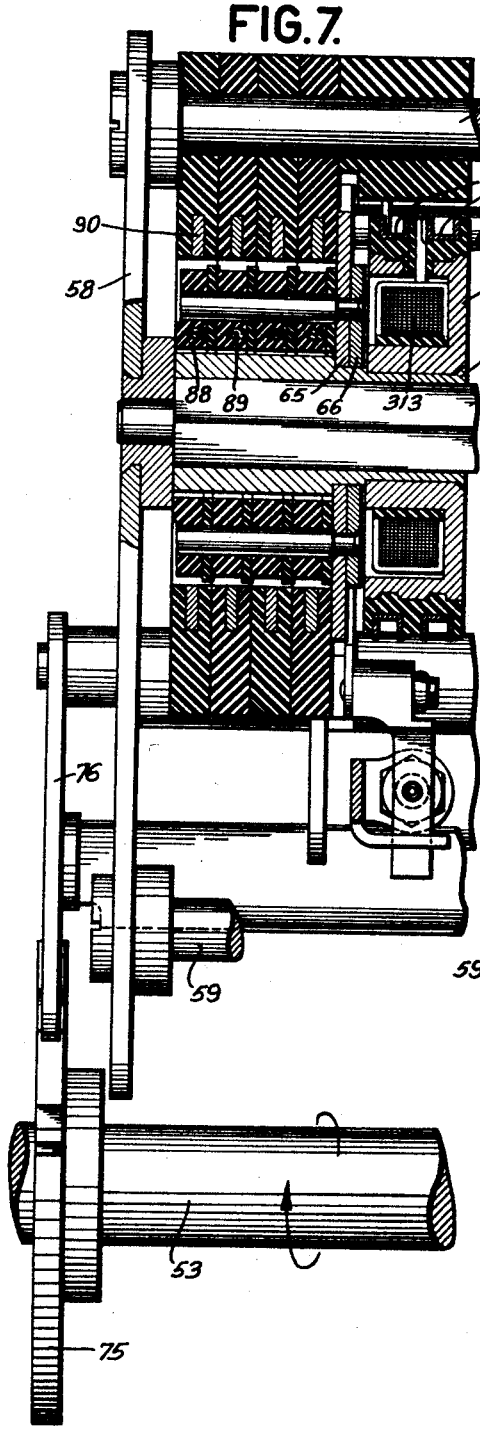
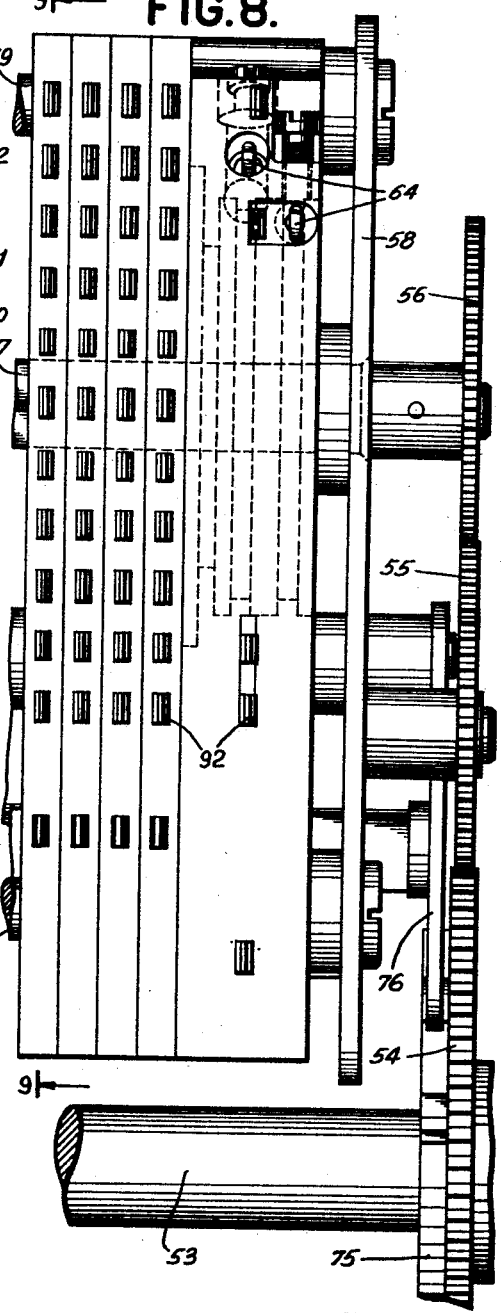
INVENTOR.
A. H. Dickinson
BY
ATTORNEYS.

Jan. 5, 1943.  A. H. DICKINSON  2,307,116
DIVIDING MACHINE OF THE RECORD CONTROLLED TYPE
Filed May 14, 1941  25 Sheets-Sheet 6

INVENTOR.
A. H. Dickinson
BY
ATTORNEYS.

Jan. 5, 1943. A. H. DICKINSON 2,307,116
DIVIDING MACHINE OF THE RECORD CONTROLLED TYPE
Filed May 14, 1941 25 Sheets-Sheet 8

INVENTOR.
A. H. Dickinson
BY
ATTORNEYS.

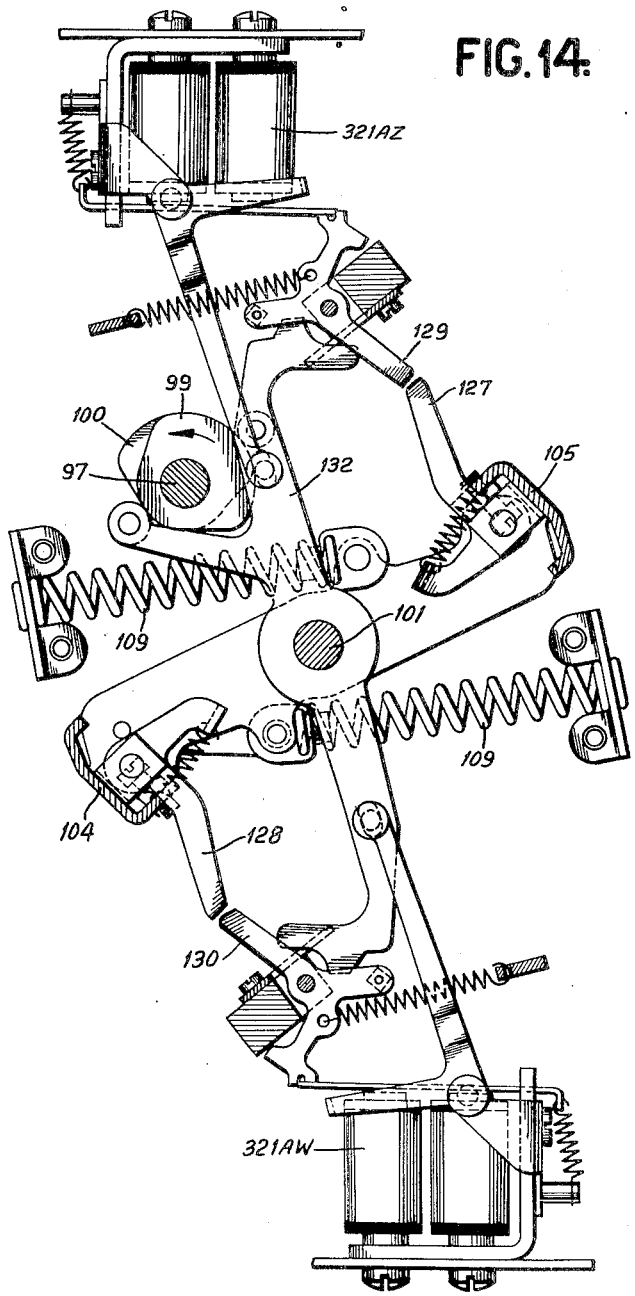

Jan. 5, 1943.  A. H. DICKINSON  2,307,116
DIVIDING MACHINE OF THE RECORD CONTROLLED TYPE
Filed May 14, 1941   25 Sheets-Sheet 10

INVENTOR.
A. H. Dickinson
BY
ATTORNEYS.

Jan. 5, 1943.    A. H. DICKINSON    2,307,116
DIVIDING MACHINE OF THE RECORD CONTROLLED TYPE
Filed May 14, 1941    25 Sheets-Sheet 11
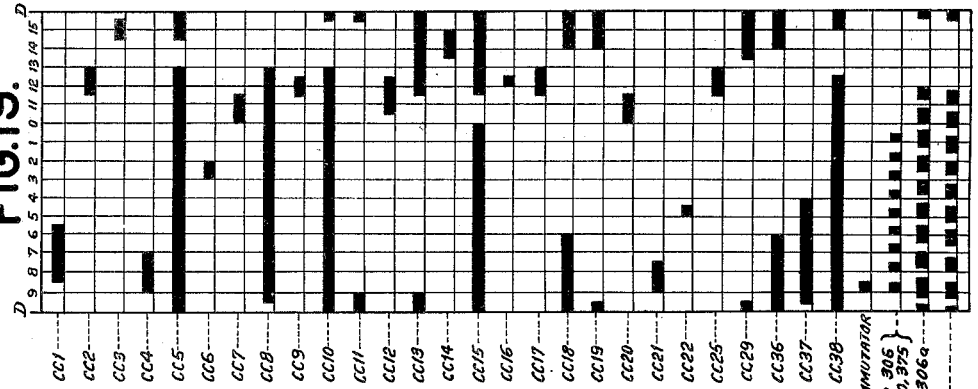
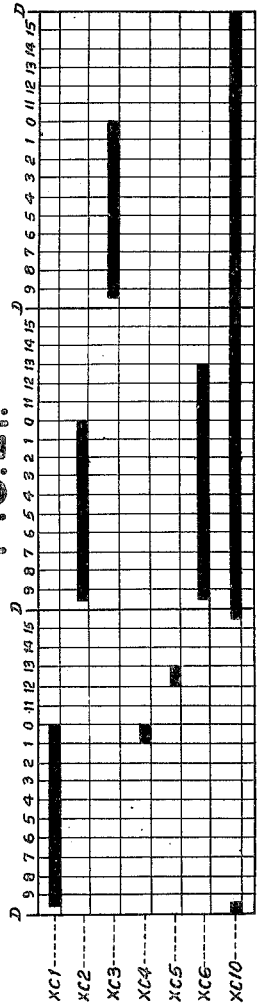
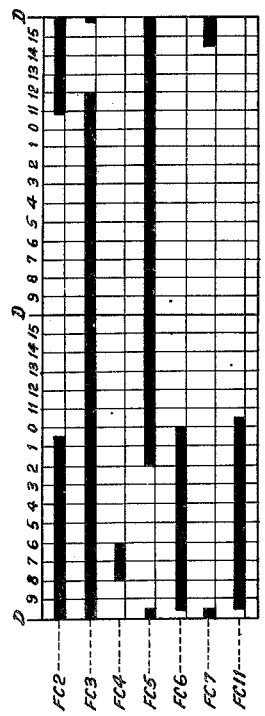
INVENTOR.
A. H. Dickinson
BY
W. M. Wilson
ATTORNEY

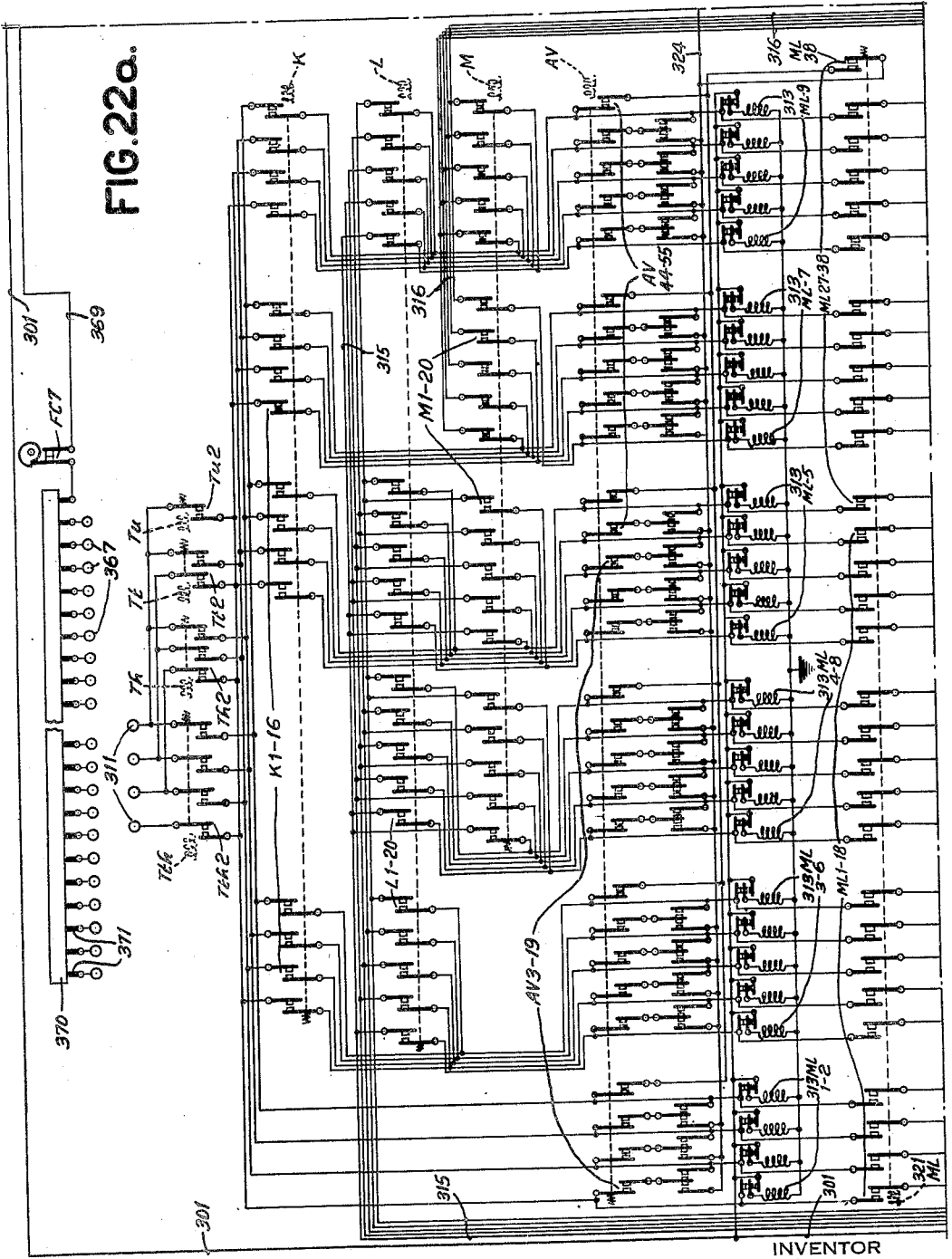

Jan. 5, 1943.  A. H. DICKINSON  2,307,116
DIVIDING MACHINE OF THE RECORD CONTROLLED TYPE
Filed May 14, 1941  25 Sheets-Sheet 14

INVENTOR
A. H. Dickinson
BY
ATTORNEY

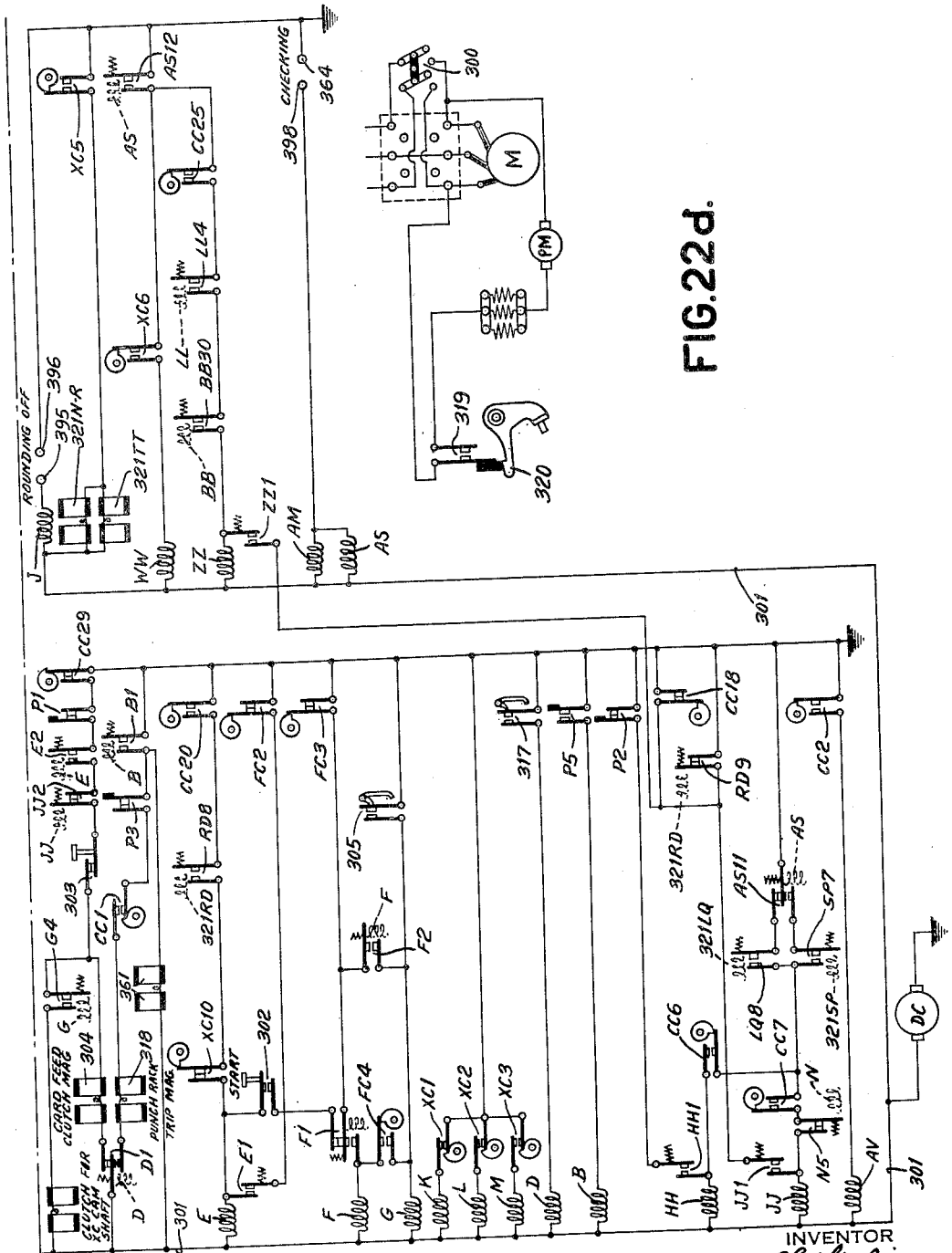

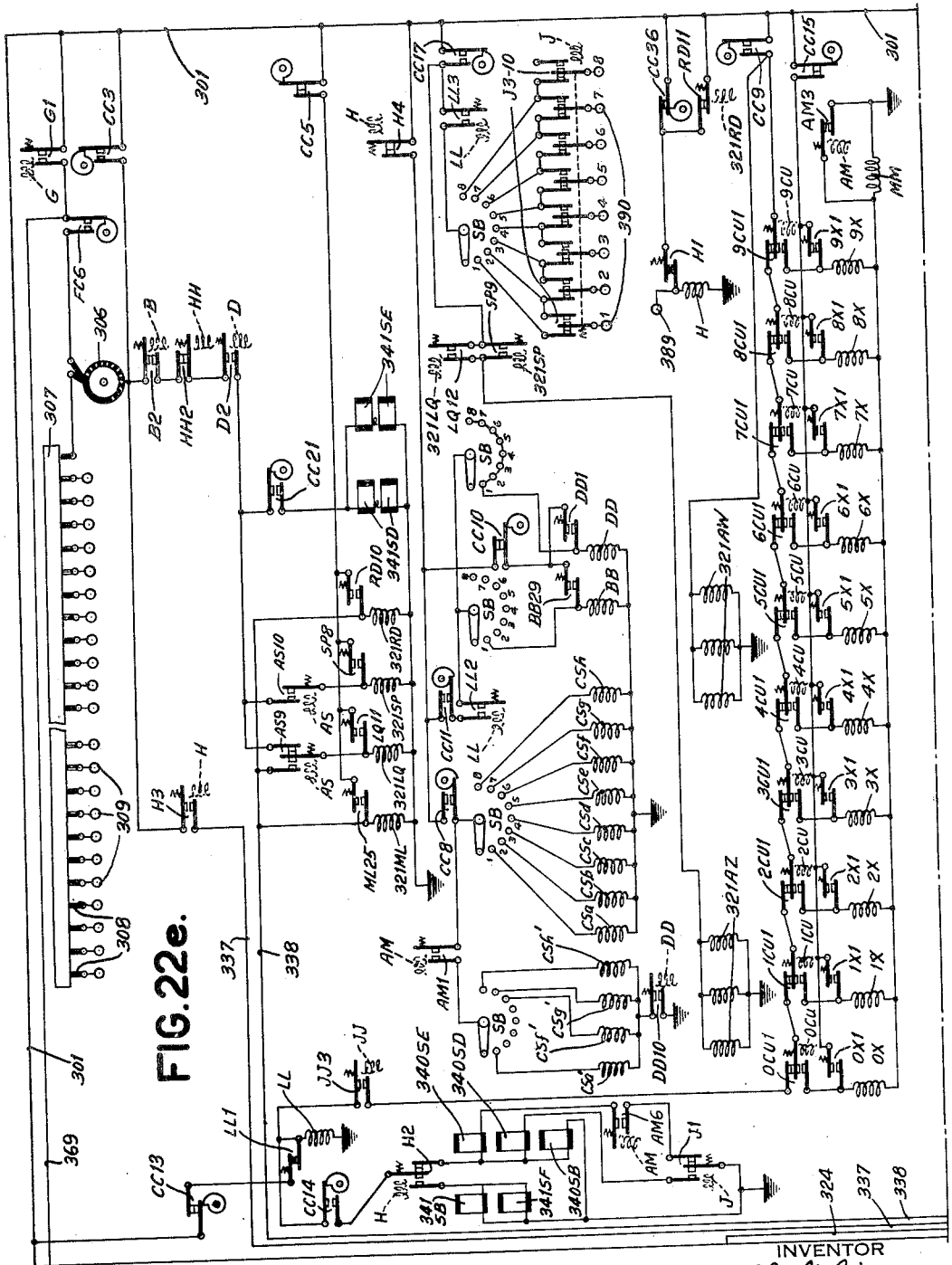

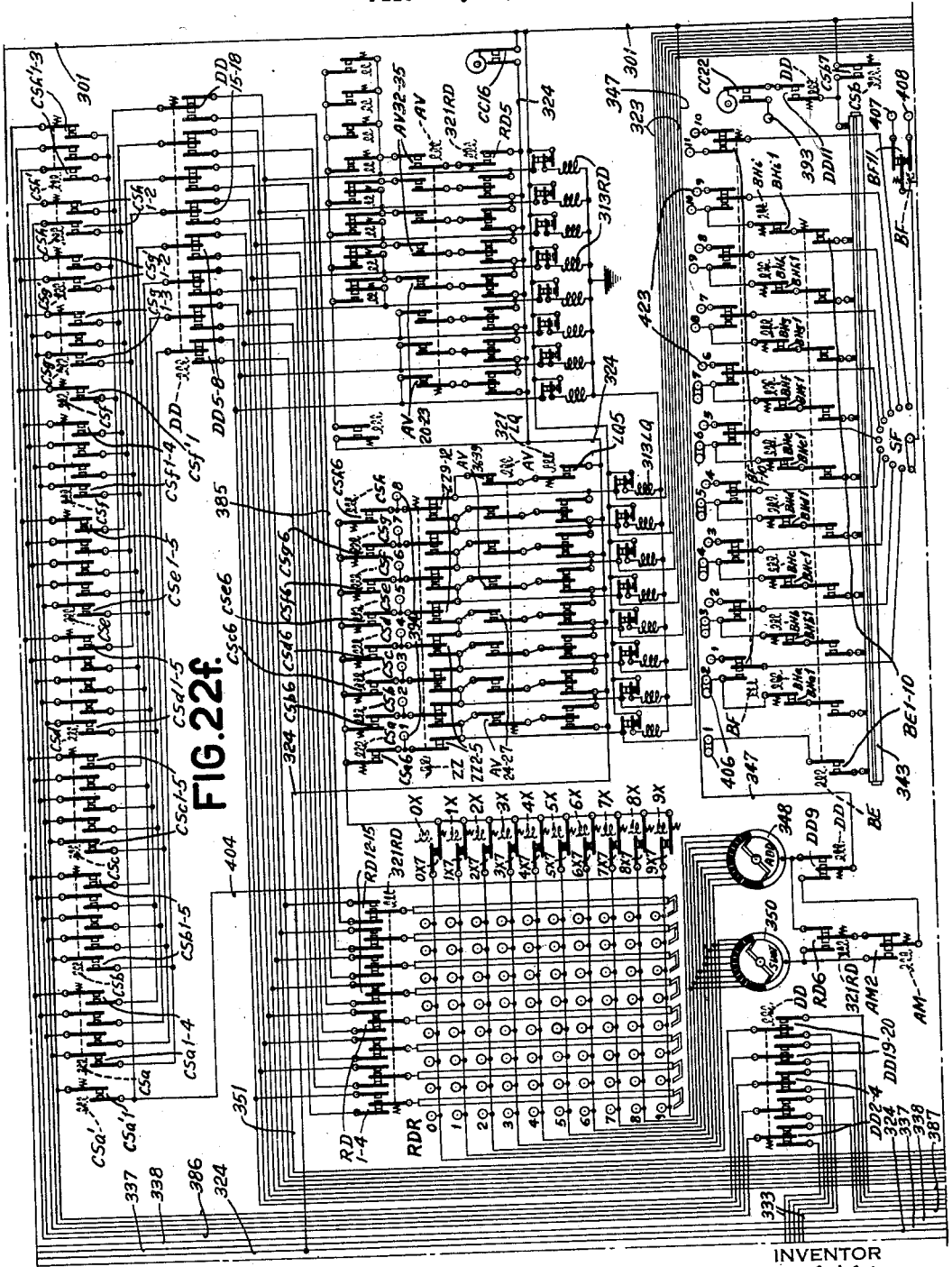

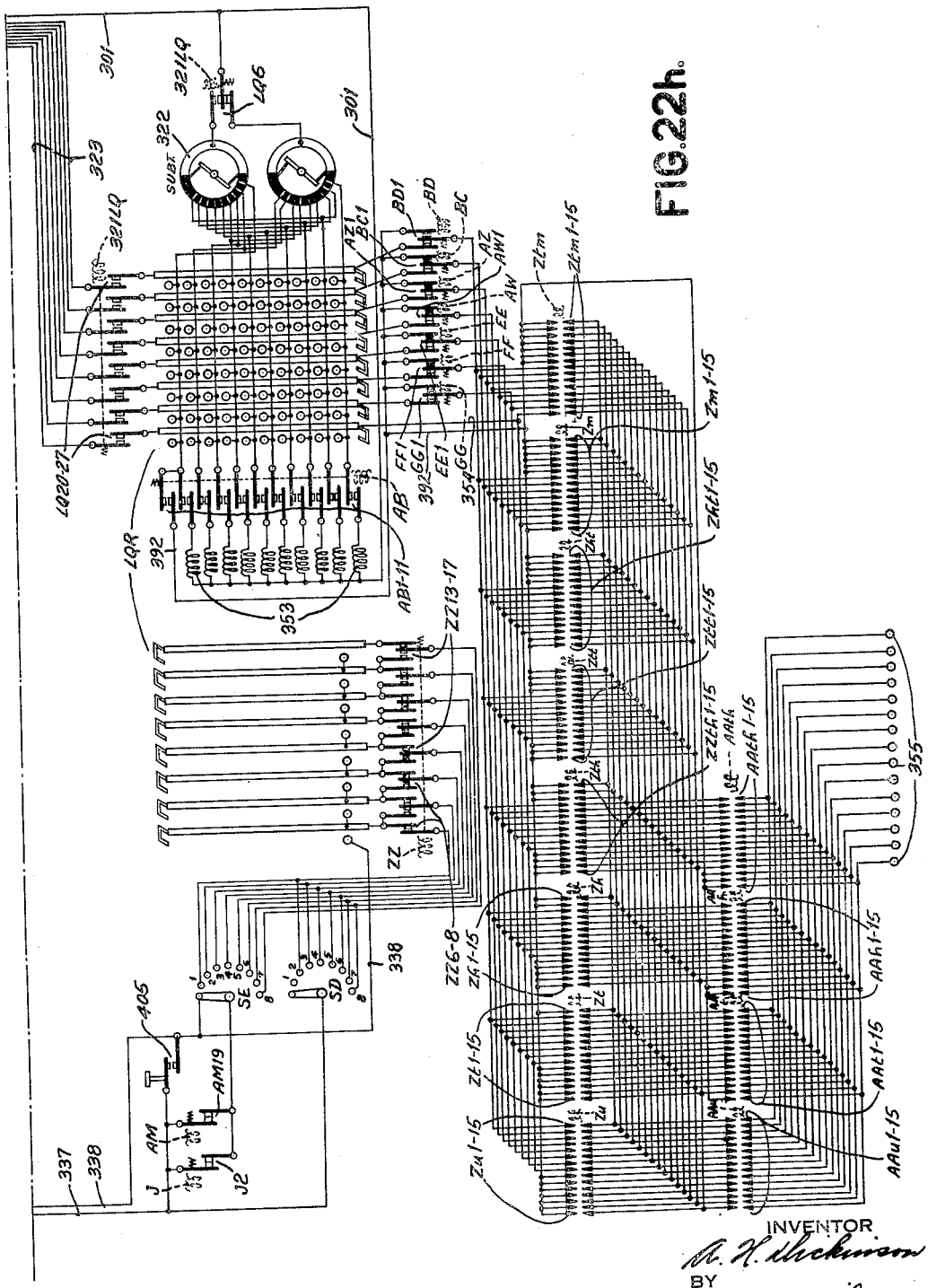

Jan. 5, 1943.  A. H. DICKINSON  2,307,116
DIVIDING MACHINE OF THE RECORD CONTROLLED TYPE
Filed May 14, 1941  25 Sheets-Sheet 20

INVENTOR
A. H. Dickinson
BY
ATTORNEY

Jan. 5, 1943.    A. H. DICKINSON    2,307,116
DIVIDING MACHINE OF THE RECORD CONTROLLED TYPE
Filed May 14, 1941    25 Sheets-Sheet 21
FIG. 25.    CHECKING RECORDS FOR WHICH FIXED PLACE
CORRECTION HAS PREVIOUSLY BEEN APPLIED TO NEAREST TWO DECIMALS
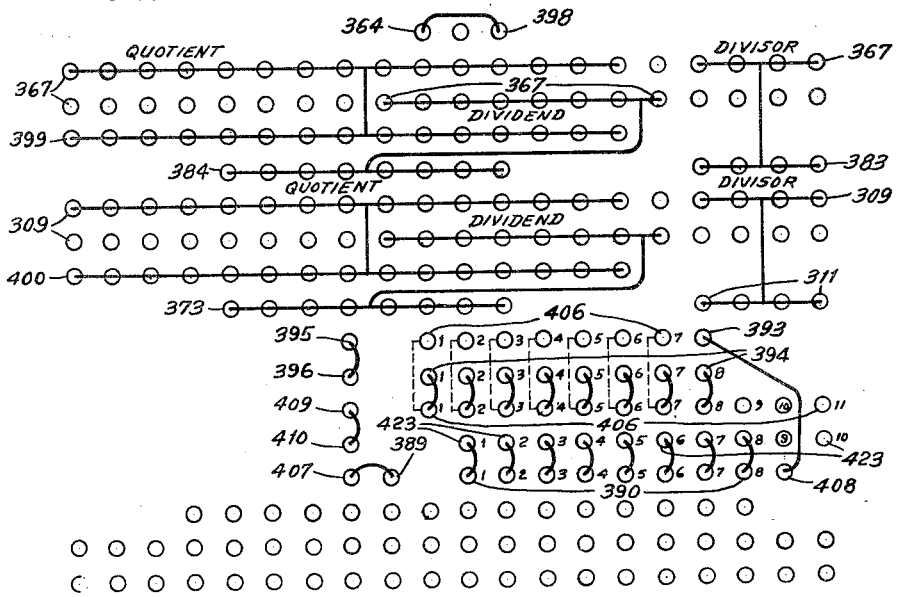
FIG. 26.    CHECKING DIVIDING TO WHICH FIXED
DIGIT CORRECTION WITHOUT "5" ENTRY BEING APPLIED
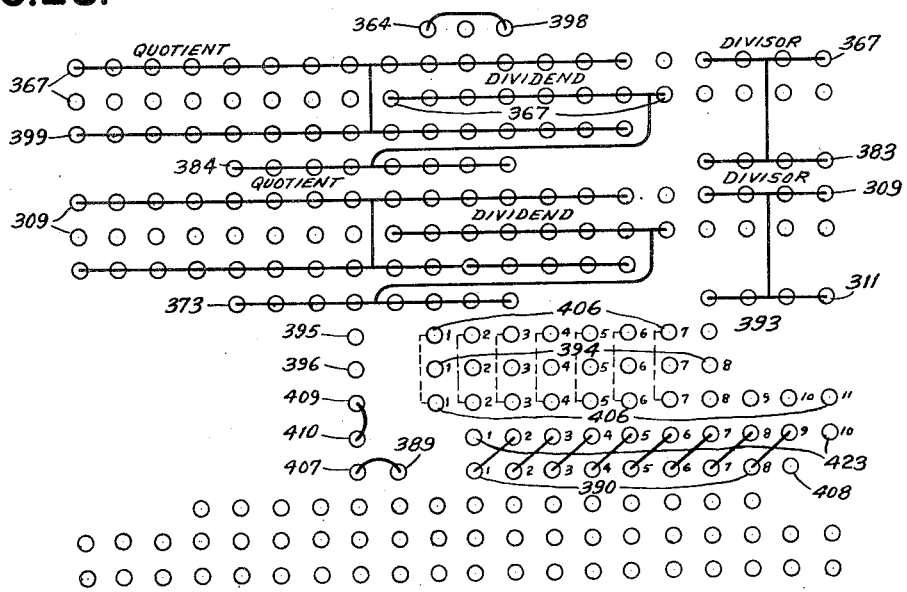
INVENTOR
A. H. Dickinson
BY
W. M. Wilson
ATTORNEY Jan. 5, 1943.  A. H. DICKINSON  2,307,116
DIVIDING MACHINE OF THE RECORD CONTROLLED TYPE
Filed May 14, 1941     25 Sheets-Sheet 22
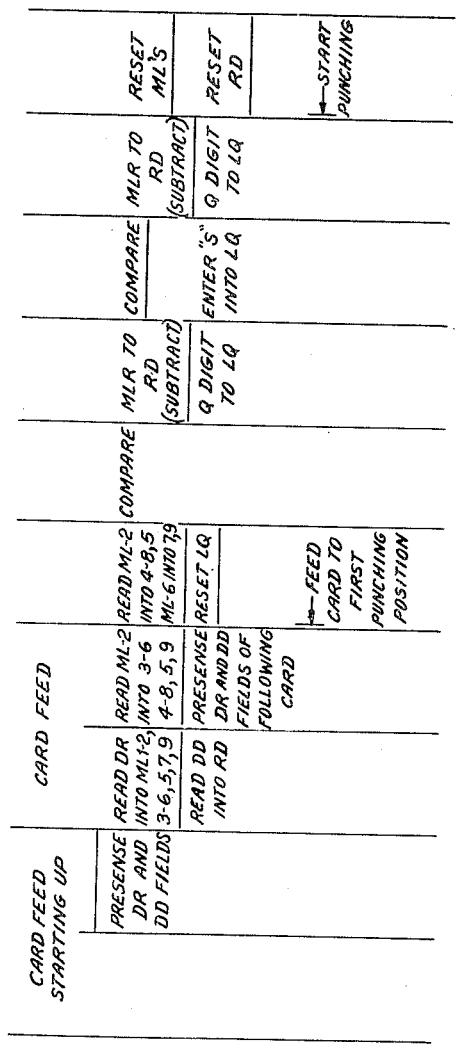
FIG.27.
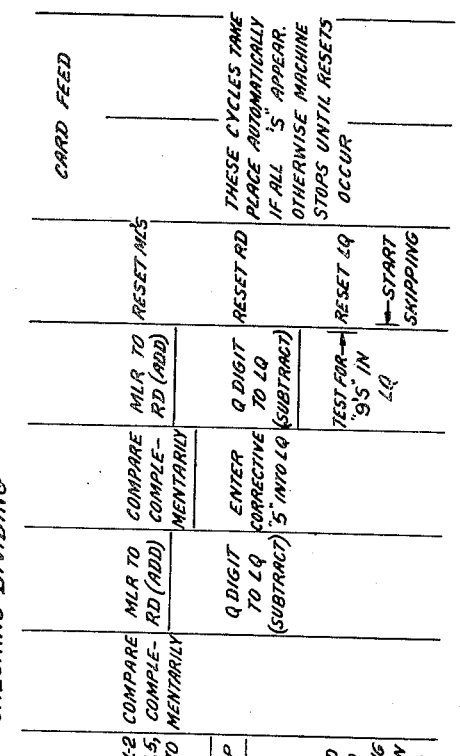
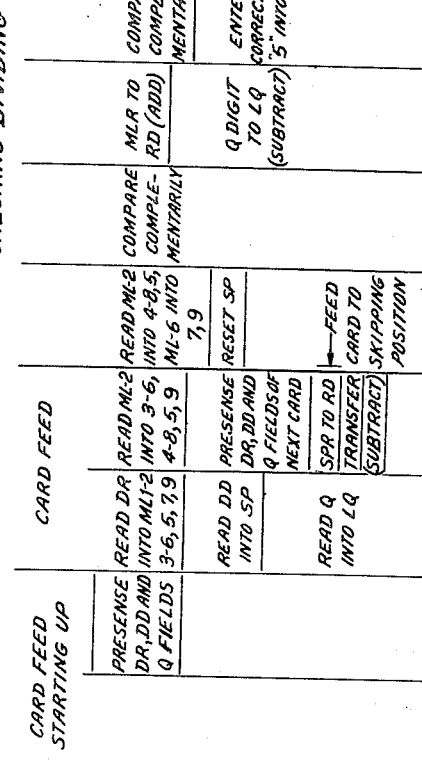
FIG.28.
INVENTOR
A. H. Dickinson
BY
W. M. Wilson
ATTORNEY Jan. 5, 1943. A. H. DICKINSON 2,307,116
DIVIDING MACHINE OF THE RECORD CONTROLLED TYPE
Filed May 14, 1941 25 Sheets-Sheet 24

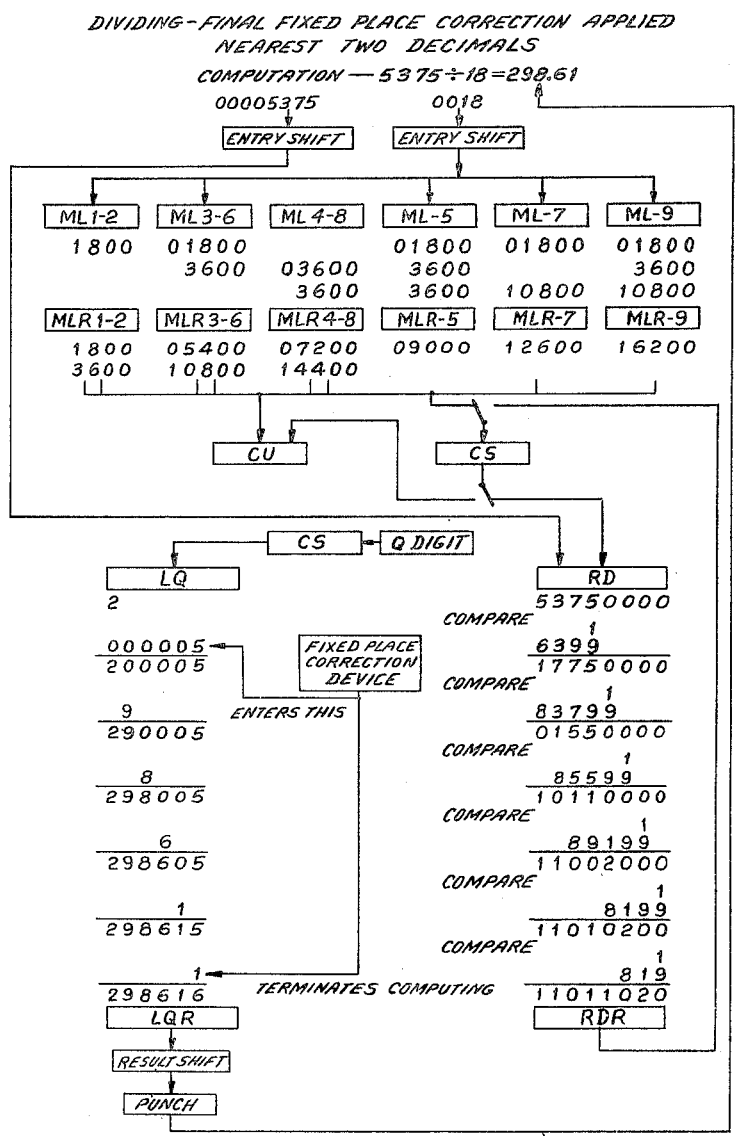

Patented Jan. 5, 1943

2,307,116

UNITED STATES PATENT OFFICE 2,307,116

DIVIDING MACHINE OF THE RECORD CONTROLLED TYPE

Arthur H. Dickinson, Scarsdale, N. Y., assignor to International Business Machines Corporation, New York, N. Y., a corporation of New York Application May 14, 1941, Serial No. 393,326

4 Claims. (Cl. 235—8)

This invention relates to calculating machines and more particularly to machines of the record controlled type which effect automatic division operations of dividend and divisor factor data Such forms of dividing machines have previously been devised, as is exemplified in U. S. Patents Nos. 2,165,220, 2,217,196, 2,224,774 and the machines shown therein are of the record controlled type which are capable of effecting automatic division operations with the recording of the quotient digits upon the same records which control the division computations.

It is the principal object of the present invention to provide a dividing machine with a checking mechanism for checking "rounded off" quotient amounts, such checking mechanism not only determining whether the quotient digits recorded on the card are accurate but also determining whether the "rounded off" recorded quotient digit is also accurate.

As exhibiting the usefulness of the present checking arrangement, it is shown in connection with a form of computation in which quotient digits are obtained to predetermined numbers determined by the sizes of the divisor and dividend and in which the last quotient digit is "rounded off." The term "rounded off" applies to that form of computation in which the dividing mechanism goes through an extra cycle of computation so as to determine the next quotient digid which is one order in excess of the predetermined and required number of orders. In some forms of accounting procedure, it is desirable that the last quotient digit be "rounded off," that is, it be supplemented a unit higher in the event that the next quotient digit secured will equal or exceed 5. In the present application, the term "rounded off" is adopted but the same form of computation has been variously known as "½¢ pickup," etc.

While it is the principal object of the present invention to check recorded quotient digits which have been previously rounded off, it is a still further object of the invention to enable such checking mechanisms to operate without requiring additional length of time over the number of cycles consumed in the original determination of the quotient amount and the cycle utilized for the "rounding off" operation.

A feature of the copending application of A. H. Dickinson, Serial No. 388,624, filed April 15, 1941, is the capability of the dividing machine to secure a number of orders of quotient digits which are determined by the denominational magnitudes of the dividend and divisor. Aside from the possibility of determining the number of quotient digits, the machine also possesses the capability of securing quotient recording at determined places so as to record the quotient amount as a decimal.

A still further object of the invention is the provision of an arrangement for checking such decimal "rounded off" quotients. In this respect, the number of cycles utilized for checking operations is controlled in accordance with the denominational magnitudes of the dividend and divisor and an additional cycle of operation ensues by precisely the same control mechanism as is utilized for controlling the number of cycles for quotient digit computing operations and the "rounding off" operation for the original computation.

In order to retain the principal and important advantages of the checking mechanism for dividing operations shown and claimed in the application of J. W. Bryce, et al., Serial No. 213,044, filed June 10, 1938, preferably the recomputation of division is carried out by the same instrumentalities shown in this latter application. The machine shown in the above application, as well as herein, effects checking division operations by the comparison of all nine digital multiples of the divisor with successive comparison portions of the dividend and in the present machine, checking of the computation is carried out in the same manner except that the comparing operations now consist of the comparison of the complement of the digital multiples of the divisor with the complement of successive comparison portions of the dividend. The successively derived quotients are then entered in an accumulator, which previously received the quotient amount as a true number, as a 9's complement of the quotient digits. This will bring such accumulator to represent a series of 9's which are tested for this condition. The appearance of all 9's at the extreme left of the accumulator will signify the accuracy of the quotient digits.

As shown and described in the application of A. H. Dickinson, Serial No. 388,624, the "rounding off" of the last quotient place is effected by the addition of a "5" to the additional quotient digit derived and in the checking arrangement forming a feature of the present invention this additional "5" is deducted from the required order in the accumulator which previously received the "5" additive entry. This deduction is preferably effected by the complemental process but it is, of course, understood that an equivalent arrangement may be utilized in this, or other machines, so that the deduction may be effected by the reverse actuation of the accumulator wheel which previously received the additive "5" entry. This subtractive "5" entry should, if the previously "rounded off" operation was properly effected, also bring the last quotient place order to 9 which is tested when the all nines condition of the accumulator is determined.

While many of the features of the present invention are of particular importance and of value in record controlled machines, it is to be understood that the present embodiment is merely illustrative and not restrictive. Such features could readily be incorporated in other forms of dividing machines such as the key controlled type with or without modification and it is to be understood that the invention may be applied and incorporated in other forms of dividing machines without departing from the spirit of the invention.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 1a, taken together with Fig. 1a to the right of Fig. 1, show the somewhat diagrammatic view of the various units of the machine and the drive therefor;

Fig. 7 is another fragmentary sectional view of the accumulator unit of Fig. 2, the view being taken substantially along line 7—7 of Fig. 2 looking in the direction of the arrows. This view in particular shows the readout structure in cross section;

Fig. 8 is an elevational outside rear view of the accumulator unit of Fig. 2, the view being taken from the left of Fig. 2, looking to the right;

Fig. 11 is a somewhat diagrammatic view showing the card handling and sensing section of the machine. The card handling section is shown diagrammatically in Fig. 1a;

Fig. 14 is another detail sectional view of certain parts of the comparing unit, the section being taken substantially on line 14—14 of Fig. 12, looking in the direction of the arrows;

Fig. 15 is a fragmentary detail view of the comparing commutator and brush devices of the comparing unit, the view being taken substantially on line 15—15 of Fig. 13, looking in the direction of the arrows;

Fig. 19 is a cam timing diagram showing the timing of the various CC cams;

Fig. 20 is a cam timing diagram of the FC cams; and

Fig. 21 is a cam timing diagram of the XC cams;

Figs. 22a, 22b, 22c, 22d, 22e, 22f, 22g and 22h, taken together, show the complete circuit diagram of the machine. In arranging these figures, Figs. 22a to 22d are arranged vertically in the order named with Fig. 22a at the top. Figs. 22e to 22h are also arranged vertically in the order named with Fig. 22e at the top and such figures are placed to the right of Figs. 22a to 22d, respectively.

Figs. 23 to 26 inclusive, show the plugging on the insertible plugboards for different checking calculations which the machine is adapted to perform. Accompanying each figure is a suitable descriptive legend designating the computation for which the plugboard is plugged;

Figs. 27 and 28 are sequence of operation diagrams for different typical calculations which the machine is adapted to perform. These diagrams show the successive cycles of operation for these different computations. They also bear suitable designating legends.

Figs. 29 to 32 inclusive, are flow diagrams of typical computations as performed by the machine. They show illustrative problems and the manner of effecting entry into the various receiving devices. Each diagram is accompanied by a designating legend giving the particular calculation which is diagrammatically illustrated.

Fig. 33 is a flow diagram of a computation in which dividing is carried out to two decimal places with rounding off of the last quotient digit.

Machine drive

Figure 1:
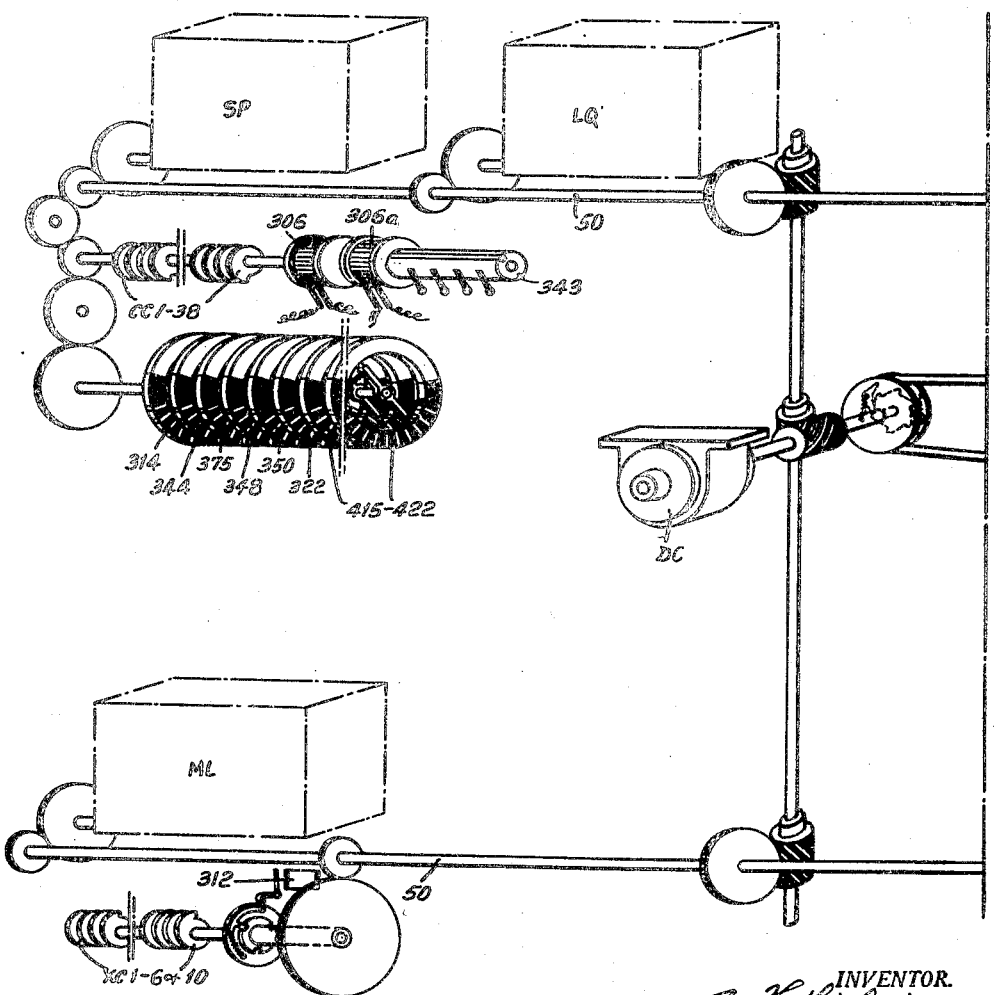

Referring first to Figs. 1 and 1a, in general the machine comprises four accumulating units which are respectively designated SP, LQ, RD, and ML. It may be explained that the unit ML contains accumulators and readouts from which all of the nine digital multiples of the divisor or multiplicand can be derived, depending upon whether the machine is used for division or multiplication. On division LQ receives the quotient amount and RD the dividend. The SP unit is utilized on checking computations. The various accumulating units are driven by the gearing delineated from the driving motor M. The machine is also provided with a direct current generator D. C. The card handling and feeding section of the machine is of customary form like that shown in Daly Patent No. 2,045,437 and is driven in the usual manner. The FC cam contacts are also driven in the customary manner in synchronism with the drive of the card handling section of the machine. The units designated NR and TT are electromechanical relay setup units of the general construction shown in Figs. 16 and 17. Each of these units is adapted for reset from the constantly running drive shaft by the customary one revolution clutch arrangement. The reset magnets for the units are respectively designated 321NR and 321TT. Two comparing units are provided each designated CU. These comparing units are of the form shown in Figs. 12 to 15 inclusive, and such units are adapted to be continually driven from the drive shaft.

Also driven from the main drive shaft are a group of CC cams generally designated CC on Fig. 1 and given identifying suffix numerals, such as CC1 on the circuit diagram. There are also two impulse distributors 306 and 306a driven as indicated, a constantly running commutator 343 and in addition there are also provided sixteen impulse emitters designated as shown in Fig. 1.

Referring to the XC group of cam contacts, such cam contacts generally designated XC are driven from the drive shaft through a one revolution clutch which is controlled by magnet 312. The driven side of the one revolution clutch receives its drive from the main drive shaft through the gearing shown, which drives the XC group of cams one revolution for each three revolutions of the main drive shaft.

*Accumulators and entry receiving devices*

As stated, the SP, LQ, RD, and ML units are accumulators of electromechanical type. These accumlators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in the Lake and Pfaff Patent No. 2,232,006, dated February 18, 1941. This accumulator will now be briefly described.

Figure 2:
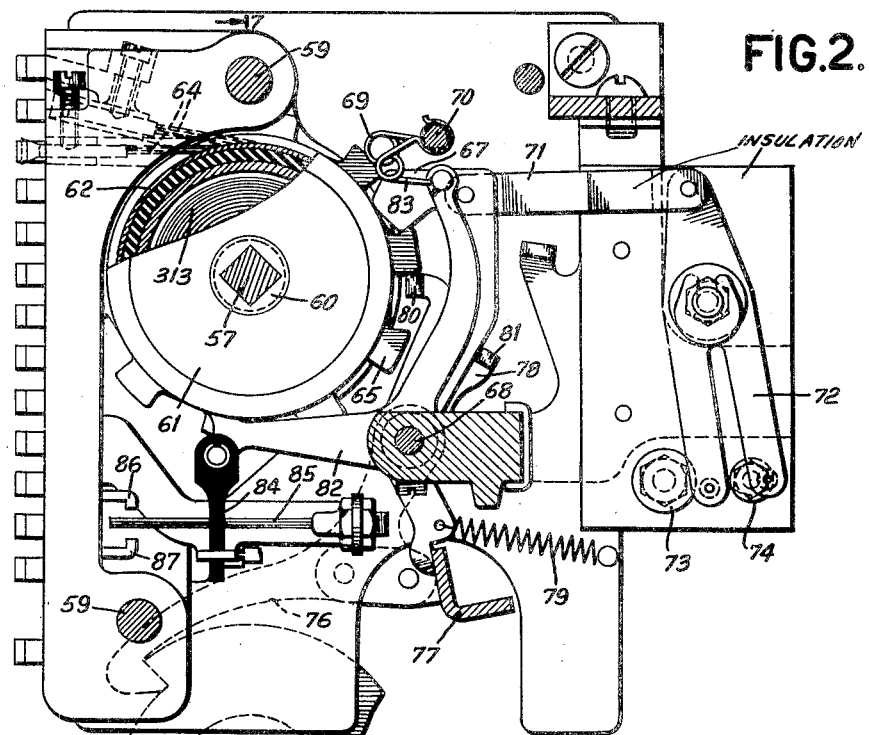
Fig. 2 is a detail sectional view of the accumulator taken along the dividing line between two adjacent denominational orders of such accumulator or entry receiving devices.
Figure 10:
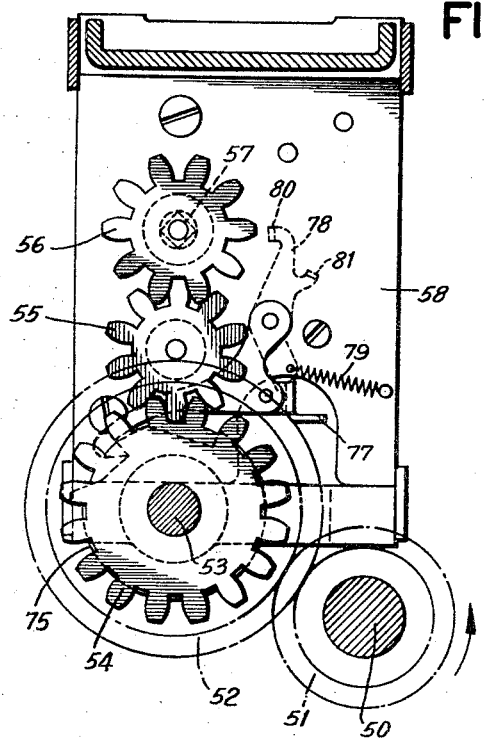
Fig. 10 is an outside view of the accumulator, viz. the view taken from the right of Fig. 8 and looking to the left and which view shows the gear drive for the accumulator unit.

In lieu of driving the accumulator by the customary jaw clutch, the present accumulator which is shown in Figs. 2 and 10 inclusive, is of the form in which a magnetic clutch is used for driving the accumulator element. Suitable circuit making and breaking devices are provided to enable the differential clutch action to take place at a differential time of the cycle depending upon the time of sensing. These devices cause the magnetic clutch to remain in action until a definite point in the cycle whereby definite amounts of rotation of the accumulating wheel are obtained in accordance with the initiating differential impulse.

Figure 9:
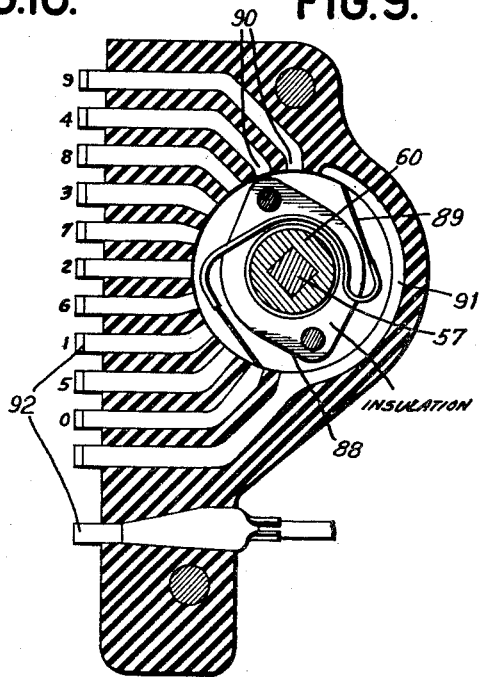
Fig. 9 is a detail view of the readout commutators and wiring to the plug prongs, the section is taken substantially on line 9—9 of Fig. 8.

Refering to Fig. 10, 50 is the drive shaft which is in constant rotation. This drive shaft through suitable gears such as 51 and 52 drives an accumlator drive shaft 53. Shaft 53 carries a gear 54 which, through an idler 55, drives a gear 56 carried by a square shaft 57 which is thus also in constant rotation. The shaft 57 is suitably supported in bearings carried in the side plates 58 of the accumulating unit. Between the side plates are suitable spacing cross bars 59 (see Figs. 2 and 7), holding the plates in spaced relationship and aiding in the support of the accumulator mechanism. The accumulator units may be made in any desired number of orders. On the square driving shaft is a fitted bushing 60 (see Figs. 7 and 9). Around this bushing 60 there is rigidly secured a magnet yoke 61.

Carried about the periphery of yoke 61 and insulated therefrom and from each other there are a pair of channel shaped collector rings 62 to each of which is connected one end of a magnet winding 313 secured and positioned within the yoke. Trailing against each ring 62 there is a brush 64 which is carried in a suitable brush holder. The yoke with its winding rings constitute the driving element of the accumulator clutch whose driven elements include the toothed wheel 65 and tens carry cam 66. The wheel and cam are riveted together as indicated in Fig. 7 and the rivet fastenings also afford driving means for the readout brush holders. Such parts are mounted for free rotation on the bushing 60. As shown, there is a slight air gap between the end of the yoke 61 and the carry cam 66. Wheel 65 is provided with ten teeth (see Figs. 3 and 4), between two of which, when the wheel is at rest, there extends the nose of a lever 67. Such lever is freely pivoted on a rod 68. Such lever is held in the position shown in Figs. 2 and 4 by a looped wire spring 69 connected at one end to a rod 70 and its other end to a pin in the nose of lever 67. The spring 69 and the lever 67 form a toggle with the pin urging the nose in contact with the wheel 65. When the clutch magnet winding is energized, the wheel 65 and the cam member 66 are magnetically clutched to the yoke 61 and commences to rotate therewith.

Figure 3:
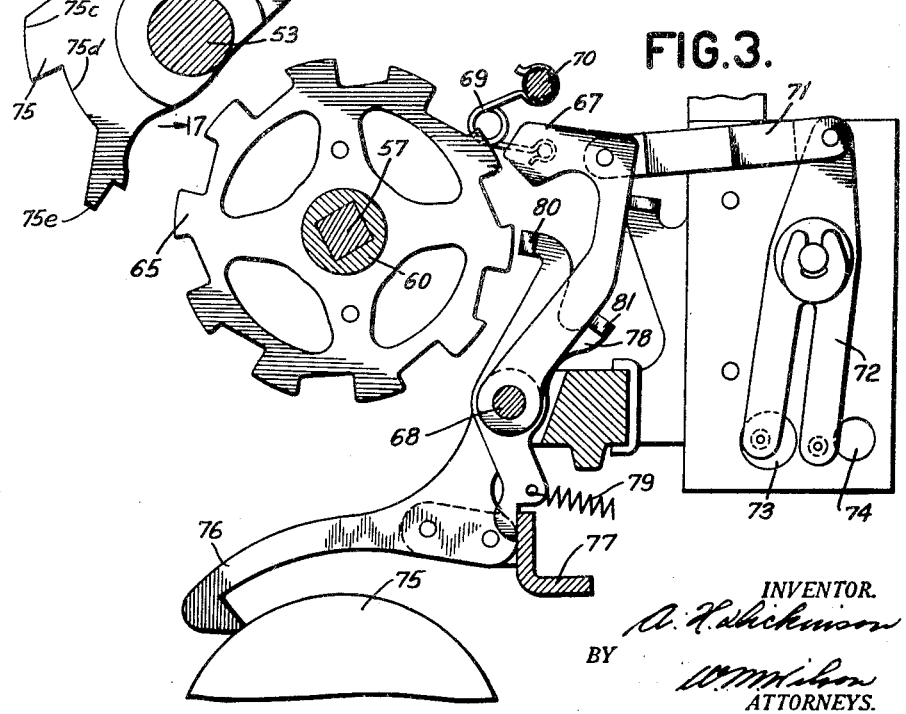
Fig. 3 shows certain parts of Fig. 2 in a different position.

Energization of the clutch magnet is afforded by the usual differentially timed impulse which may be received from the sensing section of the machine or from other controls affording an initiating timed impulse. As the wheel 65 commences to turn, the edge of one of its teeth bears against the upper inclined edge of the nose on lever 67 and cams the lever clockwise as viewed in Fig. 2 about its pivot 68 carrying the lower end of the spring 69 to the right of a line between centers 68 and 70. This position of the parts is shown in Fig. 3. The parts will remain in such position until wheel 65 is again disengaged from the driver. Lever 67, when rocked by a tooth, shifts an insulated link 71 shifting a contact member 72 to a position shown in Fig. 3. When in this position, a circuit is completed through the forked member and a contact spot 73. This establishes a holding circuit to maintain the clutch magnet energized.

It may be mentioned that before shifting, an arm of member 72 was establishing contact with a contact point 74. The arrangement is such that a make before break action occurs as the lever shifted. It will be understood that the clutch magnet is energized at a differential time and that the amount that the wheel 65 is rotated is dependent upon the differential time of receiving an impulse. Declutching action at a fixed time in the cycle is brought about as follows: On shaft 53 there is a cam 75 with which a follower 76 cooperates. The follower is integral with a bail 77 which extends across a plurality of units of different denominational orders. For each order there is a lever 78 pivoted on rod 68 and having a lower tail portion bearing against the ball 77 (see Figs. 2, 3, and 4). Each lever is provided with a spring 79 which urges the follower 76 against its cam 75. Each lever 78 has lateral extensions 80 and 81, the former lying in the plane of the wheel 65 and the latter extending behind lever 67.

Figure 4:
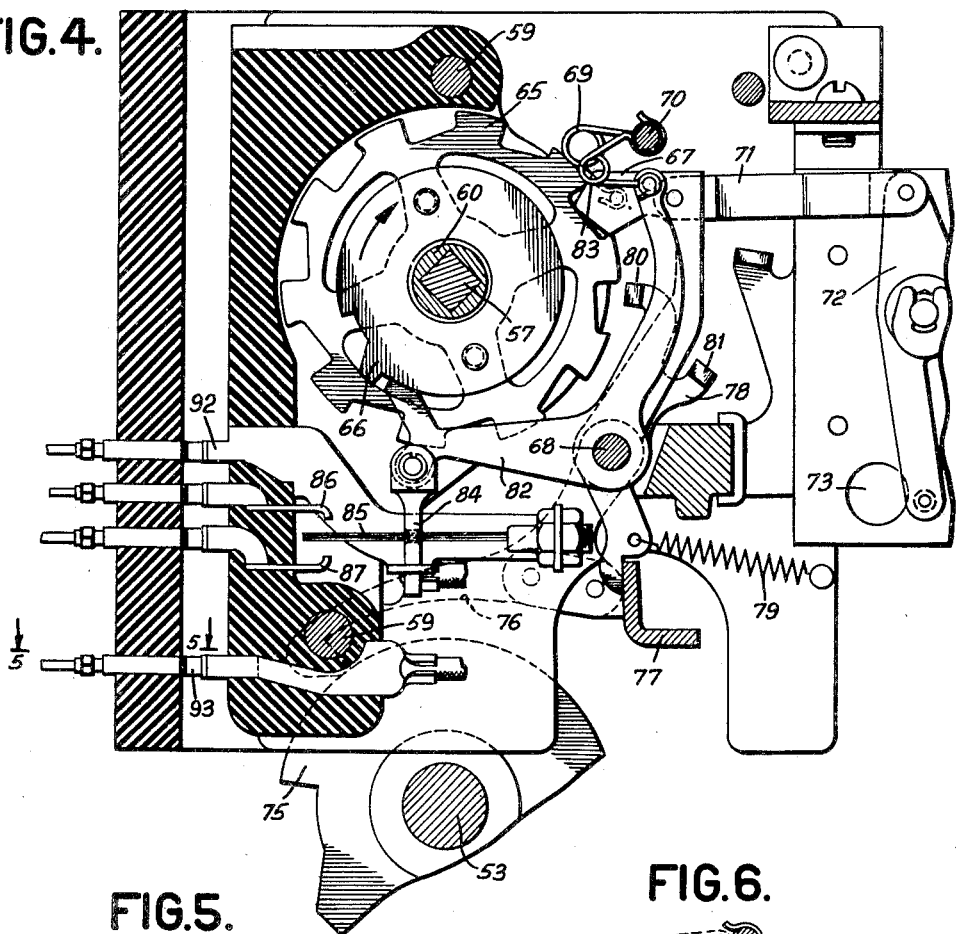
Fig. 4 is another sectional view of one of the accumulator units, the view being generally similar to Fig. 2, but taken on a somewhat different vertical plane.

The operation is such that during the entering period of the cycle the follower 76 rides on the intermediate concentric portion of cam 75 holding ball 77 and through it the lever 78 in the position shown in Figs. 3 and 4. At the zero index point in the cycle, the follower 76 drops off the cam and the ball 77 allows the lever 78 to rock rapidly in a counterclockwise direction bringing projection 80 into the space between two of the teeth of the wheel 65. At the same time, projection 81 engages the lever 67 swinging it back from the position of Fig. 3 to that of Fig. 2 thus causing the holding circuit of the clutch magnet to be broken. It may be mentioned that the clutch magnet circuit is established by the member 73 and is broken when 72 moves off this contact.

When the clutch magnet circuit is interrupted, projection 80 will engage the leading edge of a tooth on the wheel 65 and positively interrupt further rotation of the now released accumulating wheel. At the same time, the trailing edge of the engaged tooth is overlapped by the nose of the lever 67 to prevent retrograde movement of the parts. Continued rotation of the cam 75 will, through portion 75c thereof, again release wheel 65 for a possible tens carry operation and portion 75d will again interrupt the wheel after a single step of movement. Finally the highest portion 75e of cam 75 will cause lever 76 to rock an additional amount in a clockwise direction to restore the tens carry lever 82, if the same had previously been rocked counterclockwise by the carry devices now to be described.

Carry mechanism

Figure 6:
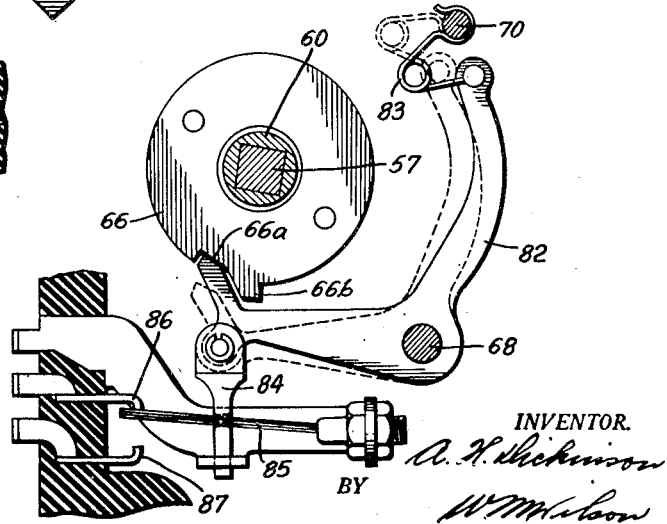
Fig. 6 is a detail view of the tens transfer or carry cam and related parts.

Carry cam 66 (Fig. 6) is provided with a notch 66a and a rise 66b. The carry lever 82 pivoted at 68 has its nose held against the carry cam by means of a looped spring 83, which urges the carry lever 82 clockwise. The lever 82 carries an insulating depending member 84 through which the brush 85 extends to make contact with either of contacts 86 or 87. Normally the parts occupy the relation of Fig. 4 with the brush lying intermediate the contacts. When the wheel 65 has been advanced to a "9" position, cam 66 is in the position shown in Fig. 6, wherein the nose of the lever 82 is in the notch 66a, thereby affording contact between brush 85 and contact 86. When the wheel 65 passes through "0" rise 66b on cam 66 will rock the lever 82 to its dotted line position in which position spring 83 will now hold it since the point connection between the spring 83 and the lever 82 is now to the left of the line between centers 70 and 68. As a result the brush 85 is shifted to engage contact 87 and will remain in such position until after the carry portion of the cycle when the high portion 75e of cam 75 will cause lever 76 to rock lever 82 back to the position of Fig. 4.

Readout structure

Attached to each accumulator wheel is the readout mechanism. It will be understood that any desired number of brush sections can be provided driven by a single accumulating wheel 65 (see Fig. 7). According to the present invention, in some instances, four brush structures are driven by a single accumulator wheel and in other instances two brush structures are driven by a single wheel. Fig. 7 shows the four brush structure arrangement. Such structure comprises a holder 88 of insulating material having a wire brush 89 fitted within a groove in the holder. The groove, it will be understood, conforms with the general shape of the center part of the brush. In the plane of each brush 88 there are commutator segments 90 and a common arcuate segment 91. Each brush 89 serves to make electrical connection between the related common segment 91 and each of the segments 90 according to the position of the brush upon advance of the accumulating wheel 65. Since the wheel 65 has ten teeth, it moves a tenth of a revolution for each unit entered. Segments 90 are spaced one-twentieth of 360 degrees apart so that the brush 89 stops at the segments in the order in which they are numbered in Fig. 9. In the position shown, zero segment 90 is connected with the common segment 91.

Figure 5:
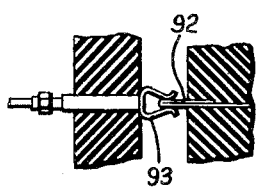
Fig. 5 is a detail view taken substantially along line 5—5 of Fig. 4.

The segments 90 and 91 as well as the circuit to the carry brush 85 terminate in beveled contacts 92 (see also Fig. 5) so that ready connection can be made to the unit by means of the bifurcated blades 93.

Comparing units

The comparing units of the present machine are of the form more fully described in the copending United States application of Ralph E. Page, Serial No. 117,493, filed December 24, 1936. As shown in Fig. 1a, two comparing units are illustrated, each designated CU. These comparing units receive their drive from the drive shaft 50 which drives shaft 94 geared by gears 96 to the drive shaft 97 of the comparing units. It may be explained that for dividing calculations the comparing unit drive is maintained in constant motion.

Comparing units will now be more specifically described. Each comparing unit comprises supporting side plates 95 which are secured together by suitable cross members which also afford support for various parts such as magnets, bails and springs. Each comparing unit is provided with a drive gear 96 (see Figs. 12 and 1a). Such gear 96 is fast to the comparing unit drive shaft 97 (see also Figs. 12, 13 and 14). Each shaft 97 has secured to it a pair of bail operating cams 98 and a pair of restoring cams 99 and 100. Suitably secured in the side plates is a cross shaft 101 on which are pivotally mounted in interspersed relation two series of sectors, one of which is designated 102 and the other of which is designated 103 in Fig. 13. It will be understood that there is a pair of such sectors 102 and 103 for each denominational order in which comparison is to be effected. The sectors are adapted for pivotal rocking movement on the supporting shaft 101 and timed rocking movement is imparted to the sectors by bails 104 and 105 which bails are each connected to their respective sectors by springs 106.

Figure 13:
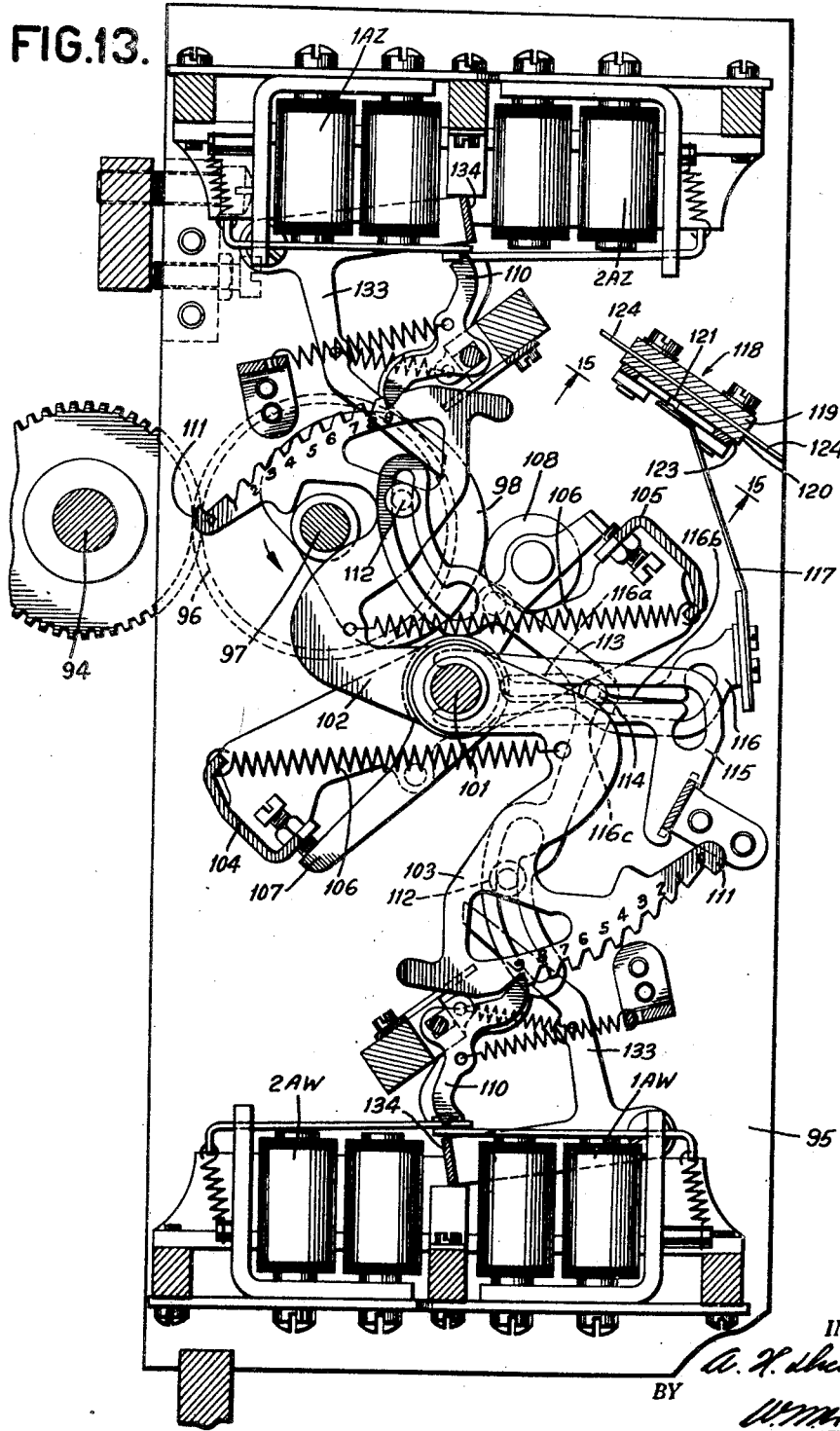
Fig. 13 is a detail sectional view of the parts for one order of a comparing unit, the section being taken along line 13—13 of Fig. 12.

Rocking movement is imparted to the bails by bail actuating levers 107 (one of which only is shown in Fig. 13). Each of such levers carries a cam follower roller 108 which cooperates with a cam 98. The cam follower rollers 108 are maintained in cooperation with cams 98 by means of springs 109 which are attached to the bail arms and to a fixed support as shown in Fig. 14. Differential movement of the sectors is determined by magnetically tripped stop pawls 110 (see Fig.

13). Such stop pawls are normally latched by their related magnet armatures out of the path of the ratchet teeth on the sectors. The comparing magnets are generally designated AW and AZ. It will be understood that the AZ magnets control the related upper sets of sectors 102 and the lower comparing magnets AW control the movement of the lower sectors 103. For compactness of construction the magnets are disposed in a somewhat staggered relation, which will be apparent by inspection of Fig. 12. In Fig. 13, the two lower comparing magnets 2AW and 1AW are adapted to control two adjacent sectors, one of which is behind the other.

Upon energization of a comparing magnet such as 1AW at a differential time, its armature will release the stop pawl 110 which will swing under the influence of its spring to engage the sector ratchet and differentially stop it in a position corresponding to the differential time at which an impulse is received to energize the comparing magnet. In Fig. 13 the sector 103 is shown as stopped at the "9" index point position and likewise the sector 102 is also shown stopped at the "9" index point position. In the event that there is no energization of a comparing magnet the stop pawl 110 will stop its related sector at the "0" index point position due to the high shoulder 111 beyond the zero position.

Each sector 102 and 103 carries a pin 112 and each of these pins extends through slots in a differentially floating link 113. Each differential link has a pin 114 carried thereby and extending therethrough. Each such pin 114 is slidably guided for in and out movement with respect to the shaft 101 by means of a slotted member 115. Also cooperating with each pin 114 is a member 116. Member 116 has a cam slot portion 116a comprising a straight portion, another straight portion 116b and a connecting sloping portion 116c. The relation of parts is such that if sector 103 has the same setting as sector 102, for example, at the "9" index point position as shown in Fig. 13, the pin 114 will remain at the center in the sloping cam portion 116c. Under this condition, there will be no movement of the arm 116. On the other hand, when pin 114 is caused to move to the right as is the case when sector 102 moves to a greater extent than sector 103, then member 116 will be rocked upwardly or counterclockwise about 101 as a pivot. This counterclockwise movement of 116 occurs when the amount set in sector 102 is less than the amount set in sector 103. On the other hand, when the amount set in sector 102 is greater than the amount set in sector 103, the pin 114 will move to the left or into the 116a cam slot portion of 116. This will cause clockwise swinging of 116 about 101 as a center.

By the above mechanism for any order of the comparing unit, it is possible to compare two numbers in a given order and to get three selective settings of 116. One setting is made when the numbers are equal in which case there is no movement imparted to 116, and it remains in the center position. The other conditions are an upward or downward displacement of 116.

It will be understood that in order to provide for comparison of multi-denominational numbers that there is a pair of sectors 102 and 103 for each order and further that there is a member 116 for each order. Each member 116 has secured to it a brush contact bifurcated wiping member 117 (see Fig. 15). In Fig. 15 there are shown six wiping members 117. The four to the extreme left are in non-shifted or middle position. The second from the right is in upper position indicating that its sector 103 has moved to a less extent than its related sector 102 and the extreme right hand wiping member is in down position, indicating the reverse sector condition.

Suitably mounted upon the side plates in cooperation with the brush members 117 is a comparing commutator generally designated 118. This comparing commutator comprises a base plate 119 and a face strip 120 of insulating material supported by other strips of insulating material 121. Suitable fastening rivets secure the parts together and secured to the face of 120 are common contact strips 122 and 123. Located between the strips 119 and 120 are a series of terminal plates 124 having portions which extend beyond the edges of the commutator for circuit connections. Parts of terminal plates 124, to a certain extent, resemble triangles with their points extending to the right, note the dotted line extension in Fig. 15. Carried on the face of the strip 120 are a number of contact plates 125, each of which is connected to a related terminal plate 124. The contact strips 122 and 123 are serrated and arranged so that the serrations pass each other and extend into the spaces between the contact plates 125. The ends of the serrations of 122 and 123 and between 125 are blocks of insulating material 121 having contact rivets 126 which connect with the respective terminal blocks 124.

It may be explained that the comparing commutator is sectionalized for making comparison of five orders with five orders. With the setting shown for the five brushes to the extreme left in Fig. 15, the circuit will come in at the wire marked "In" to block 124. It will extend through 125, through the brush 117, thence to plate 122 and out on the circuit labeled "DR less than DD." However, assume that the right hand brush is in the middle position. In this event, the circuit would extend from the "In" wire to contact block 125, through brush 117, through the segment 126 of the next order to the left, thence through contact block 125, through the brush 117 of this order, again through 126 and 125 pertaining to the next orders, through the brushes 117 of these orders, through the blocks 126 and 125 and out on the "Out equal" wire. On the other hand assume the right hand 117 brush of the five order unit is in down position. The circuit comes in on the "In" wire, through the contact block 125, through the brush 117 and is then completed through the lower serrated member 123 to an out line labeled "DR greater than DD."

With reference to the comparing commutator, it may be explained that the first brush from the right in any group which has moved off from the central or equal position effects the control. For example, assume that the fifth brush 117 from the left in Fig. 15 is in middle position and the fourth brush from the left is in upper position, then in that event the circuit would be completed from the "In" line, through the terminal block 124, through block 125, through the brush 117 in say, the tens order, through spot 126, through block 125, through brush 117 to contact plate 122 and out. In short, it may be stated that it is the highest order shifted brush which is controlling for purposes of comparison.

In the use of the comparing units, it is desirable to set up one side of the comparing unit once and then hold the setting and it is also desirable that the other side of the comparing unit be set up, then restored and set up again for a following comparing cycle. In order to provide for this operation, certain bail movement controlling mechanisms are provided which will now be described.

Referring to Fig. 14, it will be noted that the bail 105 is provided with a spring pawl 127 and that bail 104 is provided with a spring pawl 128. Arranged to cooperate with 127 and 128 are pawls 129 and 130 which pawls may be considered as normally having the latched position as shown. Upon clockwise swinging of bails 104 and 105 the pawls 127 and 128 first yield and ride upon the face of pawls 129 and 130. When the end of the bail movement is reached, the pawls 127 and 128 snap into the position shown and thereafter both bails 104 and 105 will be latched against return movement. If it is desired, therefore, to retain the setting of an upper sector 102 (Fig. 13) magnet 321AZ (Fig. 14) is left deenergized. So long as this magnet is left deenergized, the previous setting of sector 102 or a plurality of such sectors will be retained.

Referring now to the lower sector 103, it is desired that this sector be reset on each comparing cycle. Accordingly, magnet 321AW (Fig. 14) is energized. Upon the attraction of its armature, pawl 130 will swing under the influence of its spring in an anti-clockwise direction out of intercepting relation with pawl 128. Accordingly, bail 104 can have an anti-clockwise restoring movement to restore the sector or sectors 103 cooperating therewith.

Arms 132 (Fig. 14) are oscillated by cams 99 and 100 once each machine cycle and such arms are provided for the purpose of knocking off the armatures of magnets 321AZ and 321AW whenever any armature has been tripped and such arm is also adapted to restore the pawls 130 and 129 to their latched position. When the bails 104 and 105 are swung counterclockwise to restore the sectors, the pawls 110 (Fig. 13) ride up on the smooth high parts of the sectors beyond the nine ratchet tooth position and thus displace the pawls out of the line of the ratchet teeth. At about this time the leading edge of a bail such as 104 engages a pivoted armature restoring member 133 and rocks it clockwise to displace the bail 134 and therefore knock off the armatures and relatch the stop pawls 110.

Electromechanical relay unit

Referring to Figs. 1 and 1a there are three electromechanical relay units which are generally designated NR and TT. These units are identical in construction, except for the number of contacts and only one of them will be described. Each unit has a drive shaft 135, the drive shaft being adapted to make one-quarter of a revolution for each revolution of the main drive shaft 50 when the related one revolution clutch (for example that controlled by magnet 321NR, Fig. 1) is operated.

Figure 17:
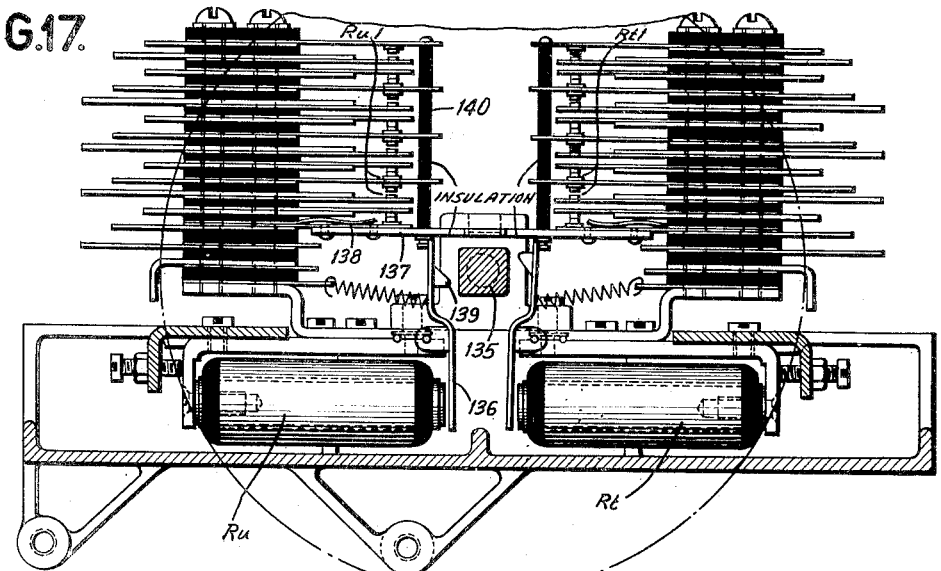
Fig. 17 is a detail sectional view of such unit, the section being taken substantially on line 17—17 of Fig. 16.
Figure 16:
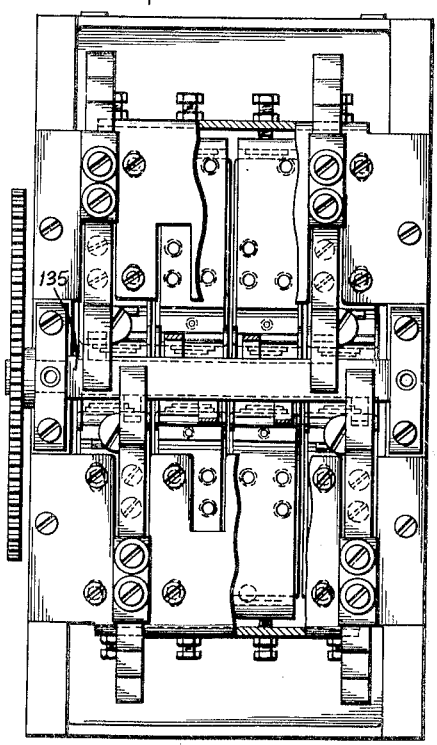
Fig. 16 is a top plan view of an electromechanical multicontact relay unit which is used in the machine for cycle control and presensing control purposes.

Referring now to Figs. 16 and 17, the shaft 135 is suitably journalled as shown and intermediate the journals the shaft is provided with a square cross section as clearly shown in Fig. 17. In general, the contact operation of this unit is as follows: Each relay unit comprises the required contacts which may include normally closed contacts, transfer or shift contacts and normally open contacts. Each set of contacts has a tripping magnet associated therewith. Such tripping magnets for the NR unit are R$u$, R$t$, R$h$, R$th$ and N$u$, N$t$, N$h$, N$th$, N$tt$, N$ht$, N$m$ and N$tm$. Similar tripping magnets in the TT unit are designated TT$a$ to TT$o$ inclusive. Upon energization of any tripping magnet, its contacts will be tripped so that they trip from reverse position from that shown. Such contacts thereafter remain in such shifted position until the shaft 135 makes one-quarter of a revolution, whereupon the contacts are mechanically restored to their initial position. Such contacts are then latched in such position. The rotation of the shaft 135 also mechanically knocks off the armatures and also mechanically restores the contacts to their initial position.

The details of these electromechanical relay units are fully shown and described in the patent to James M. Cunningham, No. 2,161,614, dated June 6, 1939.

Referring to Fig. 17, R$u$ is one of the tripping magnets. Cooperating therewith is a spring retracted armature 136 which has its upper portion in contact with a latch piece riveted to an insulating strip 137 to which the lowermost contact blades are riveted. Suitable springs such as 138 bias the lowermost contacts and the strip 137 downwardly. The insulating strip 137 extends along and overlies the square shaft 135. It will be self-evident that upon energization of a magnet R$u$, related contacts will shift to reverse position and remain in such position. Thereafter, upon one-quarter of a revolution of shaft 135, one square corner of the shaft will first abut the insulating strip 137 and lift it to upper position restoring the contacts and slightly later another corner of the square shaft intercepts a camming element 139 integral with the armature 136 and positively shifts the armature from the magnet into latching position.

Insertible plugboards

In order to quickly shift the machine controls from one status in which it is capable of effecting one type of computation to another status for effecting the same type of computation with checking operations, use is made of insertible plugboard elements. This insertible plugboard construction is of a type known in the art and the insertible plug unit is generally indicated at 141 in Fig. 18. Devices of this type are generally known as "automatic plugboards" and a suitable form of such board is shown and fully described in the patent to C. D. Lake, No. 2,111,118, dated March 15, 1938. Such automatic plugboard arrangement comprises a series of relative fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be preplugged with a desired set of connections.

The manner in which the replaceable plugboard units 141 are wired and plugged for different computations is shown in Figs. 23 to 26 inclusive.

Figure 23:
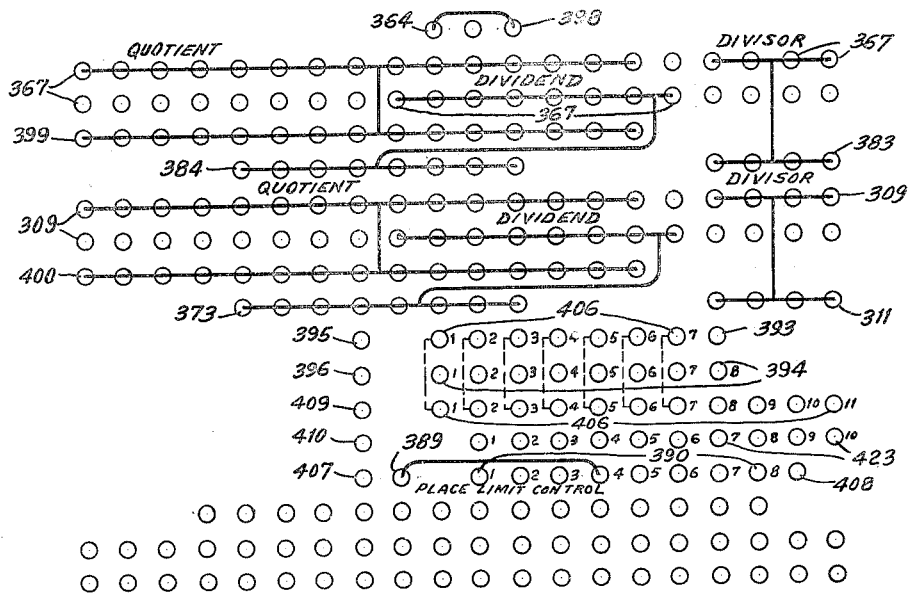

Of these plugboards:

Fig. 23 shows the wiring connections on the insertible plugboard for checking dividing operations.

Figure 24:
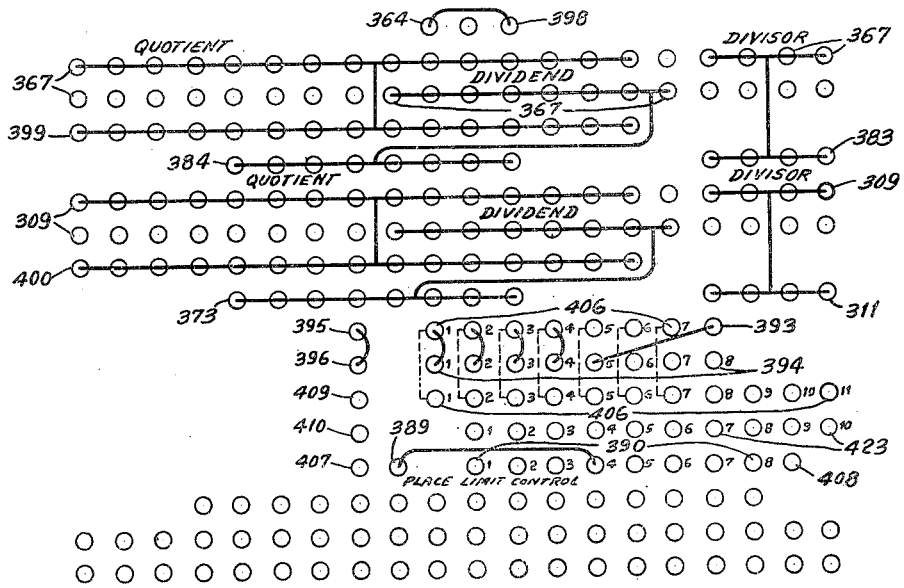

Fig. 24 shows another board with the wiring used for checking dividing of a computation wherein a final digit correction has been applied.

Fig. 25 shows insertible plugboard with the wiring connections for checking a dividing calculation in which fixed place rounding off is effected.

Fig. 26 shows the plugboard wiring of an insertible plugboard utilized for a checking-dividing operation without rounding off, but with determined fixed place limiting.

Cam timing diagrams

The cam timing diagrams, Figs. 19 to 21 inclusive, are self-explanatory. It should be noted that the CC cam contacts, nines commutator, emitters and impulse distributors make one revolution per machine cycle. The FC cam contacts of Fig. 20 on the other hand make one revolution per card feed cycle, which comprises two machine cycles. The XC contacts of Fig. 21 make one revolution for three machine cycles.

General operation of machine for dividing

Before describing details of the circuit diagram and the operation of the machine, the general operation for an original run of records involving dividing will be explained. This explanation is necessary in order to properly trace the manner of checking dividing wherein a series of computing steps are effected differently from those effected during first run operations involving regular dividing. The features of the machine for effecting regular dividing on first runs do not form the subject matter of the present application since such features are claimed in the copending application Serial No. 213,044, filed June 10, 1938.

While the circuit diagram herein shown includes the requisite controls adapting the instant machine for original run operations for effecting division, the mode of operation of the machine for such calculations will not be described in detail with reference to the circuit diagram. The general mode of operation of the machine on original run dividing calculations will, however, be given briefly in order to contrast the method of recomputing for comparison with the previously computed result obtained on the original run.

Original run dividing calculations comprise original runs with regular dividing. Original runs may also involve regular dividing with (1) final digit rounding off wherein the quotient amount is recorded to the nearest whole unit; (2) rounding off at a fixed place and (3) fixed place result recording without rounding off.

The present machine herein disclosed is also adapted for checking each of the three foregoing types of original run calculations.

Generally, the operation on original runs is as follows: On the original run the amount of the divisor and the amount of the dividend are read from each record. The divisor amount is entered into five accumulative type receiving devices. The amount of the dividend is entered into another receiving device. Following such entry cycles wherein amounts are derived from the record, there are a series of cycles utilized for building up multiples of the divisor.

Before explaining the manner in which these multiples are built up, it may be stated that certain of the entry receiving devices which receive the divisor amounts are provided with so-called doubling readouts. These doubling readouts are fully described in U. S. Patent No. 2,166,928, dated July 25, 1939.

In the machine cycle following the entry cycle, twice the amount of the divisor is read out from the doubling readout associated with the ML2 accumulator and such double divisor amount is entered into ML3—6, ML4—8, ML5 and ML9. On the following machine cycle, twice the divisor amount is again read out from the doubling readout of ML1—2 and entered into ML4—8 and ML5. Concurrently and during this same cycle six times the divisor amount is read out from the doubling readout associated with ML3—6 and such multiple is entered into ML7 and ML9. This completes the buildup operation of all digital multiples of the divisor.

It may be further explained on original run calculations that upon the entry of the divisor amount from the record card into the receiving accumulators, the divisor entry is shifted by a column shift mechanism so that the highest significant digit is always entered into the left hand order of the receiving accumulator ML1—2. The dividend amount is entered into the RD accumulator in the card reading cycle. The dividend entry in such accumulator is also made in such a manner that the highest significant digit is entered into the highest order of the accumulator at the extreme left. The purpose of making the divisor and dividend entries in shifted relation on original runs is to save operating cycles during the dividing calculations which follow. Control of entry shift for both the divisor and dividend entries on original runs is made by presensing each record to ascertain the location of the highest order significant digit of both the divisor and dividend. Having ascertained the orders in which such digits of the divisor and dividend occur, a selective control is set up and upon entry there is a shift to the left into both receiving devices to an extent determined by the control which has been previously set up. When the machine is effecting division on original runs, certain comparing units are utilized. These comparing units are generally of the type previously described and also in the copending application of R. E. Page, Serial No. 117,493, filed December 24, 1936. As here shown, there are two such comparing units having potential comparing capacity of forty-eight columns. Forty-five columns are used and are divided into nine sections; each having a capacity of five orders. When dividing is to be effected on an original run, a comparison portion of the dividend, i. e., a determined number of orders thereof at the extreme left, is derived from the RDR and such dividend comparison portion is set up in each section of the comparing units. Concurrently and in the same machine cycle with such setup there is also set up in each of said sections a multiple of the divisor. Different multiples of the divisor are set up on different comparing unit sections.

Having set up the comparison portion of the dividend and the different digital multiples of the divisor in this manner, the comparing units proceed in operation and effect a comparison, such comparing being effected in the same cycle in which entries of amounts were made into the comparing unit sections. Comparing is initially effected after entry. This comparing operation of the comparing unit sections on original runs determines which multiple of the divisor is highest in value that is equal to or just less than the comparison portion of the dividend. Having made such a determination, a selective control is set up based on the comparison, that is to say, if the four divisor multiple is determined to be the highest going multiple, there is a selective entry control related to a four quotient entry.

Following the comparing operation on original runs, the complement of the highest going divisor multiple is read out from the MLR4 readout and this complementary amount is entered into the RD accumulator bringing about a deduction of the highest going divisor multiple from the comparison portion of the dividend in such accumulator. Along with this deducting operation, the related quotient digit is entered into the LQ quotient receiving accumulator. The same operations are then repeated for a new comparison portion of the dividend. Before comparison is effected, of course, the dividend receiving sections of the comparing unit sections are restored to zero in order that a new comparison portion of the dividend may be introduced therein.

The foregoing operations continue with proper columnar shift after each operation until the dividing computation is completed on the original run.

It may be mentioned that the calculating mechanism for performing division in the original run is provided with certain place limiting devices and controls to terminate operations when either a certain desired quotient columnar position is reached and other place limiting controls may terminate operations in the original run at a fixed place to provide for fixed place recording of the final quotient digit.

When dividing operations are completed on original runs, the machine records the quotient back on the record from which the divisor and dividend was derived. In such recording which is under the control of the LQ accumulator there is a relative shift back of the quotient entry on the record. This so termed "shift back" is made under control of devices which are set up according to the original shift of the divisor and dividend upon their entry.

Checking dividing—General operation

When dividing operations are to be checked, the record cards of the set which have previously been computed and recorded are placed in the machine and re-run therethrough. From each card there is a sensing of the divisor, the dividend and quotient amounts. The different digital multiples of the divisor are built up upon the various ML devices in the customary way. The dividend amount is read from the card and entered into the SP receiving device with the entry shifted to the extreme left order. The previously recorded quotient is also read from the same card and entered into the LQ receiving device with the entry shifted to the extreme left order. Following these entries and during one of the cycles in which there is a building up of the divisor multiples, the complement of the dividend is read out of the SP receiving device and entered into the RD accumulator. Dividing operations then ensue. However, in such dividing operations in place of comparing true number amounts, i. e. comparing a true comparison portion of the dividend against the true number divisor multiples as is effected in the original run computations, the comparison is effected between the complement of the comparison portion of the dividend and the complement of each of the multiples of the divisor. This brings about a different numerical comparison than that effected on the original run because entirely different digits are compared. Having effected comparison in this complementary manner, the comparison unit controls which are selected as a result of the comparison are such that they select the highest divisor multiple whose complement is equal to or just greater (in contrast to "less" for regular dividing) than the complement of the comparison portion of the dividend. Thereafter, the true number amount of the divisor multiple is additively entered into the RD accumulator and concurrently with this operation the complement of the quotient digit determined by the selected multiple is entered into the LQ receiving device. Successive complementary comparison and entry operations ensue until a number of complementary quotient digits equal in number to the number of digits in the previously computed quotient are obtained and entered in the LQ receiving device. If the computations are correct, the digit receiving elements of LQ will all stand at 9, which signifies that the previously derived quotient is correct. This "9" status of the LQ receiving device will cause a reset of certain accumulators and an initiation of a new checking computation pertaining to a following card. If a previously derived quotient is detected to be incorrect, further machine operations terminate and it is necessary to manually restart the machine and remove the card having the incorrect quotient result recorded thereon.

On dividing calculations on original runs, where rounding off is employed, there is an entry of a 5 into a selected order of the LQ receiving device for rounding off of the quotient to the nearest unit. Having provided for such "5" entry for rounding off on an original run, since such entry is effected on every card, provision must be made to deduct such "5" on checking operations.

On original run calculations, rounding off operations may be effected with quotient computations carried out to a predetermined number of orders for each record of a run. On recording, the last quotient digit or zero may be recorded in a variable order from card to card. On checking operations, the machine must be capable of checking records of this general type.

When certain improved place limiting devices are employed on first run computations, the number of quotient digits computed for each card of a run may vary from card to card and on such runs whether with or without rounding off, the last quotient digit always occupies the same denominational place relation with respect to all records of a run. The checking devices must be also adapted for checking quotients recorded according to this manner.

Summarizing, the checking devices must be capable of checking records wherein the last quotient position as recorded varies from record to record, with or without rounding off on the original run, and the checking devices, furthermore, must have the capability of checking records of an original run wherein the last quotient place is in the same denominational relation for each of a series of records and which last place may or may not be rounded off.

Before explaining detailed checking-dividing operations, it may be mentioned that for checking by a re-run the cards are turned over when they are introduced into the machine and are therefore reversed in an end to end relation with respect to their passage during an original run. By reversing the cards end to end relative to their passage in the machine on an original run, the columns representing data to be analyzed are analyzed by different brushes and it is, therefore, possible to obtain a check which will take into account the detection of possible defective brush action or defective plugging.

*Operation in connection with the wiring diagram*

Figure 18:
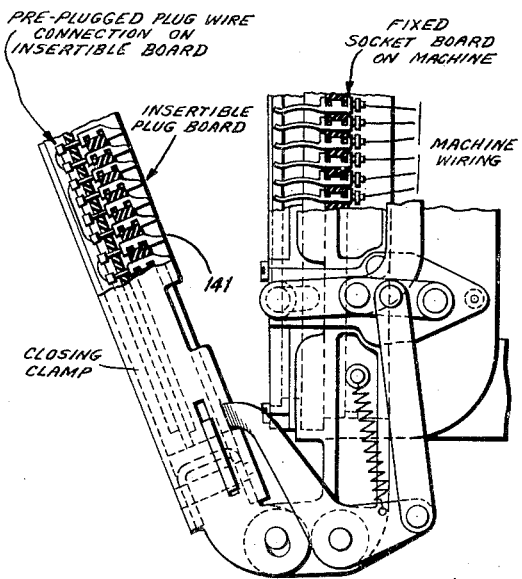
Fig. 18 is a detail view of one of the automatic plugboard units used in the machine, this view showing the plugboard unit in open position.

To prepare the machine for a checking-dividing operation, special insertible plugboards may be utilized. For a simple checking-dividing operation, the insertible plugboard of Fig. 23 is utilized. This insertible plugboard when placed in the device shown in Fig. 18, provides a plug connection between socket 364 (Fig. 22d, also Fig. 23) and socket 398. This connection maintains relay coils AM and AS permanently energized during all checking operations. With these coils AM and AS energized, their respective contacts shift to reverse position from that shown.

Figure 22B:
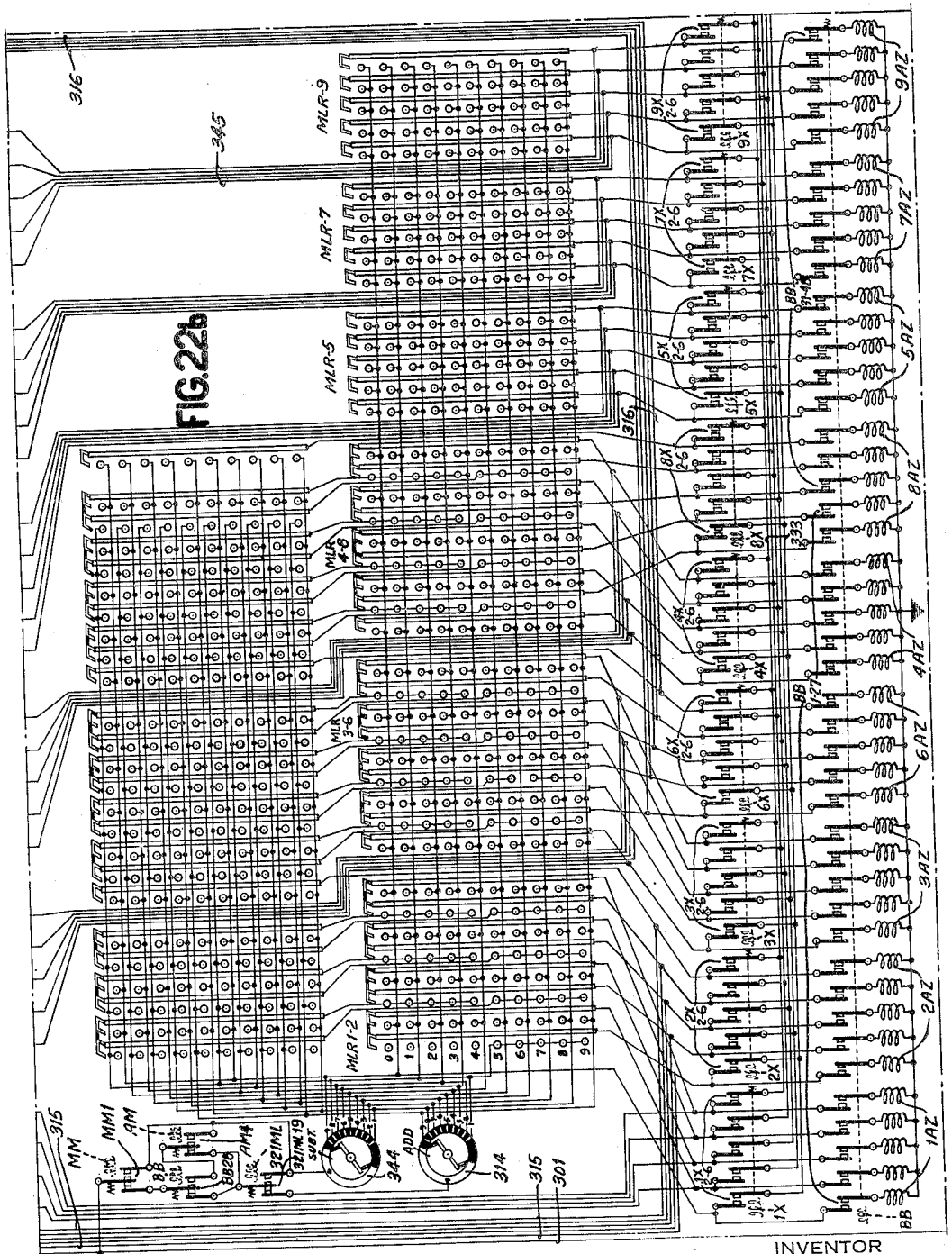
Figure 22C:
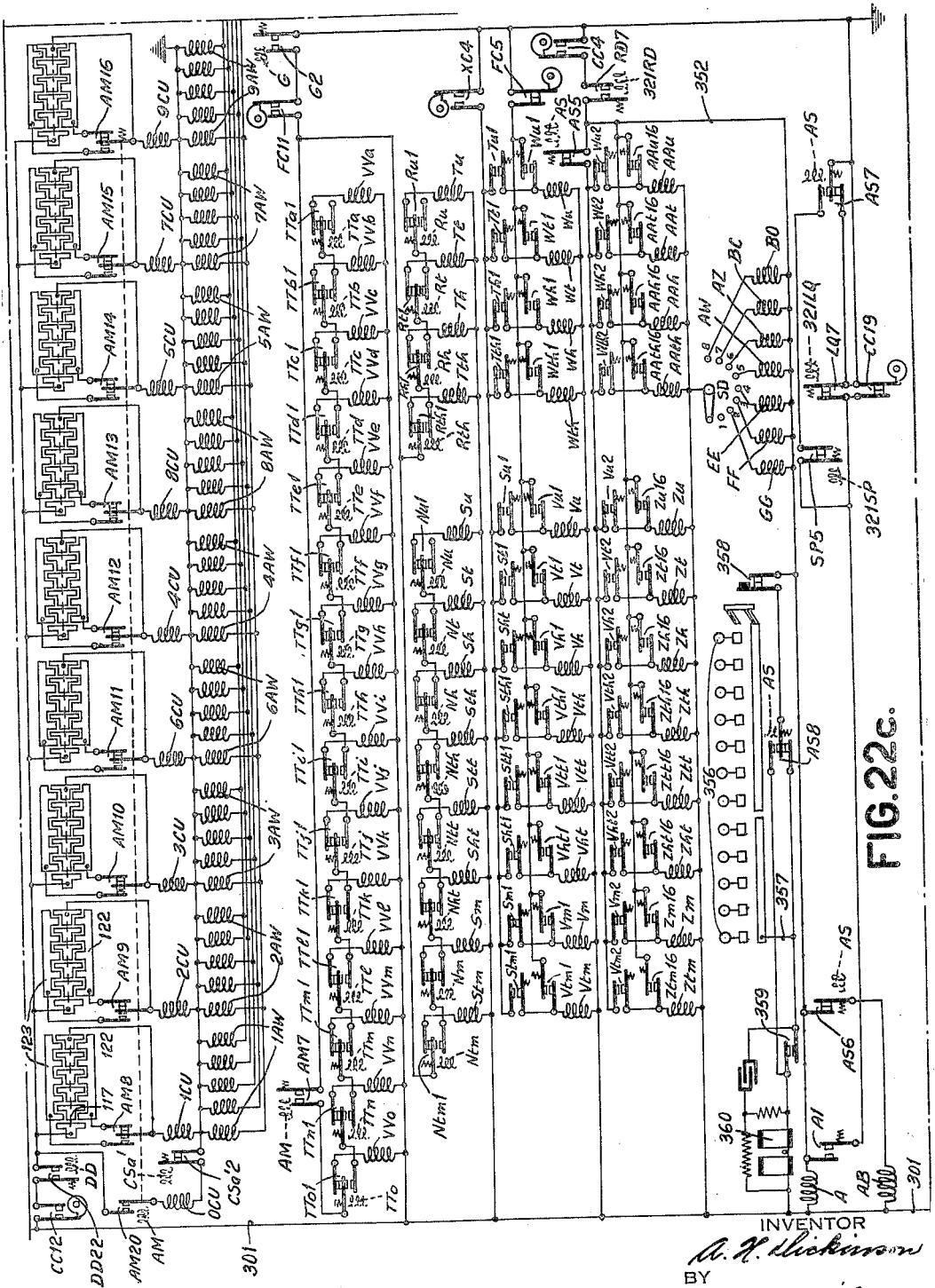
Figure 22G:
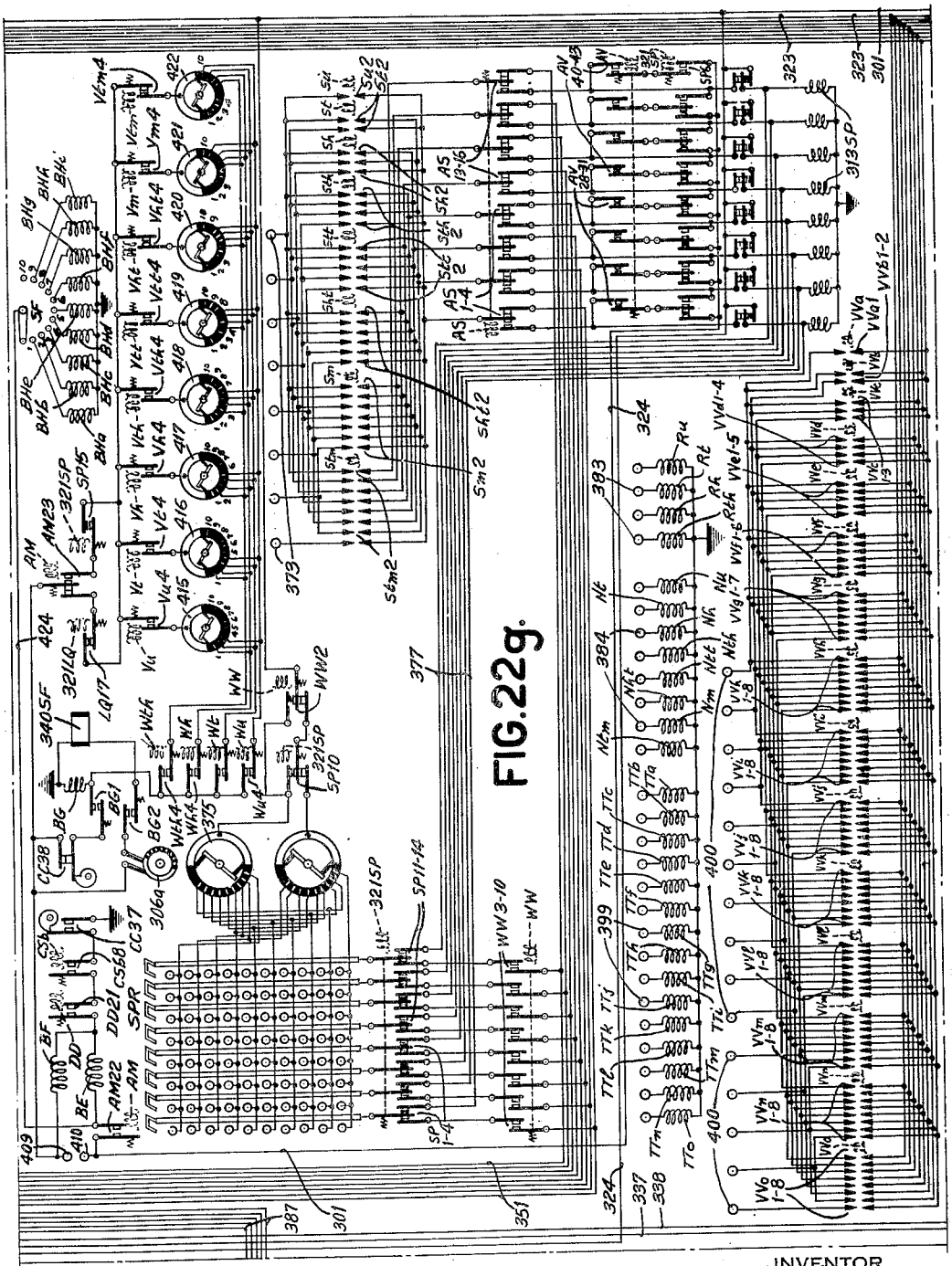

The insertible plugboard as outlined in Fig. 23 also affords plug connections between sockets 367 (Fig. 22a) pertaining to the divisor field to sockets 383 (Fig. 22g) and plug connections are made from sockets 367 pertaining to the dividend field (Fig. 22g), to sockets 384 (Fig. 22g). Plug connections are also made from the sockets 367 pertaining to the quotient field to sockets 399 (Fig 22g).

The foregoing plug connections route entries from the presensing brushes to certain controls to be subsequently described.

To route entries of the dividend, divisor and quotient amounts, plug connections are established from sockets 309 (Fig. 22e) pertaining to the divisor field to sockets 311 (Fig. 22a) and connections are made between sockets 309 pertaining to the dividend field to sockets 373 (Fig. 22g). For quotient entries, plug connections are established between sockets 309 (Fig. 22e) pertaining to the quotient field to sockets 400 (Fig. 22g). For setting up the proper place limiting control, a plug connection is also afforded by the insertible plugboard between socket 389 (Fig. 22e) and one of the sockets 390. As shown on Fig. 23, the machine is plugged to the fourth 390 socket from the left and accordingly, the control is set for a four place checking operation.

It will be assumed that a set of record cards are in place in the supply magazine of the machine, these cards having been disposed therein in end to end reverse relation with respect to their disposition in the machine on their original run. The operator then closes switch 300 (Fig. 22d) supplying current to driving motor M. With the main driving motor M in operation the grounded D. C. generator marked "DC" (Fig. 22d) is set in operation supplying current to ground and D. C. line 301. The operator now depresses start key 302 (Fig. 22d) and a circuit is completed from ground, through the FC3 contacts, through relay contacts F1, through the start key contacts 302 and through relay coil E to line 301. Relay coil E is maintained energized by a stick circuit through relay contacts E1 and cam contacts FC2. With E energized, relay contacts E2 close and a circuit is completed from ground through cam contacts CC29 (Fig. 22d), through the punch control contacts P1 and E2 contacts now closed, through the JJ2 contacts, through the stop key contacts 303 now closed, through the card feed clutch magnet 304, back through the unshifted D1 contacts to line 301. A card is now fed by the card feeding and handling section of the machine and it is advanced towards the reading brushes in the usual way.

In starting up the machine in a run of cards, the start key must be maintained depressed for two card feed cycles or it may be depressed, released and redepressed. Late in the second machine cycle of the card feed cycle, the card lever contacts 305 (Fig. 22d) close, causing energization of relay coil G. With relay G energized, relay contacts G1 (Fig. 22e) close, affording current supply to the FC6 contacts. These cam contacts, upon closure, permit current to be supplied to the impulse distributor 306 from which current impulses flow to the card transfer and card contact roll 307. The usual regular reading brushes 308 are provided, which are connected to the plug sockets 309.

Upon redepression or maintained depression of the start key and with relay coil G energized, relay contacts G4 (Fig. 22d) will become closed and a branch circuit will be also established through the now closed G4 contacts to energize a supplemental clutch magnet 312. (See also Fig. 1.) This supplemental clutch magnet causes the clutching of a drive shaft to effect the rotation of the group of XC cams which function once for every three machine cycles.

Figure 11:
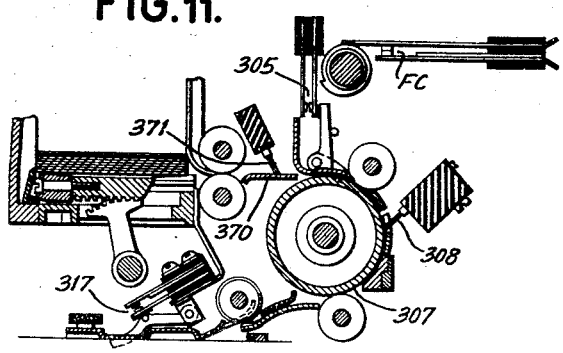
Figure 12:
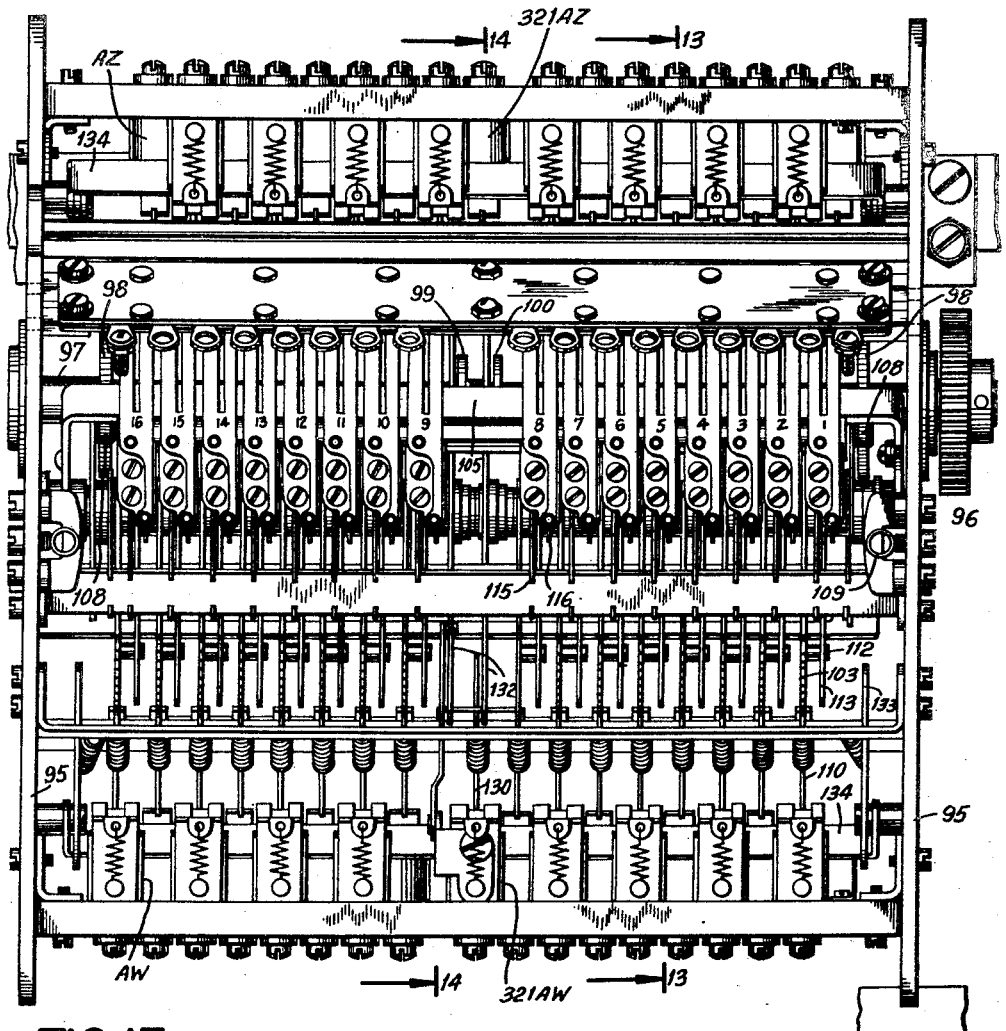
Fig. 12 is a rear elevational view of one of the so-called comparing units of the machine.

During the card feed cycle when the first card is brought to a position about to be traversed by the brushes 308 (Fig. 11) this first card will have traversed the advance presensing brushes 371. The card will finally come to rest with such advance brushes on the "11" index point, but en route to this point, the brushes will have traversed the zero index point position of the card. During such transit, the advance brushes presense the presence of zeros to the left of the highest order significant digit of the amount in the dividend and divisor fields.

Figure 29:
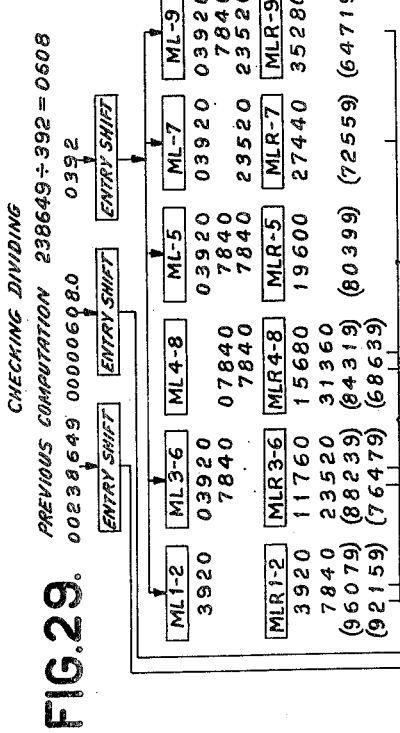

It will be assumed that the machine is performing the checking calculation shown in Fig. 29. Here there are two zeros to the left in the dividend and one to the left in the divisor and five zeros to the left in the quotient field because eight places are allotted for the quotient. Accordingly, on transit of the card past the sensing brush, circuits are established traced as follows: From line 301 (Fig. 22e), through the G1 contacts now closed, via line 369, through cam contacts FC7 (Fig. 22a) which are closed at the time the zero index point in the card passes the presensing brushes, thence to common conductor 370, through certain of the brushes 371, through plug connections between sockets 367 and sockets 383, 384 and 399 (Fig. 22g). The following electromechanical tripping coils will be energized with the machine computing the problem of Fig. 29, R$th$, N$m$ and N$tm$, coils TT$a$—$g$, coil TT$i$ and coils TT$k$—$o$. The energization of R$th$ signifies that there is a zero in the thousands order of the divisor field. The other coils which are energized pertain to zeros in the dividend and quotient fields respectively. During the following card feed cycle, the card which has been previously presensed is traversed past the main sensing brushes 308 (Fig. 22e) and the amount of the divisor is entered into the divisor multiple receiving devices ML and the dividend is entered into SP and the quotient is entered into LQ.

During the second card feed cycle, relay coil G having been energized will close contacts G2 (Fig. 22c). Current flows from ground through the now closed G2 contacts, through cam contacts FC11, through the R$th$1 contacts in reverse position from that shown, through the non-shifted R$h$1 contacts, through the relay coil T$h$ and back to line 301. The energization of relay T$h$ causes closure of the group of contacts T$h$2 (Fig. 22a), these contacts remaining closed during the entry portion of this card feed cycle. Also during the entry portion of this cycle, cam contacts XC1 close to energize relay coil K (Fig. 22d). With the relay coil K energized, the K1—16 contacts (Fig. 22a) become closed. The divisor amount is entered through the plug connections between sockets 367 and 311 (Fig. 22a), through the now closed T*h*2 contacts, down through the now closed K1—16 contacts. The amount of the divisor is entered into the following multiple receiving devices; ML1—2, ML3—6, ML5, ML7 and ML9. On the circuit diagram the prefix reference numeral "313" refers to the accumulator magnets of these multiple receiving devices. The ML1—2, ML3—6 and ML4—8 receiving devices are provided with doubling readouts in addition to the usual straight readouts. The other multiple receiving devices are provided with straight readouts only. On the entry portion of the feed cycle as just explained, the amount of the divisor is entered into five of the multiple receiving devices concurrently.

Before describing how multiples of the divisor are built up, it may be stated that the quotient and dividend are also entered. Quotient entry is provided as follows: Upon presensing of the card relay coils TT*k*—0 will have been energized as previously described. With such coils energized all of the contacts TT*k*1 to TT*o*1 inclusive, will have been shifted to reverse position from that shown on Fig. 22c. Accordingly, upon closure of cam contacts FC11, a circuit will be completed from ground through the G2 contacts now closed, through FC11, through the AM1 contacts now closed, through the various TT1 contacts just mentioned, to and through relay coil VV*j* and back to line 301. The energization of VV*j* causes closure of contacts VV*j*1—8 (Fig. 22g). The quotient amount as sensed by the main brushes 308 is entered via the plug connections between sockets 309 and sockets 400 (Fig. 22g) down through the now closed VV*j*1—8 contacts, over to the set of lines 323 (see also Fig. 22f) to the 313LQ accumulator magnets and back to ground. This provides for the quotient entry in the LQ accumulator in a shifted to the left relationship. The entry is directed as far to the left as possible in the LQ receiving device.

Dividend entry into SP is afforded as follows: Upon presensing of the card and particularly the dividend field thereof, relay coils N*m* and N*tm* were energized in the manner previously explained. Accordingly, contacts N*m*1 and N*tm*1 (Fig. 22c) are tripped to reverse position from that shown. With such contacts so tripped and upon closure of cam contacts FC11 and with the G2 relay contacts closed, an energizing circuit is provided to energize the relay coil S*ht*. The energization of relay coil S*ht* closes the S*ht*2 group of contacts (Fig. 22g). Upon transit of the card past the main sensing brushes 308, the dividend amount is read from the card, is entered via plug connections between sockets 309 (Fig. 22e) and sockets 373 (Fig. 22g) to and through the now closed S*ht*2 contacts, to and through the now shifted AS1—4 and AS13—16 contacts, through the 313SP accumulator magnets and back to ground. This operation will have entered the amount of the dividend in shifted-over relation to the left in the SP receiving device.

As explained above, the divisor and dividend were entered into their respective receiving devices in a shifted to the left relation. Provision must be made for setting up a control which is maintained during subsequent checking computing operations which will show the number of columns (one in this example) that the divisor has been shifted to the left upon entry, and the number of columns that the dividend has been shifted to the left upon entry (two in this example). These controls are set up in the following manner:

Referring to Fig. 22c, during the first machine cycle of the card feed cycle, cam contacts XC4 close and since relay coil T*h* is energized, relay contacts T*h*1 are closed and an energizing circuit is provided to energize relay coil W*h*. Stick contacts W*h*1 close, providing a stick circuit for W*h* through cam contacts FC5. The energization of W*h* signifies that the divisor has been shifted to the left one column upon entry. Relay S*ht* was also energized as above explained and accordingly upon closure of cam contacts FC4 an energizing circuit is provided through the S*ht*1 contacts to energize relay coil V*ht*. A stick circuit for V*ht* is afforded through stisk contacts V*ht*1 and cam contacts FC5. The energization of V*ht* signifies that the dividend was shifted to the left two columns.

During the machine cycle in which entries are made from the card, controls are set up to interrupt the start key circuit and to also maintain the operation of the machine under record card control.

Referring now to Fig. 22d, early in the entry cycle, cam contacts FC4 close, energizing relay F. F is maintained energized by a stick circuit through contacts F1 and cam contacts FC3. The shift of the F1 contacts cuts off the circuit to the start key contacts 302. Energization of F closes contacts F2 to maintain a stick circuit for relay coils F and G either through the FC3 contacts or the card lever contacts 305.

It should be mentioned that during the second half of a card feed cycle, there is a reset of the TT and N—R setup units. Late in the first half of the card feed cycle cam contacts XC5 close (Fig. 22d) and a circuit is completed from ground, through the reset clutch magnet 321TT and 321N—R, to line 301. Energization of 321N—R and 321TT releases the respective one revolution clutch (see Fig. 1a) so that any previously tripped TT, N1 and R1 contacts may be latched up in order that they may again be tripped near the end of the card feed cycle when presensing of a following record card is effected.

*Building up of multiples*

It has been previously explained that in the entry cycle, the divisor amount was entered into ML1—2, ML3—6, ML5, ML7 and ML9. In the machine cycle following the entry cycle, there occurs the first step of building up of multiples. As previously stated, the ML1—2 device is provided with a doubling readout. This is designated MLR1—2 on Fig. 22b. During the second machine cycle of the card feed cycle, cam contacts XC2 (Fig. 22d) close, energizing relay coil L. With relay coil L energized, relay contacts L1—20 (Fig. 22a) close and current supply is afforded for the adding emitter 314 as follows: From line 301 (Fig. 22b), through contacts MM1, BB28 and ML19 in the position shown, thence to the emitter 314. From emitter 314, the impulses flow over to the transverse buses of the doubling section of MLR1—2, down through the piloting section of this readout and out via a group of lines generally designated 315. From these lines, the impulses flow down through the L1—20 contacts (Fig. 22a) which are now closed and ultimately reach the 313 magnets of the ML3—6, ML4—8, ML5 and ML9 accumulators or multiple receiving devices. This operation will have completed the building up of the 3 multiple in the ML3—6.

In the following machine cycle, the cam contacts XC3 (Fig. 22d) close, energizing relay coil M and causing closure of contacts M1—20 (Fig. 22a). With the emitter 314 in operation, the times 2 multiple of the divisor is read out from ML1—2 and flows via lines 315 and through the M1—10 contacts to the 313 magnets of the ML4—8 and ML5 accumulators. This will have completed the setting up of the 4 and 5 multiples on these receiving devices. During the same cycle in which these entries are being made, the 6 multiple of the divisor is read out from the doubling readout section from ML3—6 and such 6 multiple flows via lines 316 (Figs. 22b and 22a) through the M11—20 contacts and finally reaches the 313 magnets of the ML7 and ML9 receiving devices. This operation will have completed the setting up of the 9 multiple on ML9 and the setting up of the 7 multiple on ML7. The multiple building up operations are now complete.

During the second machine cycle of the second card feed cycle, provision is made to transfer the dividend amount which was previously entered into the SP accumulator from such SP accumulator to the RD accumulator in complementary form. During this cycle, cam contacts XC6 (Fig. 22d) close and a circuit is completed from ground through relay contacts AS12 now closed, through XC6 to energize relay coil WW. The energization of WW shifts relay contacts WW2 (Fig. 22g) and contacts WW3—10 to reverse position from that shown. Closure of WW2 affords a circuit from line 301 to the subtract emitter 375. Complementary impulses are emitted by the subtract emitter and such impulses flow through the SPR readout, through the non-shifted 321SP1—4 and 11—14 contacts, through the now closed WW3—10 contacts, via a group of lines 351 (see also Fig. 22f) and down through the 313RD accumulator magnets. This transfer operation will have entered the nines complement of the dividend previously standing in SP in RD.

During the second card feed cycle, the record card from which the terms were read, is advanced to the punch tray in the usual way. Upon reaching this tray, the contacts 317 close (Fig. 22d) to energize relay coil D. Upon energization of D, the D1 contacts shift to reverse position, cutting off current supply from the card feed clutch magnet 304 and providing current supply for the punch rack trip magnet 318 upon closure of cam contacts CC1 with contacts P3 and relay contacts B1 closed. Relay contacts B1 become closed upon energization of relay coil B which occurs upon closure of the customary beyond the last column punch contacts P5. With punch rack trip magnet 318 energized, contacts 319 become closed and remain latched closed in the customary manner by latch 320 (Fig. 22d). Current supply is then provided for the punch driving motor PM and endwise card feed occurs in the usual way to feed the card up to a predetermined position in the punch.

SP reset

With relay coils B and D energized, relay contacts B2 and D2 (Fig. 22e) become closed. Upon closure of cam contacts CC3, current will flow from the 301 line through the CC3 contacts, through relay contacts B2, HH2 and D2, all now closed, to and through the now closed AS10 contacts, through the 321SP reset relay coil and back to ground. Reset will then be effected of the SP accumulator. A stick circuit is afforded through 321SP by means of stick contacts SP8 and CC5, to cause 321SP to be maintained energized during the reset cycle.

Upon energization of 321SP, contacts SP10 (Fig. 22g) shift to reverse position and place the subtract emitter 375 in circuit with the line. The circuit is through the non-shifted WW2 contacts of the shifted SP10 contacts. Complementary impulses flow through SPR and through the now shifted SP1—4 and SP11—14 contacts, via the lines 377, direct to the 313SP accumulator magnets. Upon operation of the subtract emitter the nines complement of the amount standing in SP will be entered back into the SP accumulator. This will restore the accumulator elements of SP to an all nines position. To bring the accumulator from the all nines position to zero, a 1 is entered into the units order of the accumulator at the carry time in the cycle. This entry is provided for through the contacts SP6 which are closed upon energization of 321SP. The impulse is supplied in the following manner from line 301, through cam contacts CC16 (Fig. 22f), via line 324 (see also Fig. 22g), through the SP6 contacts, through the normal carry relay contacts AV43 controlled by relay coil AV (Fig. 22d), down to the units order 313SP magnet. The units order is thus advanced one step and the electric transfer devices of the accumulator cause advance of all higher orders one step.

It may be explained that as long as the machine is in operation, cam contacts CC2 (Fig. 22d) close once each machine cycle at the carry time in the operation of the accumulators. Such closure of cam contacts CC2 energizes relay coil AV. The energization of AV closes contacts AV3—19, AV44—55 (Fig. 22a), AV20—23, AV32—35, AV24—27, AV36—39 (Fig. 22f) and AV28—31, AV40—43 (Fig. 22g) which are respectively associated with the ML, RD, LQ and SP accumulators. Since coil AV becomes energized once each machine cycle, the aforementioned relay contacts thus close at the carry time. The closure of these contacts permits the electric carry devices to be effective for performing carry operations whenever such operations are required in their related accumulators.

During SP reset, provision is made to prevent repetition of such reset. This reset preventing means is provided for as follows: During SP reset, the SP7 contacts are closed (Fig. 22d). Accordingly, when cam contacts CC6 close a circuit is provided from ground through the S11 contacts in reverse position from that shown, through the SP7 contacts, through CC6, to and through relay coil HH to line 301. Relay coil HH becoming energized, establishes its stick circuit through contacts HH1 and the punch control contacts P2 now closed. Upon energization of relay HH, relay contacts HH2 (Fig. 22e) open and thus interrupt the reset initiating circuit to 321SP.

Initiation of computing operations

Computing operations of the machine, that is to say, checking-dividing operations are initiated upon SP reset. Upon SP reset, 321SP becomes energized, closing SP7 (Fig. 22d). Contacts AS11 are in shifted position. Accordingly, a circuit is established when CC7 close, through the now closed N5 contacts to energize relay coil JJ. Relay coil JJ once energized, is maintained energized through stick contacts JJ1 and RD9. Since relay contacts SP9 (Fig. 22e) are closed, current supply is afforded from line 301, through cam contacts CC17, relay contacts SP9, to and through the 321AZ comparing unit reset coils and to ground. Energization of such 321AZ coils will release all of the divisor side sectors of the comparing units and allow them to be restored to a position to receive a setting of the multiples of the divisor thereon.

*Comparison of multiples*

The machine is now ready to compare the complement of the comparison portion of the dividend which is standing on RD with complements of all of the divisor multiples. In general, this is effected by reading out a complementary comparison portion of the dividend from RDR, setting up such portion on one side of all sections of the comparing units and at the same time reading out from the multiple readouts the complements of the various divisor multiples, each of which multiples becomes set up on one section of the other side of the comparing units. This operation will now be traced on the circuit diagram.

In checking-dividing operations, the comparing units CU are in continual operation.

A comparing cycle is initiated by the energization of relay coil LL (Fig. 22e) which becomes energized in the following manner. As previously explained, the computing initiating relay JJ was energized upon SP reset. Energization of such relay closes contacts JJ3. A circuit is completed from line 301, through the CC9 contacts and through all of the 9CU1, 8CU1, etc., transfer contacts now in the position shown and finally through the 0CU1 contacts, through the JJ3 contacts now closed, through the LL relay coil and back to ground. LL once energized is provided with a stick circuit extending back to line 301, through stick contacts LL1 and cam contacts CC13. After the foregoing stick contacts are established cam contacts CC14 close and establish a circuit through the non-shifted H2 contacts to energize magnet 340SB of the SB stepping switch. With 340SB energized, the switch arms SB of this relay are stepped to the "first" contact position.

Shortly after the switch arms of the stepping relay have advanced to this position a circuit is completed from line 301, through the H4 contacts now closed, through cam contacts CC8, through the switch arm of the SB stepping relay, through the CSa column shift relay coil and back to ground. Another circuit is established through the CC11 contacts, through the LL2 contacts now closed, through the SB stepping relay switch arm, through the BB relay coil and back to ground. A branch circuit is also established to energize a relay coil DD. With coils BB and DD energized, they are maintained energized by their respective stick contacts BB29 and DD1, the stick circuit extending back to line through cam contacts CC10. Another branch circuit is completed from the CC8 contacts, through the now closed AM1 contacts, through the left hand arm of the SB stepping switch on the first contact position, through column shift relay CSa' and back to ground through the now closed DD10 contacts.

It may be explained that column shift relay CSa and relay coil DD cooperate to control the readout of the complementary dividend comparison portion from RDR and that contacts BB are utilized to control the readout of the various complements of the divisor multiples from the MLR readout devices. A column shift relay CSa', on the other hand, is utilized to introduce a 9 to the left in each of the comparing units in setting up the comparison portion of the complement of the dividend.

The manner in which a comparison portion of the complement of the dividend is set up under control of RDR which represents the complement of the dividend on the comparing units will now be described.

It will be understood that such comparison portion includes a selected number of columns. The number of columns selected is determined by the CSa relay. Referring to Fig. 22f, a circuit is completed from line 301, via wire 347 to and through the now shifted DD9 contacts to an add emitter 348. With such emitter in circuit, impulses are emitted through RDR, through the non-shifted RD1—4, RD12—15 contacts, via a set of lines 385, through the now shifted DD5—8, DD15—18 contacts, through the now closed CSa1—4 contacts, via lines 386, through the shifted DD2—4, DD19—20 contacts, via lines 387 (see also Fig. 22c) and to and through the dividend side comparing magnets generally designated 1AW, 2AW, etc.

It will be understood that the comparison portion of the complement of the dividend is set up in multiple in the comparing unit, that is to say, there are nine identical setups of the comparison portion of the complement of the dividend in order that there can be comparing between each setup and nine different complemental divisor multiples. In the typical problem under consideration, the comparison portion of the dividend which was so set up is the amount of 7613. Note 7613 in RD (Fig. 29). The amount of 7613 when introduced into the comparing units only fills up four columns in such units. However, when complemental comparisons are being made, it is desirable to compare on the entire capacity of the comparing units which is five columns; therefore, provision is made for introducing an extra "9" in the comparing units in the highest order column which is the column to the left of the column receiving the "7" amount. Such extra "9" is indicated in Fig. 29, by an added "9" in dotted lines. The manner in which such extra "9" is introduced into the highest order of the comparing units will now be described.

The manner in which relay coil CSa' was energized on a comparing cycle was previously described. Referring now to Fig. 22f, upon the brush of emitter 348 encountering the 9 spot, an impulse is emitted over the 9 bus of RDR to a line 404 and such impulse flows through the now closed CSa'1 contacts and flows over one of the lines of the 386 group and thence over the path previously traced for the entry of the complement of the dividend to the highest order 1AW, 2AW, 3AW comparing magnets, etc. (Fig. 22c).

The setup of the complemental multiples of the divisor on the other side of the comparing unit sections will now be described. It has previously been explained that relay BB (Fig. 22e) becomes energized. With such relay coil energized, all of the contacts BB1—27 and BB31—48 (Fig. 22b) become closed. Contacts BB28 also shift to reverse position. Subtract emitter 344 will be placed in circuit in the following manner.

A circuit is established from line 301, through the non-shifted MM1 contacts, through the shifted BB28 contacts, through the now shifted AM4 contacts to the subtract emitter 344. Such subtract emitter will admit complemental impulses through all of the MLR readout devices. The complements of multiple amounts available on such readouts will be individually transmitted through to the now closed BB1—27, BB31—48 contacts to the various divisor multiple comparing magnets 1AZ, 2AZ and 3AZ, etc. It will be understood that by this operation, the divisor multiple side of the comparing units will receive settings of complements of the different digital multiples of the divisor. The comparing units operate in the manner previously described to make suitable settings on the brushes upon the comparing commutators.

Having entered both the complement of the dividend comparison portion in the multiple manner in the comparing units and having entered complements of the various multiples of the divisor in the other side of such comparing units, the brush devices in the comparing units receive their settings in a manner previously explained to indicate a greater than and equal to or a less than condition. As shown in Fig. 22c, the comparing unit commutators are in sections, one section being provided for each multiple. For each section there is an associated relay coil such as 9CU for a 9 multiple, 8CU for an 8 multiple and so on. The brush action of the comparing devices is adapted to prevent energization of all magnets related to complements of multiples which are less than the comparison portion of the complement of the dividend and to permit energization of magnets related to complements of multiples equal to or greater than the comparison portion of the complement of the dividend.

It may be explained that on an original run that the comparison control is different. On an original run the comparison control through the brush action of the comparing devices is adapted to prevent energization of all magnets related to multiples which are greater than the comparison portion of the dividend and to permit energization of magnets related to multiples equal to or less than the comparison portion of the dividend. To shift the control from this original run status to the status which is used on checking, the AM relay coil becomes energized in the manner previously explained and the AM8—16 contacts shift to reverse position from that shown on Fig. 22c.

Referring to Fig. 29, it will be noted that if 97613 be compared with all of the complements of the divisor multiples that such amount of 97613 is greater than any of the complements of multiples which are available, 96079 being the greatest. This indicates an initial "no go" condition when a first comparison is made.

"No go" conditions on checking dividing

For such "no go" condition no true divisor multiple amount is to be added to the complement of the dividend standing in RD and such condition means that the quotient amount for such quotient place is zero and provision must be made when the "no go" condition is determined after the first comparison to enter a 9 in the quotient receiving device in such non-going quotient order. This is necessary since the entries in LQ for checking are based upon a nines complementary relation. To provide for the introduction of a 9 into LQ on a "no go" condition above described, the following controls and circuits are provided. If upon checking operations a "no go" condition is determined by the comparing devices after a first comparison, none of the relays 1CU to 9CU (Fig. 22c) will be energized, but relay coil OCU will become energized. Energization of this relay is effected upon closure of cam contacts CC12, closing a circuit from line 301, cam contacts CC12, through contacts DD22 which are closed, relay contacts AM20, relay OCU, relay contacts CSa'2 which are now closed, to ground. Contacts OCU1 (Fig. 22e) now shift. Further on in the specification the example adopted will be explained to take into consideration this circuit and the incidental operation of the machine. Accordingly, there is an energization of the OX relay with the usual stick circuit established through contacts OX1 and contacts CC15. With OCU1 shifted, the energizing circuit to relay coil LL is broken. Therefore, on a "no go" comparison upon checking-dividing, the machine does not immediately follow with another comparison cycle as it did in regular dividing. In lieu thereof, the energization of the OX relay closes relay contacts OX7 (Fig. 22f) and a circuit is established from the 9 spot of emitter 350, through the now closed OX7 contacts, through one of the closed CS contacts, down to one of the 313LQ accumulator magnets. This will provide for the entry of a 9 in the "no go" order of LQ. On a "no go" comparing condition on checking, since the related multiple is zero, there is no additive entry of any amount into RD.

It must be remembered, however, that on regular dividing operations, it is possible according to the relation of the divisor and dividend to have quotient amounts such as 0608 (first condition) and 6080 (second condition). The relation of the quotient digits for the first condition occurs when there is a "no go" comparison for the highest order of the quotient, i. e., a "no go" condition on the first comparing cycle. The relation of the quotient digits such as 6080 for the second condition occurs when a comparison is effected on the first comparing cycle which signifies that there is a going multiple.

In recording back on the record card for both of the foregoing first and second conditions, it is possible, due to the relative size of the divisor and dividend amounts to record the quotient amount of 608 for either condition in an identical columnar relation on the record. For example, the recording for both conditions might be 00000608.

In recording the quotient amount for the first condition mentioned above, the zero preceding the 6 will be derived from LQR. However, when recording for the second condition, this same zero in the same column will be derived not from LQR, but from zero wiring.

When such a record is re-run to the machine for checking-dividing, the presensing control cannot ascertain whether the zero preceding the 6 comes from LQR or from the zero wiring. Therefore, the 608 is entered from the card clear to the left in LQ for a checking operation either under condition one or condition two. When entering recomputed complementary quotient digits into LQ, a control must be provided to take into account that such shift has occurred clear to the left under condition one or condition two. When operating under condition one, there will be a "no go" condition on the first comparing cycle for the first quotient place.

While the machine controls under this "no go"

condition would tend to enter a "9" in such place, such "9" entry in such place is undesired and it is accordingly suppressed. It will be recalled that if 608 is shifted clear to the left, there will be no zero in LQ for the 9 to match with. Accordingly, on such first condition on checking-dividing, this "9" entry in the first quotient place is actually suppressed. However, on the checking condition two, there is a going condition established on comparison for the first quotient place and therefore a complementary quotient digit is entered in such place. Furthermore, under condition one, provision is made for shifting the entries of all complementary quotient digits relatively one place to the left so they will enter the proper orders of LQ. On condition two, on the other hand, this shift to the left of the entry of complementary quotient digit is suppressed.

On the first comparing cycle upon checking-dividing, relay coil CSa' (Fig. 22e) becomes energized concurrently with the energization of relay coil BB in the manner previously explained. The energization of CSa' opens contacts CSa'2 (Fig. 22c) and accordingly relay 0CU does not become energized. Furthermore, on a "no go" condition, none of the relay coils ICU to 9CU will become energized. Accordingly, all of the 0CU1 to 9CU1 contacts (Fig. 22e) remain in the position shown and LL becomes energized. With LL and BB relay coils energized, contacts LL4 and BB30 (Fig. 22d) are in closed position and upon closure of cam contacts CC25 a circuit is established through the now closed AS12 contacts, through CC25, LL4, BB30 to energize relay coil ZZ. The contacts ZZ1 close and a stick circuit is provided for coil ZZ which is maintained in the same manner as for the JJ relay. The energization of coil ZZ will shift the ZZ2—5, ZZ9—12 contacts (Fig. 22f) and the effect of the shift of these contacts is to cause shift of the entry of the complementary quotient digits which are obtained thereafter in orders of LQ which are relatively one higher. The shift of the ZZ2—5 and ZZ9—12 contacts will be maintained throughout all succeeding computing operations, ZZ only becoming deenergized when relay coil JJ deenergizes after the termination of computing.

With relay coil 0CU deenergized, relay coil OX (Fig. 22e) will not be energized and contacts OX7 (Fig. 22f) will remain open and accordingly there will be a suppression of the entry of the 9 in the first quotient order of the LQ accumulator.

During the first comparing cycle in which a "no go" condition was detected, relay coil LL (Fig. 22e) because energized in the manner described. Such coil is maintained energized by a stick contact through relay contacts LL1 and cam contacts CC13. Shortly after LL is energized, upon closure of cam contacts CC14, a circuit is completed through the H2 contacts in the position shown to energize stepping switch magnet 340SB. Energization of this stepping switch magnet advances the switch arms of the stepping switch SB to the second contact position. With the stepping switch arms on their second contact position, the following operations ensue. Relay coil CSb becomes energized upon closure of cam contacts CC8. Relay coil DD becomes energized upon closure of cam contacts CC11, the circuit being completed through the now closed relay contacts LL2. At the time when relay coil DD is energized, relay coil BB is not energized under this condition because there is no wiring to relay coil BB from the second contact of the controlling SB stepping switch arm. It will be recalled that the contacts of relay coil BB were initially used to effect the entry of the complementary divisor multiples into the comparing devices. With this phase of operation, the complemental multiples remain in the comparing devices and do not have to be reentered therein.

It may be mentioned here that at the end of each comparing operation the dividend side of the comparing units are restored to zero so that they can receive a new comparison portion. Such restoration is effected under the control of cam contacts CC9 (Fig. 22e) which provide energizing circuits for the 321AW reset coils.

Referring now to Fig. 29, the machine has now reached a stage of operation in which it is ready to pick out a second dividend comparison portion for comparison with complemental divisor multiples. The second comparison portion which is to be selected comprises the digits 76135. Such amount is selected for readout from RDR by means of contacts CSb1—5 (Fig. 22f) which became closed upon energization of CSb effected as previously described. The circuit need not be traced in detail since it is substantially the same as previously traced to provide for the entry of the previous comparison portion into the dividend side of the comparing units. The ultimate effect is to set up 76135 upon the various comparing units by the proper timed energization of coils 1AW, 2AW, etc.

Referring again to Fig. 29, it will be noted that the complements of the 1, 2, 3, 4, 5 and 6 multiples of the divisor are all greater than the complement of the comparison portion of the dividend, i. e., 76135. The complements of the 7, 8 and 9 multiples (72559, 68639, 64719, respectively) are all smaller than this amount, i. e., 76135. With this relation of amounts, the ICU to 6CU coils (Fig. 22c) become energized and the 7CU, 8CU to 9CU coils remain deenergized. The energizing circuit for relay coils ICU to 6CU inclusive, may be traced as follows:

Referring to Fig. 22c, a circuit is completed from line through cam contacts CC12, through relay contact DD22 now closed, through the commutator strips 123 of the comparing units out via brushes 117 of these comparing units, through the AM8, 9, 10, 11, 12, and 14 contacts in reverse position from that shown to and through the respective ICU to 6CU coils inclusive and back to ground.

It may be explained that on a comparing cycle which takes a single machine cycle, the setup of the comparison portion of the complement of the dividend and of the complements of all of the divisor multiples is made during the first portion of a comparing cycle. Immediately after the setup is made and in the same machine cycle, testing and comparing are effected. All testing is done concurrently for all multiples.

Referring now to Fig. 22e, the energization of coils ICU to 6CU inclusive, will have shifted relay contacts ICU1 to 6CU1, all inclusive, all to reverse position from that shown and upon closure of CC9, current flows through the non-shifted 7CU1 to 9CU1 contacts and through the shifted 6CU1 contacts to energize the 6X multiple selecting relay. The circuit to ground from 6X is via the closed AM3 relay contacts, relay MM being short circuit since it is used only for regular dividing operations, 6X is maintained energized by a stick circuit through contacts 6X1 and cam contacts CC15. It may be mentioned that the 6X relay coil is energized in one machine cycle just after the commutator test is made and such relay is maintained energized throughout a portion of the next machine cycle to select the 6 multiple which is to be read out from the MLR6 readout and which multiple is to be added to the complement of the dividend comparison portion.

Referring to Fig. 22b, add emitter 314 is in circuit with line 301 through contacts MM1, BB28, ML19, all in the position shown. Impulses are emitted by the add emitter through the MLR6 readout, through the now closed 6X2—5 contacts (closed since relay 6X was energized), out via a group of lines 333 (see also Fig. 22f) and through the non-shifted DD2—4 and the DD19—20 contacts, via lines 386, through the now closed CSb1—5 contacts, through certain ones of the DD5—8, DD15—18 contacts to the 313RD accumulator magnets.

It may be mentioned at this point that the DD relay coil (Fig. 22e) becomes deenergized at the end of a comparing cycle when cam contacts CC10 open and such relay is deenergized at the time the foregoing additive entry is made into the RD accumulator. Also contacts CSb1—5 will be closed because relay coil CSb is energized (see Fig. 22e) again when contacts CC8 reclose and the switch arm of SB will remain on the second contact position during this subsequent reclosure of CC8.

The operation which has just been described will have added the amount of 23520 to the complement of the dividend comparison portion and after such addition 99655099 will stand in RD.

*Entry of complement of quotient digit*

With the multiple selecting relay coil 6X energized, a supplemental contact 6X7 (Fig. 22f) will be closed. The subtract emitter 350 is in circuit through the shifted AM2 contacts, the non-shifted DD9 contacts and wire 347 which extends to line 301. The direct multiple which is selected is the 6 multiple and the nines complement of this is 3. Therefore, when the subtract emitter encounters a 3 spot of emitter 350, an impulse will be emitted over the 6 bus wire, through the now closed 6X7 contact, through the now closed CSb6 contact, through the now shifted ZZ3 contact to the highest order 313LQ accumulator magnet. This will enter a 3 to be added to a 6 already standing in such order of the accumulator, thus advancing such highest order wheel to 9.

On the foregoing complemental quotient digit entering cycle, inasmuch as relay coil DD was not energized, relay contacts DD22 (Fig. 22c) are in open position. Accordingly, even if the CC12 contacts close, there will be no energization of any of the CU relays. With none of such relays energized, the 0CU1, the 1CU1, etc., contacts shown on Fig. 22e, remain in the position shown and upon closure of CC9, current supply is afforded through the JJ3 contacts (Fig. 22e) to energize relay coil LL. This coil, when energized, closes its stick contacts and there will be another energization of stepping switch magnet 340SB under the control of cam contacts CC14. Accordingly, the switch arms of SB will step to the third contact position. Inasmuch as a different comparison portion of the dividend is now involved, there must be a column shift to provide for such different comparison portion.

As before, with relay coil LL energized, contacts LL2 (Fig. 22e) are closed and upon closure of CC11, relay coil DD is reenergized. As before, relay coil BB is not energized. Following energization of DD, cam contacts CC8 close and a circuit is established to energize column shift coil CSc. With coil CSc and relay coil DD energized, their associated contacts shift to reverse position.

Referring to Fig. 22f, with relay coil CSc energized, contacts CSc1—5 close and there is a new readout relation established with RDR. The readout relation is now such that 96550 may be read out from RDR. As before, the add emitter 348 emits impulses through RDR and such impulses flow to the various 1AW, 2AW, etc., comparing unit magnets. This operation will have set up a new comparison portion of the complement of the dividend, viz., 96550 upon the dividend comparing side of the comparing units. Complements of the divisor multiples still remain set up on the divisor side of the comparison units and when the further comparison is effected, the comparison commutators and circuits of the comparing units detect that a "no go" condition exists because 96550 is greater than any of the complements of the divisor multiples (see Fig. 29). When a "no go" condition is detected, the 0CU relay coil (Fig. 22c) becomes energized as explained above. Relay contacts CSa'2 are now closed, since their controlling relay (Fig. 22e) is out of circuit. Since 0CU is energized, the 0CU1 contacts (Fig. 22e) shift and since all other of the contacts 1CU1 to 9CU1 inclusive are in nonshifted position, upon closure of cam contacts CC9 an energizing circuit is provided for relay coil 0X. 0X energizes, and is retained energized by a stick circuit through stick contacts 0X1 and cam contacts CC15. Relay 0X has no multiple entry routing contacts (as is provided in Fig. 22b for the other "X" relays by their 2—6 contacts), therefore, on the following machine cycle, there is no readout of any amount from the MLR devices for additive entry into RD. There is, however, an extra contact 0X7 (Fig. 22f) which is now closed and in circuit with the zero bus of RDR. Such zero bus receives a 9 impulse from the subtract emitter 350 and such 9 impulse flows through the closed 0X7 contacts and through the CSc6 contacts and the shifted ZZ4 contacts to enter a 9 in the second order from the left of the LQ accumulator, said second order previously standing at zero. Accordingly, this order of the accumulator is brought to a 9 position. The LQ accumulator now represents -998-.

As previously stated on a "no go" comparing condition on checking since the related multiple is zero, there is no additive entry in the RD accumulator and then a further complemental comparing operation takes place in the manner previously described and which need not be redescribed in detail.

As previously stated, the relay coil LL (Fig. 22e) is energized during a comparing cycle and such coil is maintained energized by a stick circuit through relay contacts LL1 and cam contacts CC13. Shortly after relay coil LL is energized, upon the closure of cam contacts CC14, a circuit is completed through the H2 contacts in the position shown to energize the stepping switch magnet 340SB. Energization of this stepping switch magnet then advances the switch arm to their fourth contact position and the positioning of the arm to the fourth contact position causes the energization of the relay coil CSd and such coil is energized upon the closure of cam contacts CC8.

The operation of the column shift relay coil CSd will cause a new comparison portion of the dividend to be selected and in the comparing operation now described, the comparison portion represents the value 65509. This value being retained upon the dividend side of the comparing devices is compared with all of the multiples of the complements of the divisor and during the operation of the comparing devices, it is determined that the complements of the 1 to 8 multiples are greater than the comparison portion of the dividend and that the complement of the 9 multiple of the divisor is smaller than the comparison portion of the dividend. With this relation, coils ICU to 8CU will have been energized and shift their contacts ICUI to 8CUI (Fig. 22e) and since relay coil 9CU is deenergized, its relay contacts 9CUI are unshifted. Therefore, upon the closure of cam contacts CC9, relay coil 8X will be energized. This relay coil is the coil which effects the quotient entry in the LQ accumulator and the entry of the selected 8 multiple of the divisor in the RD accumulator. With this relay coil energized, its contacts 8X7 (Fig. 22f) will be closed so as to effect the entry of the nines complement of the selected multiple "8" or "1" will be entered in the third order from the left of the LQ accumulator. This is added to the "8" already thereon and the LQ accumulator now represents "999."

In the manner previously described, the selected 8 divisor multiple is entered as a true number in the RD accumulator and added to the complement standing therein as is outlined in Fig. 29. This entry is effected during the cycle subsequent to the comparing cycle and is effected by the emitter 314 (Fig. 22b) which directs impulses under control of the MLR8 readout, through the 8X2—5 contacts now closed to and through the 313RD accumulator magnets (Fig. 22f). This entry circuit has been previously traced in detail.

Termination of calculating operations on checking-dividing take place under control of place limiting devices now to be described in detail.

*Place limiting devices*

Referring to Figs. 22e and 23, the insertible plug-board will be provided with a plug connection between plug socket 389 and the "4" plug socket 390. During the entry cycle in which the selected multiple of the divisor is entered in the RD accumulator as a true number, relay coil LL is energized as follows: During this cycle relay coil DD will be deenergized and accordingly contacts DD22 (Fig. 22c) remain open. There will, accordingly, be no energization of any of the CU relay coils. With none of such relay coils energized, the 9CUI to 9CUI contacts (Fig. 22e) will remain open in the position shown so that upon the closure of contacts CC9, a circuit will be completed through contacts 9CUI through to 8CUI to relay coil LL to ground. With such relay coil LL energized, the relay contacts LL3 (right side of Fig. 22e) will be closed and upon the closure of CC11, a circuit will be completed through contacts LL3 through one switch arm of the stepping switch SB which is now at the "4" position, through the J6 contacts in the position shown, through the plug connection between the "4" socket 390 and the socket 389, through the relay coil H to ground. Relay coil H being energized, the stick circuit therefor will be completed through H1 contacts and RD11 contacts. Contacts CC36 bridge contacts RD11 to retain the energization of relay coil H independently of contacts RD11 to a certain time in the cycle, when they open to deenergize relay coil H.

*Test for "9"s condition*

By particular reference to Fig. 22e, it will be noted that a stepping switch magnet 340SE is energized concurrently with the energization of the stepping switch magnet 340SB and therefore the stepping switch SE (Fig. 22h) will advance the same number of steps as stepping switch SB. It will be noted that the circuit from the stepping magnet 340SE (Fig. 22e) extends through the AM6 contacts now closed, through the J1 contacts now unshifted to the ground. It will be clearer later that the stepping switch SE cuts off testing and exploration of unnecessary columns to to the right in the LQ accumulator.

The machine is now ready to test the digit representing positions of the brushes of the LQ accumulator to ascertain whether or not the wheels of this accumulator are all at a 9 digit representing position. If all such wheels are found to be in such position, it signifies that the checked computation is correct and there is then initiated a reset of the ML devices and the RD and LQ accumulators. If the test detects a condition in which one or more of the wheels of the LQ accumulator do not stand at 9, the foregoing resetting operations are deferred until a manual operation ensues and during which the incorrect card may be removed. Assuming that the LQ accumulator shows an all 9 condition, resetting operations are initiated under control of this test circuit and the card in the punch is skipped through the punch without recording. The test circuit and reset initiating control circuits will now be traced.

Referring to Fig. 22e, upon the closure of cam contacts CC3, a circuit is established from the line 301 through contacts CC3, through H3 contacts now closed and by line 337 which ultimately extends to Fig. 22h, the circuit continues through the now closed J2 contacts, through the switch arm of the SE stepping switch to say, the 4 contact position, (in the example of Fig. 29) through the shifted ZZ13 contacts, to the third from the left readout segment of LQR, thence by the various brushes and contact spots of the relatively higher orders of the readout which are on an all 9 position to the line 338. Line 338 ultimately extends back to Fig. 22e and energizing circuits are established to energize grounded reset relays 321ML, 321LQ and 321RD. There is a direct circuit connection to coil 321L from the line 338. The circuit to 321LQ is through the AS9 contacts which are now shifted. There is a direct circuit connection to the coil 321RD from the line 338. Each of the reset relays close their respective stick contacts, such as ML25 for the reset coil 321ML, LQ11 contacts for 321LQ, and RD10 for 321RD, all of these contacts being connected to a line which extends back to the line 301 through contacts CC5. The stick circuits retain the reset coils energized so that reset of the related entry receiving devices may be effected during the next machine cycle, in the event that all of the accumulator elements of the LD accumulator are at the 9 position.

The energization of 321RD reset relay coil opens its contacts RD9 (Fig. 22d) to break the stick circuit for the computing initiating relay coil JJ. Actual deenergization of relay coil JJ is timed by the CC18 cam contacts following the opening of RD9.

RD reset

In order to reset the RD accumulator the following control circuits are provided. Energization of 321RD as above explained, causes a shift of contacts RD1—4 and 12—15 (Fig. 22f). With such contacts shifted, a circuit is established from line 301 (Fig. 22f) via wire 347 to and through the DD9 in the position shown, through the now shifted AM2 contacts to emitter 350. Emitter 350 is a nines complementary emitter and with current supplied to it, nines complementary impulses are emitted through RDR and through the now shifted RD1—4 and 12—15 contacts to a set of lines generally designated 351. The impulses flow via these lines to the 313RD accumulator magnets and advance the accumulator elements to all 9 position. Thereafter a carry impulse is introduced into the units order of the accumulator through the closed RD5 and AV35 contacts which establish a circuit from the carry impulse line 324 to the 313RD accumulator magnet in the units order. The customary electric transfer contacts in the accumulator afford carry into the higher orders of the accumulator so that all accumulator elements are brought back to a zero status.

LQ reset

Upon energization of the 321LQ relay, contacts LQ6, LQ20—27 (Fig. 22h) and LQ5 (Fig. 22f) shift to reverse position from that shown. With LQ6 (Fig. 22h) in reverse position current supply is afforded to an emitter 322 which is wired in a nines complementary manner to the LQR readout. Complemental impulses representative of the nines complement of the amount standing in LQ flow through the now shifted LQ20—27 contacts, through the set of lines generally designated 323 to the 313LQ accumulator magnets and back to ground (see also Fig. 22f). By thus introducing the nines complement of the amount standing in LQ, the accumulator elements are restored to a 9 position. To bring the accumulator to zero from the all 9 position, an elusive 1 is entered in the units order at the carry time in the cycle. This entry is provided through the contacts LQ5. This impulse is supplied in the following manner: From line 301, through cam contacts CC16, via line 324, through the LQ5 contacts, through the normal carry relay contacts AV39 controlled by relay coil AV (Fig. 22d) down to the units order of the 313LQ magnets. The units order is thus advanced one step and the electric transfer devices of the accumulator cause advance of all the other higher orders one step.

Reset of ML devices

Upon energization of 321ML, the ML1—18, 27—38 contacts (Fig. 22a) and the ML19 contacts (Fig. 22b) shift to reverse position from that shown. The shift of contacts ML19 places a nines complementary emitter 344 in circuit and nines complementary impulses are emitted from this emitter through the straight readout sections of the MLR1—2, the MLR3—6, MLR4—8, MLR5, MLR7, MLR9. Considering the MLR9 readout, the nines complementary impulses of the amount standing in the related receiving device flow through it and via a group of lines generally designated 345 (Figs. 22b and 22a), through the ML 33—37 contacts to the 313ML9 accumulator magnets and back to ground. By such nines complementary impulses the ML9 receiving device is brought to an all 9 position. The closure of contacts ML38 allows a circuit to be established to the carry impulse line 324, the circuit being completed through the now closed carry relay contacts AV55 to the units order 313ML9 accumulator magnet. This provides for an entry of one in the units order of this accumulator and thereafter the regular electric transfer contacts provide for carries into high orders. This resets the ML9 receiving device to zero. The other multiple receiving devices are reset in a generally similar manner and individual reset circuits need not be traced therefor.

In the testing of "9"s, in the event that one of the elements of the LD accumulator is off the 9 position, this circuit will not be established since it will be broken at one of the readout sections of the LQR readout. Such circuit, however, can be established to bring about reset by depression of the manually operated key 405 (Fig. 22h). The reset key 405 connects the lines 338 and 337.

In checking operations the energization of the RD reset coil 321D causes the closure of its relay contacts RD7 (Fig. 22c) so that upon the closure of contacts CC4 a circuit is closed from the ground through contacts CC4, the relay contacts RD7 to the relay coil A which is connected to the line 301. It will be recalled that during checking-dividing operations, the AS relay is energized so that the opening of relay contacts AS5 will prevent the energization of any of the AA and Z coils (Fig. 22c). The opening of the relay contacts AS6 will prevent the transmission of an impulse to the relay coil AB, thereby enabling it to be retained in deenergized condition. Since contacts AS8 are in shifted position, the latter will cut off the punch readout strip and due to the shifted position of these contacts, a circuit will be closed to the punch magnet 360 so that by the repeated energization of punch magnet 360 under control of escapement contacts 358 the card may be passed through the punch without any recording operations thereon.

The closure of relay contacts RD8 brings about energization of the relay coil E upon the closure of cam contacts CC20 and XC10 whereupon the E2 contacts close to cause an energization of the card feed clutch magnet 304 and the XC clutch magnet 321. Checking operations pertaining to a new card are then initiated.

There was previously described the matter in which the SP accumulator was reset. The circuit to energize the 321SP reset coil is from the line 301 (Fig. 22e) through cam contacts CC3, relay contacts B2 which are closed by the B relay coil when the punch carriage is at the last column position, through relay contacts HH2 now closed, and through the relay contacts D2 now closed, thence through relay contacts AS10 now closed, to the 321SP relay coil, thence to ground. It will also be recalled that the stick circuit for 321SP relay coil is through the SP8 contacts and cam contacts CC5. During the time that the cam contacts CC5 are closed, cam contacts CC21 will close (see Fig. 19) thereby closing a circuit from the line side 301 through contacts CC5, thence through stick contacts SP8, relay contacts AS10, through cam contacts CC21 and through the restoring magnet 341SE for the stepping switch SE. The energization of this magnet will enable the switch arm of the stepping switch SE to return to its normal position.

Under the first condition mentioned above, when complementary quotient entries are shifted relatively one place to the left, provision must be made for shifting the test circuits for testing for all nines in LQ relatively one place to the left. This is provided for by shift contacts ZZ0—8, 13—17 (Fig. 22h) which shift the circuits between the SE stepping switch and LQR to limit the number of columns explored for all nines and to cut off exploring unwanted columns to the right.

Under the second condition, that is a going condition, one or more of the relay coils ICU to 9CU will become energized (Fig. 22c). With one or more of such relays energized, the associated ICUI, 2CUI, etc. (Fig. 22f) contacts shift so that the energizing circuit to coil LL will be broken. Accordingly, referring to Fig. 22d, contacts LL4 will remain open and there will, accordingly, be no energization of relay ZZ. With relay ZZ de-energized, there will be no shift of complementary quotient digit entries and no shift of the test circuit for testing for an all nines condition.

*Rounding off device and recording of rounded quotient digits*

The dividing machine disclosed in the application of J. W. Bryce et al., Serial No. 213,044, filed June 10, 1938, is equipped with a device for automatically rounding off the quotient digits to a desired order. This, as more fully stated in the application referred to, is accomplished by entering the amount, say five, in one order to the right of the order which is to be rounded off and which order is the last order to be recorded by punching. The present machine is provided with an arrangement for checking quotient digits to which have previously been applied the rounding off of the desired digit but in order to understand the operation of this checking device, a general description will be given of the device for effecting the rounding off.

If it is assumed that the computation is to be carried out to four quotient places, which would be the case in securing the quotient digits 0608 in the problem shown in Fig. 29, the place limiting devices of the machine are set for such four-place quotient. However, when the rounding off feature is employed, the 5 increment must be introduced in an order to the right of the last desired quotient place and if such 5 is introduced into such order then the machine may carry the computation further and terminate the computation not in the last desired quotient place or order but in one place or order beyond. The place limiting control, therefore, has to be modified to allow the machine to carry the computation one step or order further than is desired for the last quotient place itself.

By may of further explanation and with particular reference to Fig. 29, the operation of the dividing machine disclosed in the above mentioned application is outlined for dividing the dividend 238469 by the divisor 392. When the machine is set for a four-quotient place, the quotient derived will be 0608. However, in utilizing the rounding off feature, the machine goes through an additional computation so that the next quotient place will be derived and which would be exhibited on the LQ accumulator as 0608.7. With the application of the 5 increment, the following computation will be performed by the machine disclosed in the last mentioned application.

```
0608.7
   .5
------
0609.2
```

It will be noted that the quotient result has now been rounded off to the third place, making the quotient in round figures 0609 but in the extreme right order there is an additional representation of "2" in the LQ accumulator, which is meaningless. For this reason, the dividing machine in the application referred to has the provision of means for preventing recording beyond the last significant quotient place and for entering a zero in such order in which recording of remainder digits is not desired. This accounts for the quotient 0609.0 shown in the problem outlined in Fig. 30 and the final zero is actually recorded on the card as is represented in the outline of the problem.

To better understand the checking for rounded off quotients, the manner in which the operation for rounding off is carried out and also the accompanying quotient recording will now be given with particular reference to the drawings.

In Fig. 29 the calculation to be described is there shown for securing the quotient as limited to four digits of the quotient. The augmented entry of five is placed in an order of LQ just to the right of the order which receives the "8" quotient digit entry.

Figure 30:
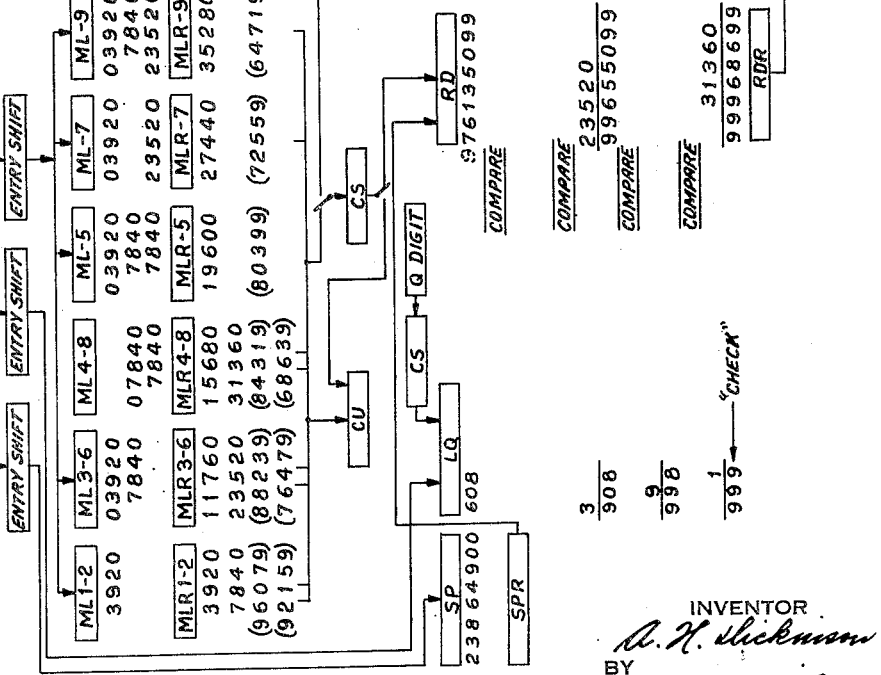

To prepare the machine for rounding off operations, the insertible plugboard utilized for such operations will have a plug connection established between socket 393 (Fig. 22f) and one of the group of the 394 sockets. The particular one of the 394 sockets which is plugged for the computation to secure the quotient of Fig. 30 is the fifth socket from the left. Another plug connection will be established between sockets 395 and 396 (Fig. 22d). This latter plug connection will bring about a maintained energization of relay coil J.

Referring to Fig. 22e with relay coil J energized relay contacts J3—10 will be in reverse position from that shown and accordingly, with a plug connection between the plug socket 389 and the "4" plug socket 390, signifying a four-place quotient computation, the machine will not terminate its computing operations with the arm of the switch SB establishing contact with the fourth contact spot, but in contradistinction the machine will continue the computation until the switch arm establishes contact with the fifth contact spot. The foregoing control will carry the computations performed by the machine on division to one further dividing or comparing cycle beyond that required for the fourth quotient place.

Referring now to Fig. 22e, energization of the relay coil J will shift JI contacts to reverse position from that shown. Such contact shift will place the 340SD stepping switch coil in parallel with the 340SB switch coil so that upon each energization of 340SB there will be a simultaneous energization of 340SD.

As more fully disclosed in the above mentioned application, Serial No. 213,044, the "5" entry will be made in the second comparing cycle and such "5" entry is made under control of relay contacts CSb7 (Fig. 22f) so as to prevent rounding off unless the quotient is computed to at least two places. The "5" entry in the selected column is brought about in the following manner: During the comparing cycle mentioned, relay coil CSb becomes energized, due to the position of the switch arm SB related to the CS coils (see Fig. 22e). The energization of CSb closes its contacts CSb7 (Fig. 22f). Likewise, during the cycle in which the dividend is being compared, relay coil DD is energized, causing the closure of its contacts DD11. Cam contacts CC22 are timed as shown in Fig. 19 to close at the "5" index point in the cycle. Accordingly, a current impulse will flow at such time from line 301 through CSb7 through DD11, through CC22, via the plug connection from socket 393 to the socket 394 which is the fifth from the left in Fig. 22f, and thence down to the related columnar order LQ, in this instance the four accumulator magnet from the extreme left because relay coil ZZ was previously energized, due to an initial "no go" condition. This will enter "5" in such accumulator during the above mentioned comparison cycle.

According to the rounding off operation now being described, relay coil H (Fig. 22e) will not become energized in the fourth quotient entry cycle but in the following or fifth quotient entry cycle. This will be effected by the control which is afforded by the relay coil J, J3 to J10 contacts and the SB stepping switch. By the time the H relay coil has become energized, the last quotient digit of "7" will have been entered in the order of the LQ which receives the "5" entry. The usual carry will take place and the setting in the fourth order will be augmented from eight to nine and the fifth order represents "2."

It has just been explained heretofore that the stepping magnet 340SD will be energized concurrently with the energization of the stepping magnet 340SB. This magnet will effect the step-by-step positioning of the stepping switch arm SD shown in Fig. 22c and inasmuch as the SB switch steps to the fifth contact position, the SD switch (Fig. 22c) will likewise step to the fifth contact position and place the relay coil AW in circuit with the line 301.

As more fully disclosed in the application Serial No. 213,044, filed June 10, 1938, on dividing operations due to a shift in the entry of the divisor and dividend there is a selective energization of the Z and AA coils. The AA relay coils are selectively energized according to the entry shift of the divisor upon entry and the Z relay coils are selectively energized according to the entry shift of the dividend upon entry. The selected energization of the Z and AA relay coils is brought about under control of the presensing control, which presensing control, it will be recalled, has effected the energization of selected V and W relay coils, thereby causing the closure of certain V2 and W2 contacts, respectively.

The energization of the reset relay coil 321RD, it will be recalled, is effected just prior to punching operations and the energization of reset coil 321RD causes the closure of contacts RD7 (Fig. 22c). Upon closure of cam contacts CC4, the circuit is established from the ground through such cam contacts, through RD7 contacts, through the now closed W2 and V2 contacts, to the selected AA and Z relay coils, respectively, to the line side 301. A branch circuit is also closed from the RD7 contacts by a line 352 to the A relay coil and from this line through the AS6 contacts now closed, to the AB relay coil, both the A and AB relay coils being connected to the line side 301. This brings about the energization of relay coils A and AB and the relay coil A closes its stick contacts A1. A branch circuit is also closed from the line 352 through the relay coil AW and the arm of stepping switch SD now at the fifth contact position to the line 301, thereby causing the energization of the relay coil AW.

All of the relay coils A, AB, AA, AW and Z will be maintained energized through the A1 stick contacts, the circuit extending back to ground through the LQ7 contacts or the AS7 contacts in the position shown. The opening of this stick circuit is timed to open by contacts CC15, which open after LQ7 or AS7 open. With relay coil AW energized, the contacts AW1 (Fig. 22h) will shift to reverse position.

Considering more specifically the particular AA and Z relays which are energized, it will be recalled that with the problem (Fig. 29) under consideration there is an energization of the W$h$ relay (Fig. 22c). This relay closes its contacts W$h$2 to cause the energization of the relay coil AA$h$. The energization of relay coil W$h$ signifies that the divisor has been shifted to the left one column upon entry.

Also in the problem (Fig. 29) under consideration, the relay coil V$ht$ is energized and this relay closes its contacts V$ht$2 to cause the energization of the relay coil Z$ht$. The energization of the relay coil V$ht$ signifies that the dividend is shifted two columns to the left. Therefore, in the problem under consideration, the relay coils Z$ht$ and AA$h$ are energized to control the shift upon recording. Each of these relays closes its related contacts Z$ht$1—15 and AA$h$1—15 (Fig. 22h) and the closure of these contacts will establish a readout relation between the LQR readout and sockets 355 so that there will be a punching not in the extreme left hand field of the record card but in a field shifted four columns to the right from the extreme left hand field.

The number of columns in which the quotient amount is shifted back to the right upon final recording is determined by the following formula:

$S_{DD}+(S_{DR}-S'_{DR})$, where $S_{DD}$=the number of positions, the dividend (DD) is shifted to the left upon entry.

This amount of shift may also be taken to be the maximum number of dividend places available in RD less the actual number of dividend places in the dividend amount, and where $S_{DR}$ equals the maximum number of available divisor places in the divisor entry receiving divisor minus one, and where $S'_{DR}$ equals the number of columns the divisor is shifted to the left upon entry. This number of columns may also be taken to be the number of columns the actual divisor is less than the maximum number of available places in the ML entry receiving devices.

Substituting the above values in the formula, we have $2+(3-1)=4$ which is the number of places that the quotient is shifted back to the right upon final recording under the presensing control.

It will be assumed that sockets designated 355 in Fig. 22h are connected by plug connections to selected sockets 356 of the punch in Fig. 22c. If the circuits from the four left hand sockets of the 355 group are traced, noting AA$h$1—15 and Z$ht$1—15 closed, it will be found that each circuit extends back to a line 391 which connects to a line 392 and that this circuit is completed back to line 301 through the now closed AB1 and AB2 contacts to and through the zero interposer magnet 353. This will provide for punching four zeros on the record card in columns of the quotient field not controlled by LQR.

Now referring to the fifth socket from the left of the 355 group, it will be noted that this circuit is completed through the AAh5 contacts through the Zht3 contacts to a line 354 which extends up to the extreme left hand order of LQ. Inasmuch as the brush in this order is standing upon 0, the 0 punch selector interposer magnet 353 will be energized during the punching operation. If the line from the sixth socket from the left of the 355 will be traced, it will be noted that this circuit is completed through the AAh6 contacts, through the Zht4 contacts through the non-shifted GG1 contacts to the second order of LQR. In this order the brush is standing on the 6 spot so that the line will be completed through the AB8 contacts to and through the 6 interposer magnet 353.

Considering now the seventh plug socket from the extreme left, a circuit will be traced through the AAh7 contacts, through the Zht5 contacts, through the non-shifted FF1 contacts to the third order from the left of the LQR readout and in this order the brush is standing at the 0 position to thereby effect the recording of the 0 digit. Similarly, for the fourth order from the left of LQ, a punch selecting circuit will be closed to record a "9".

Considering now the ninth socket from the left of the sockets 355, a circuit will be traced through the AAh9 contacts through the Zht7 contacts, to and through the AW1 contacts which are now shifted and with such contacts shifted it will be noted that the circuit to the common readout segment in the fifth left hand order of the readout segment of LQR will be cut off, but such circuit will be completed over to line 392 which, it will be recalled, is a circuit to the "0" 353 interposer punch selector magnet. Thus, in lieu of punching a 2, the digit standing in this particular order of the LQ accumulator, there will be a "0" punched on the record card in the related order.

The foregoing description has explained the circuits for selectively reading out amounts to the punch on final recording. Punching occurs successively column by column in the usual way, the control circuits being those just traced in detail for result recording, but it may be mentioned that the return circuit from any plug socket 356 is via the punch readout brush to the common strip of the readout, thence via wire 357 (Fig. 22c), the AS8 contacts, the usual escapement contacts 358 of the punch, through the stick contacts A1 and thence back to ground. The energization of any interposer magnets 353 (Fig. 22h) closes the interposer controlled punch magnet contacts 359 (Fig. 22g) and energizes the punch magnet 360 in the usual manner. Punching then proceeds in the usual way column by column and eventually the card reaches the beyond last column position and closes P5 (Fig. 22d) energizing coil B. Energization of B closes contacts B1 and energizes the eject magnet 361 of the punch. Card eject then occurs and contacts P3 become closed to condition control circuits for a succeeding computation.

In this type of operation provision is made to delay release of the SD stepping relay switch arms until after punching is completed. Referring to Fig. 22e it will be noted that the circuit for energizing the reset coil 321LQ is through the cam contacts CC3, through the B2, HH2 and D2 relay contacts, through AS9 contacts in the position shown through relay coil 321LQ to ground. When such coil becomes energized, a circuit is completed from the AS9 contacts through cam contacts CC21 to energize the 341SD release magnet. While there is also an energization of release magnet 341SE at this time, this is without effect because the SE switch arms are now in home position. Energization of 341SD, however, will release the arms of the stepping switch and allow them to return to home position as shown.

*Checking of records to which rounding off of quotient digits has been applied for final digit correction*

There was previously explained the manner of operation of the machine in which a series of records are passed through for final digit correction of the quotient and it will be recalled that this has been attained by causing the dividing mechanism to go through an extra cycle of computing operation so as to compute the quotient digit to an extra place at the right. The supplemental quotient digit obtained is added to the invariable entry of 5 in the same order so as to round off the next quotient digit to the left. There has also been explained the manner in which recording is effected for rounded off quotient digits. There will now be explained the operation of the machine for checking such records.

Referring to Fig. 24, there will be seen the plug connections which are made prior to such checking computations and it will also be observed that as far as the entries of the quotient, dividend and divisor are concerned, plug connections similar to those in Fig. 23 are made. A plug connection is also made between the plug sockets 364 and 398, which plug connection is established for checking operations.

It was previously assumed that the machine was conditioned for securing a four-place quotient digit attained by the place limiting devices controlled by the plug connection between the socket 389 and the "4" plug socket 390. It will also be assumed that the cards of a run which are to be checked have also been computed to four quotient digits, and for this reason the operator will effect a similar plug connection between the socket 389, the same plug socket and 390, as will be observed from Fig. 24. In addition to these plug connections, there is a supplemental plug connection between the sockets 395 and 396 which, as shown in Fig. 22d, will cause the maintained energization of the relay coil J. Since, in the previous rounding off operation, an invariable entry of 5 was made in the fifth order from the left of the LQ accumulator, such amount must be deducted from this order and this deduction is effected by making a plug connection between the socket 393 and a selected socket 394, and plug connections between sockets 406 and the plug sockets 394 at the left of the selected socket 394. In the present problem, since the deduction of the 5 is made in the fifth order of the LQ accumulator from the left, a plug connection is made from the socket 393 (Fig. 22f) to the fifth plug socket 394 from the left. The four remaining plug sockets to the left are plug connected to four plug sockets 406 which are at the left so as to effect the entries of nines in certain orders of the LQ accumulator.

There was previously explained the manner of the operation of the machine for rounding off the quotient digit of the problem shown in Fig. 29 resulting in the recording of the quotient as -0609- in Fig. 30 and the operation of the machine will be described in connection with this problem, it being noted that as far as dividing operations are concerned they are similar to the checking-dividing operations previously described and outlined in Fig. 29. The additional operations which are effected will, however, be described in order to disclose the manner of checking the correction of the final quotient digit.

There will, of course, be an entry shift for the dividend, quotient and divisor and, as previously described in the checking-dividing operations, there will be an initial "no go" computation which is determined during the first comparison cycle. The extreme left hand order of the LQ accumulator will therefore remain at zero representing position. Thereafter, a second comparing cycle will be initiated and the switch SB will then be at the 2 contact making position, causing energization of the column shift relay coil CSb. This relay coil will close its contacts CSb7 (Fig. 22f) and CSb8 (Fig. 22g). During the second comparing cycle with contacts CSb7 now closed, a circuit will be established from the line 301 through contacts CSb7, through DD11 contacts now closed, cam contacts CC22, the plug connection between plug socket 393 and the plug socket 394 which is the fifth from the left, and since the relay coil ZZ is energized due to an initial "no go" condition, the circuit will be continued by the ZZ9 contacts now shifted, and down through to the 313LQ accumulator magnet which is the fourth from the left and thence to the ground. The previously recorded quotient as shown in Fig. 29 is -0609.0- and upon entry shift this will be entered in the LQ accumulator as 609 in the three left hand orders, as indicated in Fig. 30 and in such orders there is an entry of a set of 9's in the same cycle of operation that the 5 is entered in the fourth LQ accumulator order from the left. Referring to Fig. 22g, it will be seen that a circuit is established from the line side 301, through the AM22 relay contacts now closed, through the BE relay coil, through relay contacts DD21 now closed, to the CSb8 contacts, thence through cam contacts CC37 to the ground. From Fig. 19, it will be seen that upon the initial part of the cycle, cam contacts CC37 will close; resulting in the energization of the BE relay coil which will close its contacts BE1-10 (Fig. 22f) and at the time cam contacts CC37 are closed, commutator 343 will have been rotated to cause the transmission of impulses representing the digit nine, the circuit for transmitting such impulses being from the line 301, through the CSb7 contacts now closed, commutator 343, thence through the BE1-4 relay contacts, to the four plug sockets 406 at the extreme left. It will be noted that for the second, third and fourth plug sockets 406 from the left, the circuit is continued through the BHa1, BHb1, BHc1 relay contacts now closed. The plug connections from the sockets 406 to the four left hand sockets 394 will effect the entry of the 9 in each of the three left hand accumulator magnets 313LQ. It should be noted that due to the opening of the ZZ2 contacts, the 9 digit representing impulse to the extreme left hand socket 394 is ineffective. With the previous entry of the quotient digit 609 in the LQ accumulator, there is now added 9995, giving as a remainder 6085 as shown in Fig. 30. This, in effect, causes the deduction of 5 from the LQ accumulator.

After it has been determined that there is an initial "no go" operation in the problem adopted, successive comparing cycles ensue and such operations are carried out in precisely the same manner as explained for checking-dividing operations. A comparison between the outline of Fig. 30 and the outline of the problem in Fig. 29 will indicate the similarity in the computation. The machine then goes through successive comparing cycles, comparing successive comparison portions of the dividend with the multiples of the divisor and the nines complement of the quotient digits obtained are entered in successive orders of the LQ accumulator. The nines complement of the quotient digits 608 are 3,9 and 1 which are entered in the orders of the LQ beginning at the left. At the termination of the fourth comparing cycle, the LQ accumulator will represent 9995.

The plug connection between the plug sockets 395 and 396 (Fig. 22d) has caused the maintained energization of the J relay, thereby shifting the J3—10 contacts (Fig. 22e). In precisely the same manner as has been explained in the description of the manner of operation for rounding off quotient digits, the machine goes through an additional computation which is initiated upon a fifth comparing cycle. The switch SB in this instance is now in the 5 contact position so as to enable the energization of the relay H at the termination of the fifth comparing cycle. This additional computation determines that the next quotient digit to be secured would represent the digit 7 and the nines complement thereof or 2 is entered in the LQ accumulator in the cycle of operation after the fifth comparing cycle. Thereafter, there is a test of the LQ accumulator to determine the presence of all nines in certain orders and such is carried out by means now to be described in detail.

Referring to Fig. 22e, the stepping switch relay coil 340SD receives an impulse by the energizing circuit previously traced for the energization of the stepping switch relay coil 340SE. The stepping switch arm SD shown in Fig. 22h is positioned step by step concomitantly with the stepping switch arm SB and during the fifth comparing cycle of operation the switch arm SD will be in contact with the 5 contact point. In the operation now being described, both the relays J and AM are energized, thereby opening their respective contacts J2 and AM10 (Fig. 22h), thus disconnecting the switch arm SE from the line 337, maintaining the switch SE ineffective. The line 337 is thus continued to only the switch arm of the stepping switch SD and at the 5 contact position it will be noted that the circuit is continued to the intermediate blade of relay contacts ZZ13 now in shifted position and the circuit then leads to the common segments and the brushes of the readout of the LQR which are all at the 9 position, the circuit then being continued from the 9 contact point of the readout order of the LQR at the extreme left, to the line 338. This line, as previously described, extends to Fig. 22e to cause, upon its closure, the energization of the 321ML, 321LQ and 321RD reset relay coils. This checking circuit and the manner of operation of the machine involving the depression of the key 405 (Fig. 22h) has previously been described in detail and further description at this point appears to be unnecessary.

Upon an examination of the problem outlined in Fig. 30, it will be noted that all nines are represented at the three left hand orders of the LQ, prior to the additional computation carried out to secure the fifth quotient digit and it is, naturally, suggested that the machine may, at this time, test the position of the LQ accumulator for accuracy of recording in rounding off quotient digits. It is pointed out that in other checking computations it will be necessary to carry out the additional computation for securing the last quotient digit since the addition of the nines complement of this last quotient digit will be added to the amount in the LQ accumulator and will bring one or more orders thereof to nine if not standing thereon.

To make the checking operation more clear, it will be assumed that the recording quotient, when the rounding off feature is applied, has been incorrectly recorded as -0608-. When such record passes through the machine, this amount will be entered in the LQ accumulator and the 5 deducted therefrom which will now represent 607.5 in the LQ accumulator. The securing of the quotient digits will cause the entry of the nines complement thereof or -391- to the LQ accumlator which will now represent 998.5. The additional computation to secure the next quotient digit will then be carried out and the nines complement of such quotient digit or the 2 will be entered in the LQ accumulator, now bringing the amount to 998.7. The nines testing operation then ensues in which it will be determined that an all nines condition is nonexistent, thereby indicating to the operator the incorrect recording or computing of the quotient digits.

The above problem indicates the under-recording of the rounded off quotient digits and an indication of a problem in which over-recording of the quotient digits is secured would be the representation of the quotient number as 0610. The initial deduction of 5 would bring this to 609.5 and the addition of the nines complement of the quotient digits, or 391, added thereto would cause the LQ accumulator to represent as a final entry 000.5. The lack of an all nines condition would indicate to the operator the incorrect recording. The above makes it clear that the machine is capable of determining under or over-recording of the rounded off quotient result.

*Division computations controlled by records having recorded thereon quotient digits to two decimal places with fixed decimal place rounded off*

The feature of effecting division computations under control of records so as to record on the same records quotient digits to one, two, three decimal places or to the units place with the fixed decimal or units place rounded off is claimed and fully shown in the application of A. H. Dickinson, Serial No. 388,624, filed April 15, 1941, but the general description of carrying out such operations for two decimals is also explained herein to more clearly understond how records of such types are checked by the present machine. The checking mechanism is shown here in detail and claimed in this application.

In effecting division computations in which quotient digits are secured for two decimal places, the series of cards controlling the computations may vary in the size of the DD and DR amounts, from card to card. However, once the proper plug connections are made the rounding off device operates automatically and functions to:

(a) Enter a corrective "5" in the fixed final decimal digit place.
(b) Determine how many quotient digits must be computed.
(c) Terminate dividing computations.

A single problem which is outlined in Fig. 33 will be used as an explanation of the operation of the machine for securing this specific type of rounding off operation.

The plug connections which are to be made for effecting the entry of the dividend and the divisor are precisely those shown in Fig. 25, plug connections being made between the plug sockets 367 associated with the presensing brushes 371 and the plug sockets 383 for effecting the entry shift of the divisor, and also between the plug sockets 367 and the plug sockets 384 to effect the entry shift for the dividend. Plug connections are made between the plug sockets 309 and plug sockets 373 for effecting the entry of the dividend in the RD accumulator. Plug connections are also made between the plug sockets 309 and the plug sockets 311 for effecting the entry of the divisor in the ML receiving devices. It should be noted that, although shown, the plug connection between plug sockets 364 and 398 (used only for checking) are not made so that in the operations now described the AM and AS relays are deenergized (Fig. 22d).

It will be recalled that in regular dividing operations the presensing of the DR and DD causes selective energization of the S and T relays and due to the entry shift of the dividend for four places (see Fig. 33), the S$th$ relay (Fig. 22c) will be energized and it will close its S$th$1 contacts to effect the energization of the relay V$th$. This relay in turn closes its V$th$2 contacts to cause the energization of the relay coil Z$th$. Similarly there is an entry shift of the divisor and considering the problem shown in Fig. 33, there will be an entry shift of two places for the divisor which will cause the energization of the relay coil T$t$ which, in turn, causes the energization of the relay coil W$t$ and the latter, in turn, causes the energization of the relay coil AA$t$. It will also be recalled that coils Z$th$ and AA$t$ being energized close their stick contacts so as to retain the energization of the setup of the relay coils until the next card cycle.

For effecting the operations now being described, additional plug connections are made as shown in Fig. 25. A plug connection is made between the plug sockets 395 and 396 which are also utilized in checking-dividing operations as previously described. A plug connection is also made between the plug sockets 409 and 410 which are also shown in Fig. 22g, thereby extending the line 301 to certain circuits which will be later described in detail. A plug connection is also made between the plug socket 393 and the plug socket 408, and also a plug connection between the plug sockets 407 and 389. All of the last mentioned plug sockets are shown in Fig. 22f except plug socket 389 which is shown in Fig. 22e.

During regular dividing operations, it will be noted from Fig. 27 that there is a reset of the LQ accumulator and upon such reset LQ17 contacts (Fig. 22g) are now closed. A circuit will then be closed from the line 301 (Fig. 22g) through the plug connection between the plug sockets 410 and 409, through AM23 contacts unshifted, through LQ17 contacts and to a line which is connected to one side of the V$u$4 to V$tm$4 contacts, only one selected contact being closed so as to continue the circuit through one of a series of emitters 415 to 422, inclusive. The emitter which will be selected depends upon the particular V relay coil which is energized and is, therefore, dependent upon the entry shift of the dividend. In the problem under consideration, it will be recalled that the relay V$th$ is energized so that its contacts V*th*4 will select the emitter 418. The emitters 415 to 422, inclusive, have their live contact points connected to different lines which are connected to one side of the relay contacts W*u*4 to W*th*4, inclusive. The particular contact of the selected emitter which is to be rendered effective is dependent upon the particular relay coil W energized. In the problem under consideration, the relay coil W*t* is energized and its contacts W*t*4 being closed will be connected to the 5 contact spot of the selected emitter 418. From the common side of the contacts W*u*4 to W*th* the circuit continues through the relay coil BG, to the ground. The energization of the relay coil BG, which occurs during the 5 point of the cycle, will cause the closure of its contacts BG2 and a circuit will then be closed through the commutator 306a through the BG2 contacts to the stepping switch coil 340SF. The emitter 306a is adapted to transmit a series of ten impulses at successive times and with contacts BG2 closed, at the fifth pulse in the cycle the emitter 306a will transmit five impulses to the stepping switch coil 340SF, thereby causing its switch arm SF shown at the bottom of Fig. 22*f* to be moved to the 5 contact making position. The BG relay coil closes its stick contacts BG1, the circuit from the relay coil BG being extended back through such stick contacts and cam contacts CC38 to the line 301. Cam contacts CC38 are closed during the transmission of impulses by emitter 306a. The switch arm SF just described will, of course, remain in its moved position.

Following the LQ reset operation and the positioning of the stepping switch arm SF in the manner just described, dividing computations are initiated as has been described for regular dividing operations. During the second comparison cycle, the column shift coil CS*b* is energized, thereby causing the closure of its contacts CS*b*8 (Fig. 22*g*); and a circuit will now be established from the line 301 at the plug socket 409, through the relay coil BF, through DD21 contacts now closed, through CS*b*8 relay contacts now closed, and through cam contacts CC37 to the ground. The energization of the relay coil BF will shift its contacts BF1—10 (Fig. 22*f*). At the 5 entry point in this cycle, a circuit is completed from the line 301, through relay contacts CS*b*7 (Fig. 22*f*) through DD11 contacts now closed, cam contacts CC22 closed at the 5 point, to the plug socket 393 thence by the plug connection to the socket 408, the circuit is extended through the BF11 shifted contacts to the switch arm SF shown in Fig. 22*f*.

From Fig. 25, it will be noted that the eight left hand plug sockets 406 have plug connections to the corresponding eight plug sockets 394. It will be noted that for simplicity of plugging, the seven left hand sockets 406 are double plug sockets, as is shown in Fig. 22*f*. Since the switch arm SF is now in contact with the 5 switch point, the circuit will be completed upwardly through the BF5 contacts now closed to the related plug socket 406, thence through the plug connection between this plug socket and the sixth plug socket 394 from the left in Fig. 22*f*, thence downwardly to the 313LQ accumulator magnet which is in the sixth order from the left. Thus, the corrective 5 is entered in the sixth left hand order of the LQ accumulator as shown in the outline of the problem is Fig. 33.

In the problem under consideration it is necessary to effect the plug connection between all the sockets 394 and the plug sockets 406 since the entry of the corrective 5 may be effected in any order of the LQ accumulator. This will depend upon the entry shift of the divisor and dividend and, in other words, upon the denominational magnitude of the divisor and dividend amounts.

When cam contacts CC37 open in the second comparing cycle, the relay coil BF will be de-energized and its relay contacts BF1—10 and BF11 will return to the position shown in Fig. 22*f*.

Thereafter, further dividing operations ensue which consist of pairs of comparing cycles and quotient digit entry cycles and in the problem shown in Fig. 33 the machine continues into operation until six quotient digits have been determined. In the manner previously described, the switch arm SB (Fig. 22*e*) will be positioned step by step concomitantly with the division computing operations and upon the determination of the sixth quotient digit and its entry, the switch SB will be in contact with the 6 contact point. A series of plug connections are made from the eight sockets 390 and a series of plug sockets 423, the particular sockets 423 which are utilized for the plug connection being the eight left hand plug sockets from the left as shown in Fig. 22*f*. These plug connections are also shown in Fig. 25. Since the particular problem under consideration involves a rounding off operation, the plug connection between plug sockets 395 and 396 will have been made so as to cause the energization of the relay J and the shifting of its contacts J3—10 (Fig. 22*e*) so that it will be observed that when the switch arm SB is at the 6 contact making position, the circuit will be extended through the shifted J7 contacts to the 5 plug socket 390, it being understood that there is a plug connection between such plug socket and the fifth plug socket 423 from the left.

It will be recalled that one of the functions of the rounding off device now being described is to automatically determine the number of quotient digits which must be computed and automatically terminate dividing computations upon the determination of such digits. This is effected by a circuit now to be described in detail. After the sixth quotient digit has been determined and entered in the LQ accumulator and the related multiple subtracted from the RD accumulator, a circuit is completed from the line 301 through cam contacts CC17, through LL3 contacts now closed, the stepping switch arm of the stepping switch SB now at the 6 contact point position, thence through J7 contacts now shifted, to the 5 plug socket 390, the plug connection to the 5 plug socket 423 (Fig. 22*f*) thence through contacts BF5 now in the position shown, through the stepping switch arm SF at the 5 contact point position, thence through BF11 contacts now in the position shown, to the plug socket 407. From Fig. 25, it will be observed that a plug connection is made between the plug socket 407 and the plug socket 389 (Fig. 22*e*) thereby extending a circuit to the relay coil H to ground. The energization of the relay coil H terminates computing cycles in the manner previously described.

It will be understood that under the control of the rounding off mechanism now being described that the dividing mechanism is controlled to compute the quotient amount to five digits. Six digits were actually computed so that the corrective 5 is entered in the sixth column to correct the fifth quotient order place of the LQ accumulator if the digits 5-9 are standing in the sixth place. In the problem shown in Fig. 33, the last quotient digit is 1 which is added to the last quotient amount on the LQ accumulator, bringing the last order place of the LQ accumulator to represent 6. This, however, will not effect a carry into the next left hand order of the LQ accumulator and therefore no correction is applied in the problem under consideration. Had a carry been effected from the extreme right hand order of the LQ accumulator to the next order to the left of the LQ accumulator, a correction would have been made as would be accomplished in other computing problems.

The quotient amount on the LQ accumulator is recorded in the usual manner, the particular place of recording being selected for the problem of Fig. 33 by the AAt and Zth relay coils. The stepping of the switch SD (Fig. 22c) to the 6 contact making position causes the energization of the relay coil AZ which shifts its contacts AZI, so that for the sixth order of the LQR readout the common readout segment for this order is disconnected in the manner previously described, and instead line 391 is connected to the plug socket 356 of such column place recording. Line 391, it will be remembered, causes the selection of the "0" punch to punch a zero in the sixth order of the LQ instead of the 1 therein, which is of no import.

Also the energization of the relay H (Fig. 22e) shifts its contacts H2, so that when CC14 closes, the switch arm release coils 341SB, 341SF are energized concurrently. Thus, the associated switch arms will return to home position prior to the next card controlled computation.

*Checking records having recorded thereon quotient digits determined for two decimal places with the final decimal place rounded off*

There will now be explained the checking of records which are recorded by the operations outlined in detail in the preceding section of the specification. The outline of the procedure for the checking of such records is shown in Fig. 31 and the plug connections which are to be established for checking such types of records is shown in Fig. 25. The plug connections described for computing such records differ from the plug connections for checking such records by the addition of the plug connection between plug sockets 384 and 398 which are always made for checking operations. It will be noted from Fig. 22d that such connection maintains the energization of relay coils AM and AS.

Checking-dividing operations were previously described in detail and the same operation of the machine is carried out for checking records of the type now being considered. It will be recalled that, in brief, the ML receiving device readouts provide the complements of the nine multiples of the multiples of the divisor and these are compared with successive comparison portions of the complement of the dividend in the RD accumulator. There is, of course, a complementary comparing cycle and a quotient digit entry cycle for the determination of each digit and each quotient digit as derived is entered as a nines complement digit in the LQ accumulator.

It will also be recalled that checking-dividing operations are initiated upon the reset of the SP accumulator instead of by the reset of LQ accumulator as was previously described. Accordingly, the circuit for effecting the energization of the relay coil BG and the stepping switch coil 340SF is completed during the SP reset which, it will be noted from Fig. 28, takes place before the initial complementary comparing cycle. From Fig. 22g, it will be noted that the circuit for effecting the energization of the BG relay and switch coil 340SF is now completed through the AM23 contacts now shifted and through the SP15 contacts now closed; otherwise the circuit for effecting energization of the BG relay coil and switch coil 340SF is precisely the same as that described in the last section. Therefore, since the same dividend and divisor amounts are being considered in the problem now described, the SF switch arm (Fig. 22f) will be shifted to the 5 contact making position.

As described before during the second comparison cycle the relay coil BF (Fig. 22g) becomes energized, and since the AM22 contacts are now closed a circuit will also be closed from the ground through cam contacts CC37, contacts CSb8, DD21 now closed, through relay coil BE, through AM22 contacts now closed, to the line 301. Thus, the relay coils BE and BF are concurrently energized and are maintained energized for the same length of time by the cam contacts CC37. It will also be recalled that the energization of the BF relay shifts its contacts BF1—10 and 11 so that the closure of contacts CC22 will, through the stepping switch arm SF (Fig. 22f), cause the entry of the 5 in the sixth order of the LQ accumulator precisely in the same manner as was previously described. The entry of this corrective 5 is outlined in Fig. 31 and during the same cycle of operation a series of nines are entered in the LQ accumulator orders to the left by means which will now be described in detail. With the BE1—10 contacts shifted at the time the 5 is entered in the selected order of the LQ accumulator, the nines commutator 343 will, through the plug connections between the plug sockets 406 and 394, transmit a series of nines digit representing impulses in all orders of the LQ accumulator except the sixth order from the left. This is prevented by means now to be described in detail. A second switch arm SF shown in Fig. 22g is also positioned to make contact with the 5 contact point, thereby closing a circuit from the ground through the BHe relay coil, to the 5 contact point, the switch arm SF now being considered, and thence by a line 424 through contacts AM22 since they are now closed, to the line 301. The energization of relay coil BHe will therefore open its contacts BHe1 (Fig. 22f), thereby disconnecting the commutator 343 from the plug socket 406 which is the sixth from the left. This will, of course, prevent the entry of 9 in the same order of the LQ accumulator in which the corrective 5 was entered.

There may be entries of nines in the LQ orders which are to the right of the order which receives the corrective 5 but this has no effect upon the checking operation and it is unnecessary to provide devices to prevent the entry of such spurious nines.

The above entry operations for the nines and the corrective 5 will, in effect, deduct 5 from the quotient amount in the LQ accumulator. Thereafter successive comparing cycles ensue with consequent entry of complements of the quotient digits, these being carried out precisely in the manner explained for other checking operations. At the termination of the checking-dividing-computing operation, the LQ accumulator will, if the recorded quotient has been correctly rounded off, exhibit a series of nines. The all nines condition is tested in the manner previously described so as to control further operations of the machine. All of this has been described in detail before and its repetition would be superfluous.

*Computations controlled by records having the number of quotient digits and place of recording automatically determined by the denominational magnitude of DD and DR*

A feature of the application of A. H. Dickinson, No. 388,624, filed April 15, 1941, is the possibility of effecting division computations controlled by records in which the number of quotient digits recorded thereon and place of quotient recording are automatically determined by the denominational magnitude of the dividend and divisor, the recording being effected at a fixed place for each quotient number. Various quotient recordings are illustrated as follows:

23416.6
.8
22.4
1.6
369.4

The present application is concerned with the checking of such records but in order to more clearly understand the manner in which such records are checked, there will now be given a general description of the manner in which computations are effected for such records.

The plugging which is necessary for causing the automatic determination of the number of quotient digits which are to be secured is shown by way of example in Fig. 26 with particular reference to the plug connections between the plug sockets 409 and 410, 407 and 389 and the series of plug connections between the plug sockets 390 and 423. It should be noted that the plug sockets 364 and 398 are not interconnected by a plug connection because checking-dividing operations are not now being carried out.

With the machine now plugged up for regular dividing operations, such operations will be carried out in the manner previously described and by comparisons of the multiples of the divisor with successive comparison portions of the dividend, the quotient digits will be determined and entered in the LQ accumulator. Considering the dividend and divisor amount in the problem in Fig. 32, it will be noted that four quotient digits 608.7 are secured and the number of quotient digits is determined by the V and W relays which are selectively energized in accordance with the denominational magnitude of the DD and DR. The selective energization of these relays, as previously described, is dependent upon the entry shift of the dividend and the divisor. This problem was previously considered and it will be recalled that due to the entry shift, V*ht* and W*h* relays are energized and such relays will close their related contacts. In Fig. 22g the V*ht4* relay contacts will be closed and also the W*h4* contacts will also be closed and with these relay contacts closed, there will be an automatic termination of the computing operations on securing the predetermined number of digits. In this problem emitter 420 will be effective and accordingly the switch SF (Fig. 22f) will be given six steps of movement and due to the plug connection between the 6 plug socket 423 and the 5 plug socket 390, a circuit will be closed upon securing and entering the fifth quotient digit as follows: from the line 301, cam contacts CC17, LL3 relay contacts now closed, the switch arm SB at the 5 contact point position, through the relay contacts J7 now in the position shown, to the 5 plug socket 390, thence by the plug connection to the 6 plug socket 423 to the BF6 contacts now in the position shown, through the switch arm SF now at the 6 contact position, thence through the BF11 contacts now in the position shown, to the plug socket 407, thence by the plug connection between the plug socket 407 and plug socket 309 to the relay H, thence to the ground. It will be recalled that the energization of the relay H terminates computing operations.

With regard to quotient recording, the Z*ht* and AA*h* relays are energized and in accordance with their energization, their relay contacts 1–15 (Fig. 22h) will be closed so as to determine the place of recording under control of the LQR readout.

*Checking of records in which quotient digits are recorded thereon and which were previously automatically determined by the denominational magnitude of the DD and DR*

Records of the type which were made in accordance with the operation of the machine disclosed in the preceding section are capable of being checked in the present machine. The outline of such checking computations is shown in Fig. 32 and the plug connections are made as shown in Fig. 26. It will be noted that plug connections are made as described in the preceding section and in addition there is a plug connection between the plug sockets 364 and 398.

Checking-dividing operations have been described in detail and it is thought that a repetition of the description of operation and the parts involved would be unnecessary at this point in the specification. It will be recalled that there is a series of comparison cycles in which the nine complements of the multiples of the divisor are compared with successive comparison portions of the dividend which are entered in the RD accumulator as a complement. The complements of the quotient digits are successively entered in the LQ accumulator and added to the true number quotient amount previously entered therein.

The termination of the operations for securing the number of quotient digits necessary to check the recorded quotient is automatically determined as explained in the preceding section; that is to say, upon securing the last quotient digit and entering its complement in the LQ accumulator in the proper demoninational place the relay H will be energized. Thereafter there is a test for nines in the LQ accumulator in the manner previously described which will indicate whether or not the recorded quotient is correct.

While there has been shown and described and pointed out the fundamental novel features of the invention as applied to the several embodiments, it will be understood that various omissions and substitutions and changes in the form and details of the devices illustrated and in their operation may be made by those skilled in the art without departing from the spirit of the invention. It is the intention, therefore, to be limited only as indicated by the scope of the following claims.

What is claimed is:

1. In a record controlled machine for checking the accuracy digits of a previous recorded quotient result in which the final recorded digit thereof at the right had been rounded off by the addition of "5" to the next computed quotient digit in which analyzing means is provided for the quotient data and divisor and dividend data on the card and dividing mechanism is controlled by the dividend and divisor analyzing means to compute successive quotient digits including the quotient digit which is one order to the right of the order rounded off, the combination of a quotient receiving accumulator, quotient digit setup means for setting up representations of the computed quotient digits, complement entry means for entering under control of the digit setup means the nines complement of the quotient digits in said accumulator, means controlled by the quotient data analyzing means to enter the quotient digits in said accumulator, "9" additive entry means, "5" additive entry means, quotient place limiting control means including a settable means settable to a predetermined position for terminating the operation of the dividing mechanism when a predetermined number of quotient digits are derived, sensing means for presenting the dividend and divisor data for detecting the denominational magnitude thereof, means controlled by said sensing means for setting said settable means to a position which will terminate dividing operations upon securing a predetermined number of quotient digits, means to subtract "5" from the order of accumulator corresponding to the order previously receiving "5" for rounding off comprising means controlled by said settable means to cause said "5" entry means to enter a "5" in the accumulator order selected by said settable means and which corresponds to the order previously receiving "5" for rounding off, and means to cause said "9" entry means to enter "9" in each accumulator order at the left thereof, and means for testing the digital representations of the orders of the accumulator after the latter has received the quotient result under control of said analyzing means, the "9" complements of the quotient digits derived by the operation of division, and the subtractive "5" entry, to determine whether the orders receiving the quotient result under control of the analyzing means are at "9" digit representing positions.

2. In a record controlled machine for checking the accuracy of digits of a previous recorded quotient result in which the final recorded digit thereof at the right had been rounded off by the addition of "5" to the next computed quotient digit in which analyzing means is provided for the quotient data and divisor and dividend data on the card and dividing mechanism is controlled by the dividend and divisor analyzing means to compute successive quotient digits including the additional quotient digit which is one order to the right of the order rounded off, the combination of a quotient receiving accumulator, quotient digit setup means for setting up representations of the computed quotient digits, complement entry means for entering under control of the digit setup means the nines complement of the quotient digits in said accumulator, means controlled by the quotient data analyzing means to enter the quotient digits in said accumulator, quotient place limiting control means under control of a settable means settable to a predetermined position for terminating the operation of the dividing mechanism when a number of quotient digits comprising one beyond that determined by the settable means are derived, sensing means for pre-sensing the dividend and divisor data for detecting the denominational magnitude thereof, means controlled by said sensing means for setting said settable means to a position determined by the difference in denominational magnitude of the dividend and divisor amounts, a "9" additive entry commutator, connections between said commutator and all orders of the quotient receiving accumulator to cause said commutator to concurrently enter "9" in each order of the accumulator and attempt to enter "9" in a certain order thereof, "5" additive entry means, means including said settable means to cause said "5" entry to be effected in the certain or accumulator order selected by said settable means and which corresponds to the order previously receiving "5" for rounding off, a plurality of disconnecting means selected by said settable means, each means selected to cause the disconnection of said "9" entry commutator from the accumulator order receiving the "5" entry, and means for testing the digital representation of the orders of the accumulator after the latter has received the quotient result under control of the analyzing means, the "9's" complement of the quotient digits derived by the operation of division, the "5" and "9" digit entry in the orders specified, to determine whether all the orders receiving the quotient result under control of the analyzing means represent "9's".

3. In a record controlled machine for checking the accuracy of digits of a previous recorded quotient result in which the final recorded digit thereof at the right had been rounded off by the addition of "5" to the next computed quotient digit in which analyzing means is provided for the quotient data and divisor and dividend data on the card and dividing mechanism is controlled by the dividend and divisor analyzing means to compute successive quotient digits including the additional quotient digit which is one order to the right of the order rounded off, the combination of a quotient receiving accumulator, quotient digit setup means for setting up representations of the computed quotient digits, complement entry means for entering under control of the digit setup means the nines complement of the quotient digits in said accumulator, means controlled by the quotient data analyzing means to enter the quotient digits in said accumulator, quotient place limiting control means under control of a settable means settable to a predetermined position for terminating the operation of the dividing mechanism when a number of quotient digits comprising one beyond that determined by the settable means are derived, sensing means for pre-sensing the dividend and divisor data for detecting the denominational magnitude thereof, means controlled by said sensing means for setting said settable means to a position determined by the difference in denominational magnitude of the dividend and divisor amounts, a "9" additive entry commutator, connections between said "9" entry commutator and all orders of the quotient receiving accumulator including a relay energized in the machine cycle for said "9" entry to close said connections to concurrently enter "9" in each order of the accumulator and attempt to enter "9" in a certain order thereof, "5" additive entry means operable in the same machine cycle said "9" entry is effected, means including said settable means to direct the "5" entry in said certain order which corresponds to the order previously receiving "5" for rounding off, a plurality of disconnecting means selected by said settable means, each selected to cause the disconnection of the "9" entry commutator from said certain quotient accumulator order to prevent the concurrent entry of "5" and "9" and thus only the entry of "5" in this order, and means for testing the digital representation of the orders of the accumulator after the latter has received the quotient result under control of the analyzing means, the "9" complement of the quotient digits derived by division, and the "5" and "9" digit entries in the orders specified, to determine whether all orders receiving the quotient result under control of the analyzing means represent "9".

4. In a record controlled machine for checking the accuracy of quotient digits of a previously recorded quotient result secured to a number of orders predetermined by the sizes of the dividend and divisor in which the final recorded digit thereof had been rounded off by the addition of "5" to the next computed quotient digit derived by an additional dividing operation in which analyzing means is provided for the quotient, divisor and dividend data in the card and dividing mechanism is controlled by the dividend and divisor analyzing means to compute successive quotient digits including the quotient digit which is one order to the right of the order rounded off, the combination of a quotient receiving accumulator, quotient digit setup means for setting up representations of the computed quotient digits, complement entry means for entering under control of the digit setup means the nines complement of the quotient digits in said accumulator, means controlled by the quotient data analyzing means to enter the quotient digits in said accumulator, sensing means for pre-sensing the dividend and divisor data for detecting the denominational magnitude thereof, settable means set under control of said sensing means to a position determined by the difference in denominational magnitude of the dividend and divisor amounts, quotient place limiting means controlled by said settable means and including means to enable said dividing mechanism to be maintained in operation to compute an additional quotient digit beyond the number predetermined by the settable means, means controlled by the settable means for effecting the subtractive entry of "5" in the order of the accumulator corresponding to the order originally utilized to receive the additive "5" entry for rounding off, and means for testing the digital representations of the accumulator after the latter has received the quotient result from the analyzing means, the "9's" complements of the quotient digits derived by the operation of division, and the subtractive "5" entry, to determine whether all the orders receiving the quotient result under control of the analyzing means represent "9".

ARTHUR H. DICKINSON.